Oct. 20, 1970 F. P. WILLCOX 3,534,847

HIGH SPEED TELEPRINTER

Filed Sept. 21, 1966 22 Sheets-Sheet 1

INVENTOR

F. P. Willcox

BY Homer R. Montague

ATTORNEY

INVENTOR
F. P. Willcox

BY Homer R. Montague
ATTORNEY

INVENTOR
F. P. Willcox
BY Homer R. Montague
ATTORNEY

Oct. 20, 1970 F. P. WILLCOX 3,534,847

HIGH SPEED TELEPRINTER

Filed Sept. 21, 1966 22 Sheets-Sheet 4

INVENTOR

F. P. Willcox

BY Homer R. Montague

ATTORNEY

Oct. 20, 1970 F. P. WILLCOX 3,534,847

HIGH SPEED TELEPRINTER

Filed Sept. 21, 1966 22 Sheets-Sheet 5

Fig. 12-A

INVENTOR

F. P. Willcox

BY Homer R. Montague

ATTORNEY

Oct. 20, 1970 F. P. WILLCOX 3,534,847

HIGH SPEED TELEPRINTER

Filed Sept. 21, 1966 22 Sheets-Sheet 6

INVENTOR.
F. P. Willcox
BY
Homer R. Montague
ATT'Y.

Oct. 20, 1970 F. P. WILLCOX 3,534,847

HIGH SPEED TELEPRINTER

Filed Sept. 21, 1966 22 Sheets-Sheet 7

INVENTOR.
F. P. Willcox
BY
Homer R. Montague
ATT'Y.

INVENTOR.
F. P. Willcox
BY
Homer R. Montague
ATT'Y.

Oct. 20, 1970 F. P. WILLCOX 3,534,847

HIGH SPEED TELEPRINTER

Filed Sept. 21, 1966 22 Sheets-Sheet 9

INVENTOR
F. P. Willcox

BY Vomer L. Montague
ATTORNEY

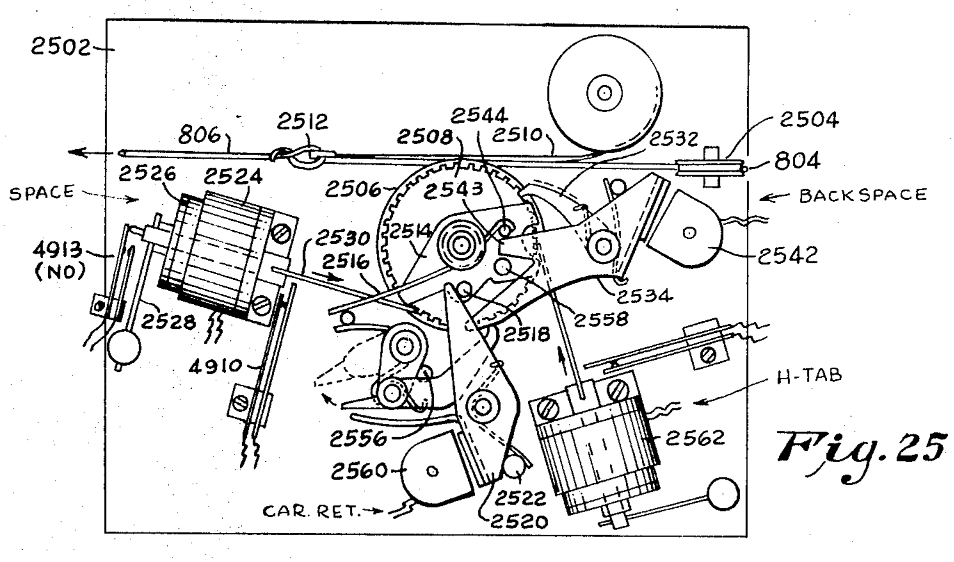
Fig. 25
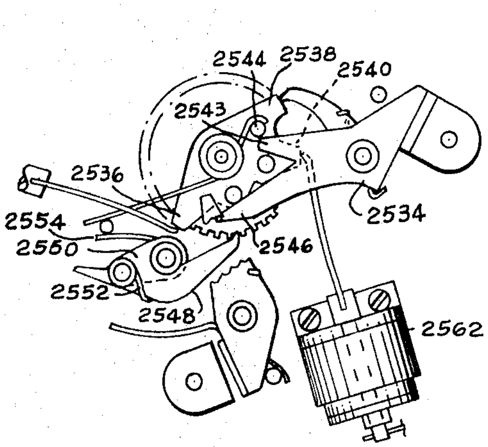
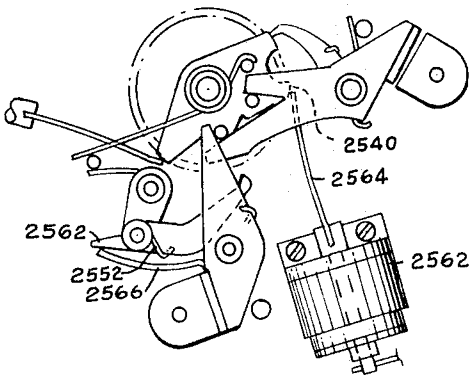
Fig. 26 Fig. 27
INVENTOR
F. P. Willcox
BY Homer R. Montague
ATTORNEY Oct. 20, 1970 F. P. WILLCOX 3,534,847

HIGH SPEED TELEPRINTER

Filed Sept. 21, 1966 22 Sheets-Sheet 11

INVENTOR

F. P. Willcox

BY Homer R. Montague

ATTORNEY

INVENTOR
F. P. Willcox

BY Homer R. Montague
ATTORNEY

INVENTOR
F. P. Willcox

BY Homer R. Montague
ATTORNEY

Oct. 20, 1970 F. P. WILLCOX 3,534,847

HIGH SPEED TELEPRINTER

Filed Sept. 21, 1966 22 Sheets-Sheet 14

INVENTOR

F. P. Willcox

BY Homer R. Montague

ATTORNEY

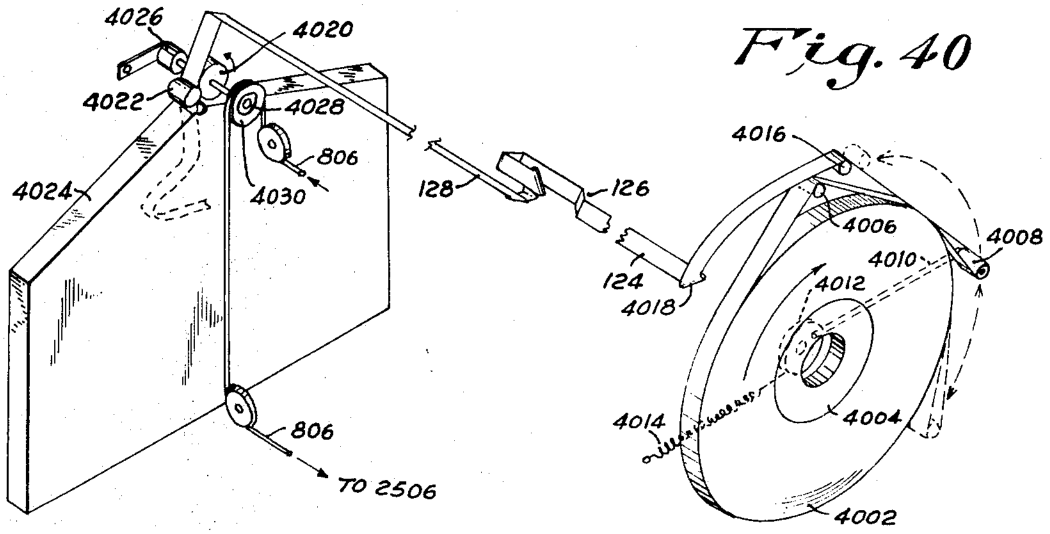
Fig. 40
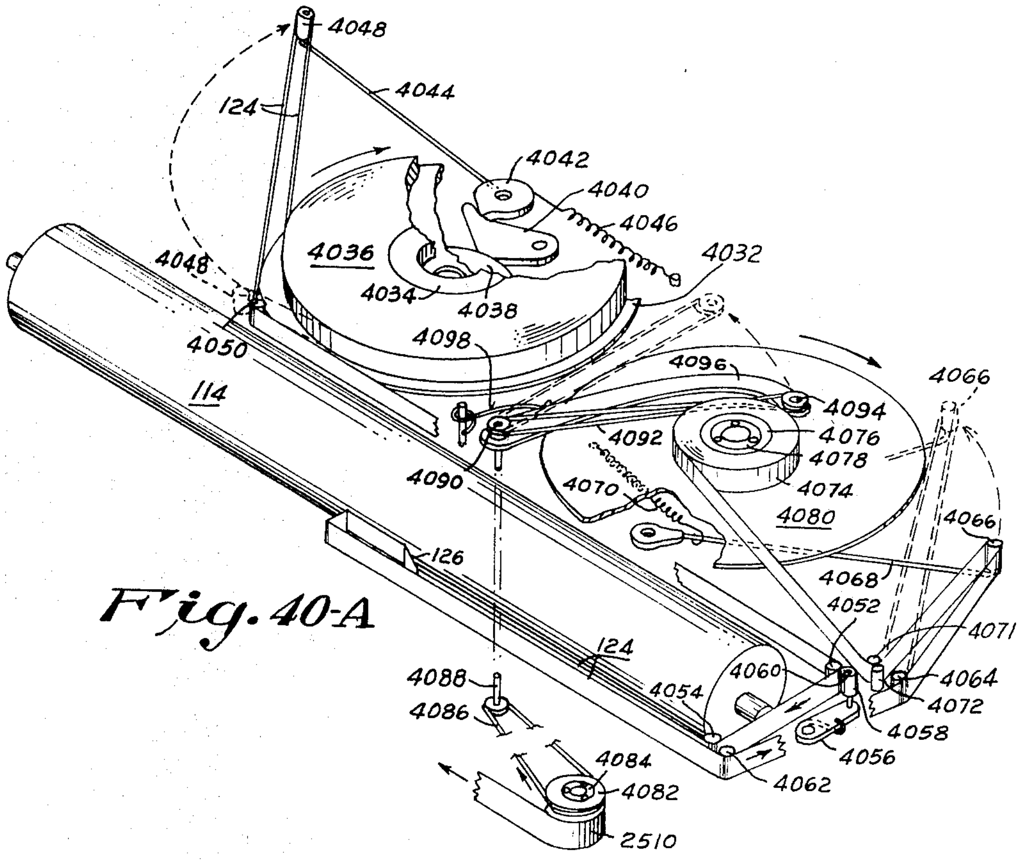
Fig. 40-A
INVENTOR
F. P. Willcox
BY Homer R. Montague
ATTORNEY INVENTOR
F. P. Willcox BY Homer R. Montague
ATTORNEY Oct. 20, 1970

F. P. WILLCOX 3,534,847

HIGH SPEED TELEPRINTER

Filed Sept. 21, 1966

22 Sheets-Sheet 17

INVENTOR:
F. P. WILLCOX

BY Homer R. Montague
ATTORNEY

INVENTOR
F. P. Willcox
BY Homer R. Montague
ATTORNEY

INVENTOR
F. P. Willcox

BY Homer R. Montague
ATTORNEY

INVENTOR
F. P. Willcox
BY Homer R. Montague
ATTORNEY

Oct. 20, 1970 F. P. WILLCOX 3,534,847

HIGH SPEED TELEPRINTER

Filed Sept. 21, 1966

22 Sheets-Sheet 21

INVENTOR

F. P. Willcox

BY Homer R. Montague

ATTORNEY

INVENTOR
F. P. Willcox
BY Homer R. Montague
ATTORNEY

United States Patent Office 3,534,847

Patented Oct. 20, 1970

3,534,847

HIGH SPEED TELEPRINTER

Frederick P. Willcox, 565 Oenoke Ridge, New Canaan, Conn. 06840

Filed Sept. 21, 1966, Ser. No. 581,020

Int. Cl. B41j *1/30*

U.S. Cl. 197—18 11 Claims

ABSTRACT OF THE DISCLOSURE

A teleprinter operable either from a local keyboard or remotely by signal codes, includes a novel low-inertia type font spool having individual type face arms to be selectively thrown out of a minimum inertia position parallel to the spool axis to a printing-ready position overlying a paper support, and which arms are flexed against a print-receiving material to make the imprint. Likewise character placement is controlled by the position of the spool along an axial guide rod, character selection by rotation of the spool about its own axis. Impulsive driving of the spool in rotation is provided by a novel drive mechanism controlled to achieve the selection by a rotation of the spool in the shortest-distance direction, an integrated shaft-position photo-optical control unit determining the proper direction of spool rotation, its stopping position, and the magnitude of drive impulse applied to the spool. A spool-return mechanism with dashpot control positions the spool for the start of each new line of printing. Provisions are included for both manual (local operator) and code-signal control of the desired printing format, including the right and left margin stop positions, and horizontal and vertical tabulation stops. Specialized arrangements for handling the imprinting or inked ribbon with relation to the novel font spool configuration are provided. Mechanical power for the operation of all functions is provided by a limited number of impulsive stroke electromagnets, solenoids or the like, eliminating the need for a constantly-running rotary motor.

This invention pertains to improvements in teleprinters and similar mechanisms in which very rapid sequences of code-controlled operations must be performed with accuracy and reliability. To this end, the invention provides as a primary object an improved arrangement of printing elements including a generally cylindrical or spool-shaped array of minimum moment of inertia, incorporated in a design which effects a separation of the three basic phases of teleprinter operation, which are character placement, character selection, and the impacting operation. The invention also comprehends the provision of such mechanism in which not only the control functions but also the basic mechanical operating energy for the machine parts is furnished on a pulse basis in response to the arrival of code groups, or in response to keyboard control operations performed by a local operator. This is in contrast to known printer designs in which the operating energy is derived from a constantly-energized or continuously running motor.

The invention also takes advantage of the just-mentioned feature to enable the character-selection motion of the printing element or font array to be, when desired, on a shortest-distance bidirectional basis. In other words, when the spool-like font element is to be repositioned to effect a new character selection, it is moved in the proper direction (from its last previous selected position) to effect the new positioning in minimum time. The speed given to the font spool may also be regulated depending on the angular distance it has to be moved. For large font selections, especially, this bidirectional feature permits a considerable increase in printing speed, but it has heretofore involved an excessive complexity and high cost. The invention provides a simple and effective way of accomplishing this result by means incorporated directly in the character-selecting decoder of the machine.

A further novel feature of the invention lies in the provision of a simple form of binary-code controlled angular position selector which not only provides for the selection of characters from amongst a large number thereof (such as a 90-character font which avoids the complexity and speed limitations of shift and unshift operations for capitals and lower case characters), but also provides built-in decoding and binary storage facilities for both character selections and any of a considerable number of non-printing functions which do not require shaft rotation and indexing. Such functions may include paper feed, carriage return, backspace, carriage tabulation, signal bells or lights, and the control of an associated tape perforator or reader or other auxiliary device. This feature permits the elimination of a considerable number of the previously required electronic logic or decision circuits.

It is, of course, conventional to arrange printing-character formations at the ends of printing bars whose other ends are pivoted on a disc or hub which is rotated to bring a selected character to printing position, the selected bar then being thrown outward from the disc axis to impact the ribbon or impression paper. Such arrangements require heavy and rigid printing bars, as they in effect are hammers, and for a large font of characters, the assembly has excessive weight and high moment of inertia, requiring great operating power and seriously limiting the printing speed. The present invention overcomes these limitations by providing the printing formations at the ends of light, thin and flexible reed-like arms which swing out to present the printing formation adjacent the printing point; a separate print hammer then impacts the formation against the ribbon or pressure-sensitive paper, in a direction perpendicular to the swing-out plane. By thus separating the motion into two distinct phases, a positioning phase and an impacting phase, the mechanical and timing requirements can be optimized in terms of speed, strength and inertia, to provide adequate printing rate with minimum power expenditure. As will be seen, the face width of the character on a type bar does not affect the spacing of the type bars or arms on their spool or carrier, as this spacing depends entirely on arm thickness.

Still another feature of the invention is the provision of a page-format printer with highly visible arrangements for the indication of desired margin and tabulating settings, and improved setting and clearing arrangements which effect their control by simple and trouble-free electrical, magnetic or optical position-sensing means.

Another object of the invention is to provide a printer, especially a remote-controlled teleprinter, with provisions for complete "format" control. These features enable, for example, the horizontal-tabulation stops, the left and right margin stops, and the vertical-tabulation stops, to be set at desired positions relative to font carriage positions or paper feed positions, either locally by an operator, or by remote control in response to codes received over a line or channel. The invention also provides, as a necessary adjunct to accomplish the foregoing, for either manual or remote clearing or "unsetting" of any stops that were previously set. In connection with vertical (paper-feed direction) tabulating, the invention also provides for indicating when a sheet of impression paper has been fed in to a standard starting position, from which line-feed operations are metered to preset paper positions for the vertical tabulating operation.

To permit code-controlled imprinting of characters in positions raised above or depressed below the normal writing line, the invention provides for shifting the paper a half-line space upward or downward for one or more characters, to print superscript (e.g., exponential) characters and subscript characters.

A further feature of the invention is the novel provisions for the use of an inked or coated printing ribbon when desired, without loss of the desired instant visibility of the printed line, and without the complications inherent in conventional ribbon "vibrator" arrangements.

In connection with the feature of impulse-operation mentioned above, by which the conventional running motor and clutches or the like are eliminated, the invention provides novel arrangements for impulse-accelerating a font-spool positioning shaft and applying thereto, for each character selection, sufficient energy to rotate the shaft the necessary portion of a revolution to ensure that the desired selection is accomplished; i.e., that the selected character element is able to reach the position needed for printing. A selecting device, whose single rotating element is functionally integral with the positioning shaft, operates under binary code control to determine the proper direction in which the accelerating impulse operates, and also controls the deceleration (and final indexing) of the font-spool so actuated. The same selecting device operates, without any impulsing of the shaft, to decode incoming "function" (i.e., non-printing) codes and to establish an operating circuit for each such function. Thus, a large number of functions can be provided for without increasing the size or mass of the font-spool.

Another advantageous feature of the invention lies in the provision of novel impulsive means for obtaining "tabulating" control, by which columnar matter or the like is printed in proper positions with respect to the line-length direction on the impression paper, this being performed by a high-speed stepwise forward traverse of the printing font-spool to preselected positions in that direction.

While the invention will be described herein in detail in connection with a preferred form of page-form teleprinter, certain features of novelty are not inherently limited to printer mechanisms but can be utilized in other applications; for example, where precise and rapid positioning of any shaft to any of numerous angular positions is required to be effected under digital control.

Figure 12:
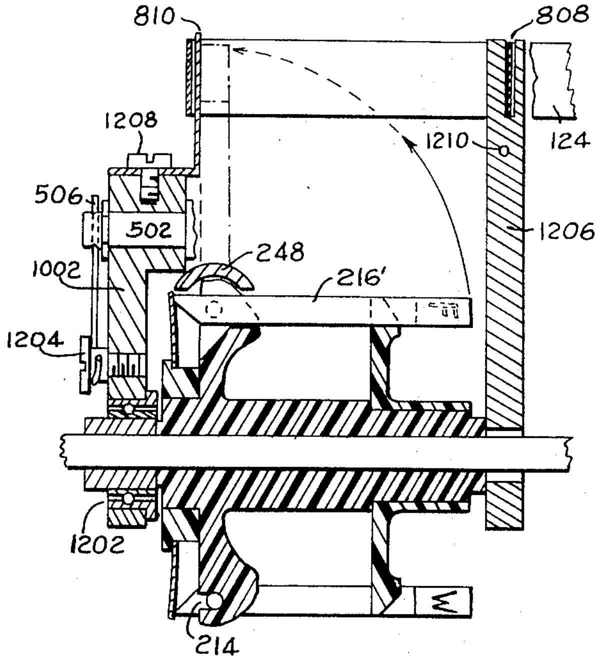
FIG. 12 is a similar view showing two type arm elements in full lines in their stored or non-printing positions.

FIG. 12–A is a perspective view of one form of ribbon guide for mounting on the printing carriage.

Figure 13:
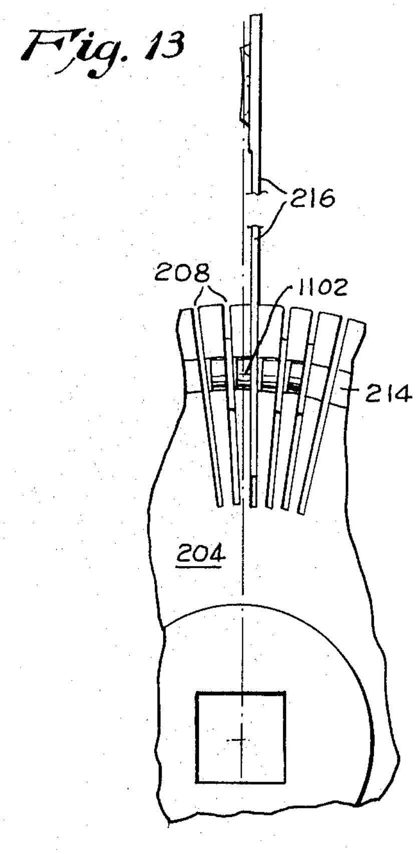
Figure 13:
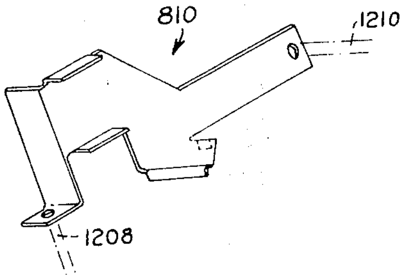

FIG. 13 is a fragmentary end view, to a larger scale, of the font spool subassembly, with one type arm extended to printing position.

Figure 1:
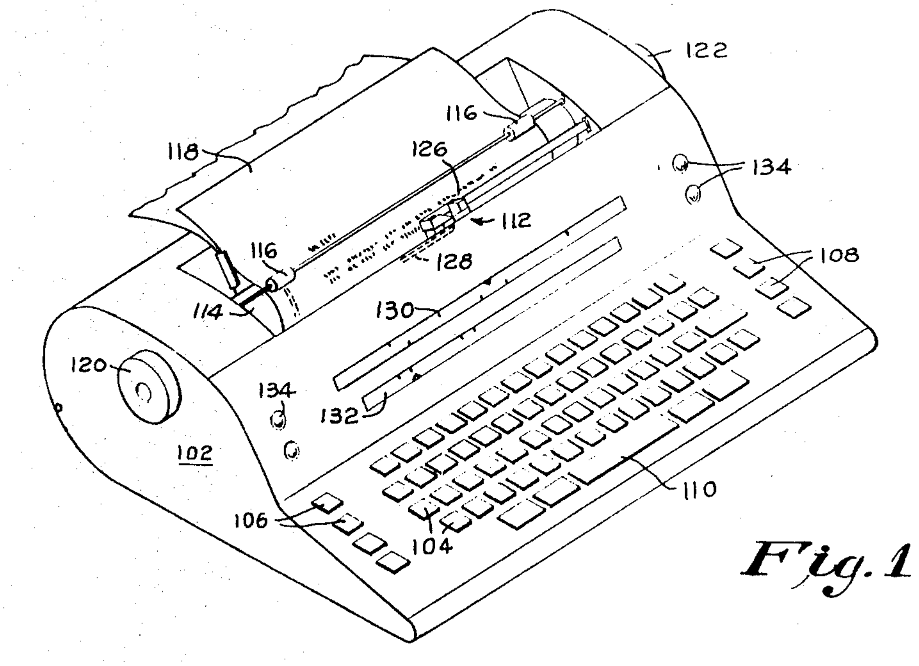
FIG. 1 is a perspective view of the general arrangement of a complete teleprinter forming one complete and preferred embodiment of the invention.
Figure 10:
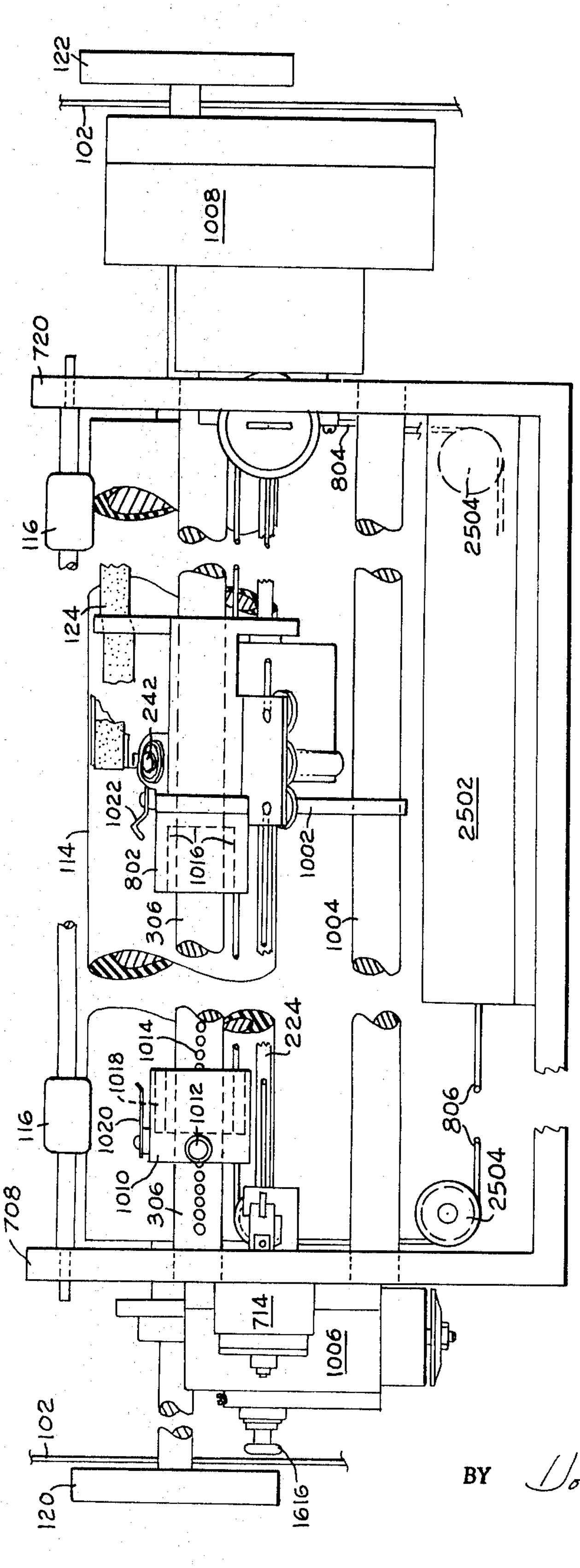
FIG. 10 is an overall front elevation view of the mechanism of the printer, the outer casing being broken away.
Figure 14:
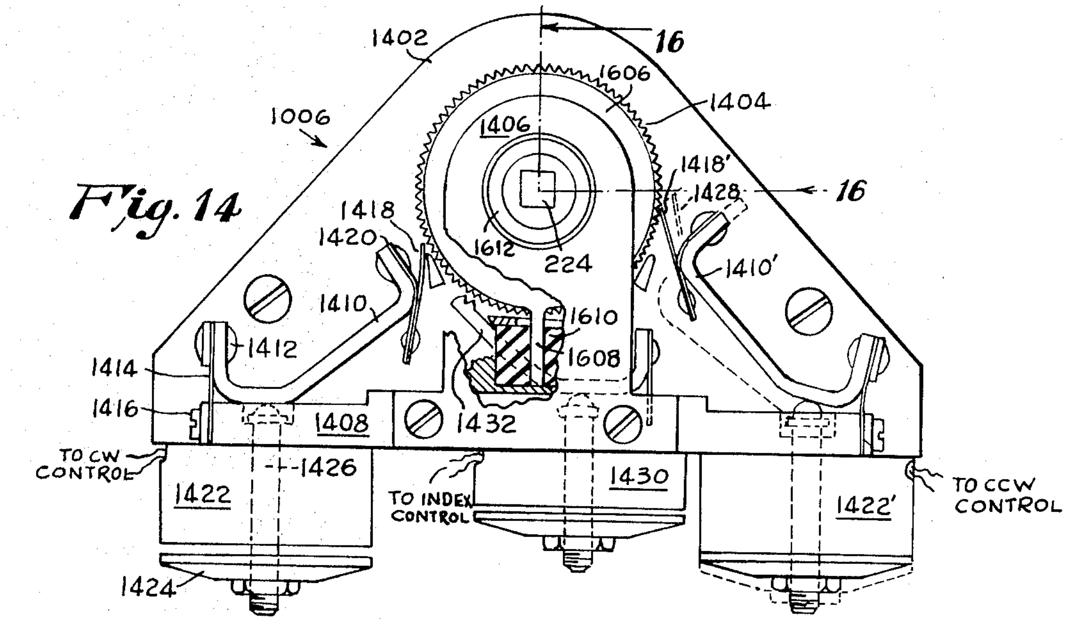

FIG. 14 is an enlarged end view of the font-spool shaft impulsing and indexing and braking mechanism, with parts broken away and parts in section, looking generally at the left side of the machine in FIGS. 1 and 10.

Figure 15:
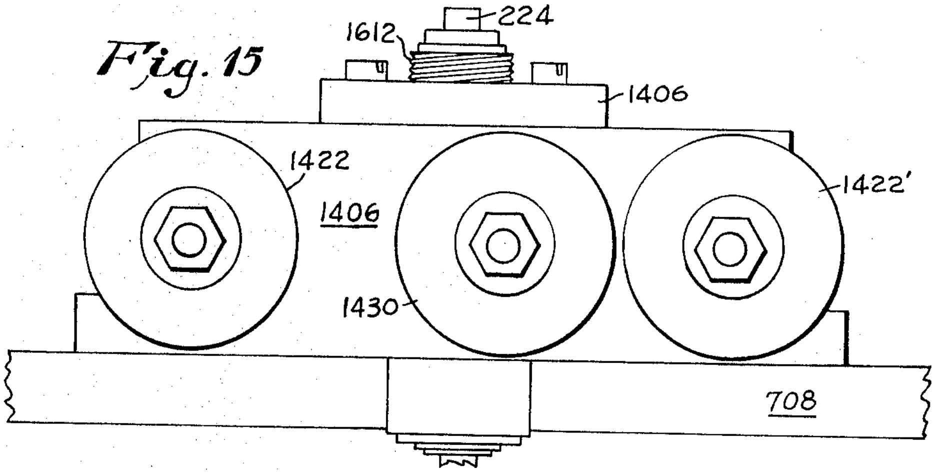

FIG. 15 is a bottom view of FIG. 14.

Figure 16:
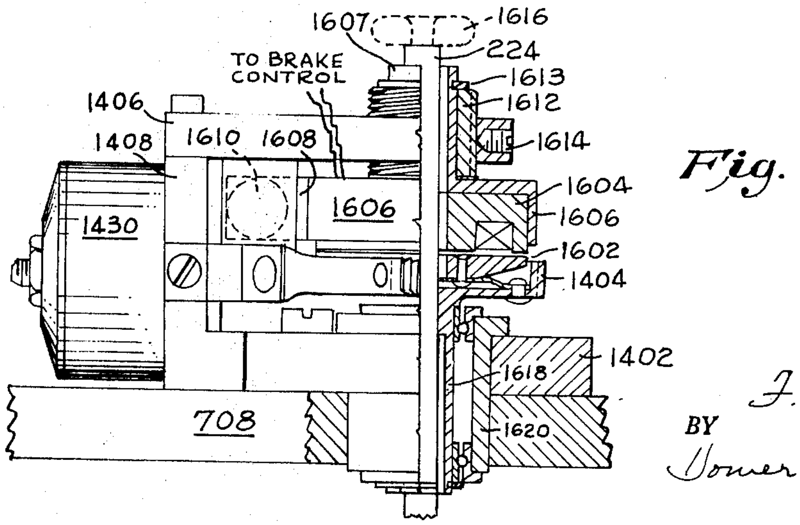

FIG. 16 is a quarter-sectional view of FIG. 14 taken along line 16—16 thereof.

Figure 17:
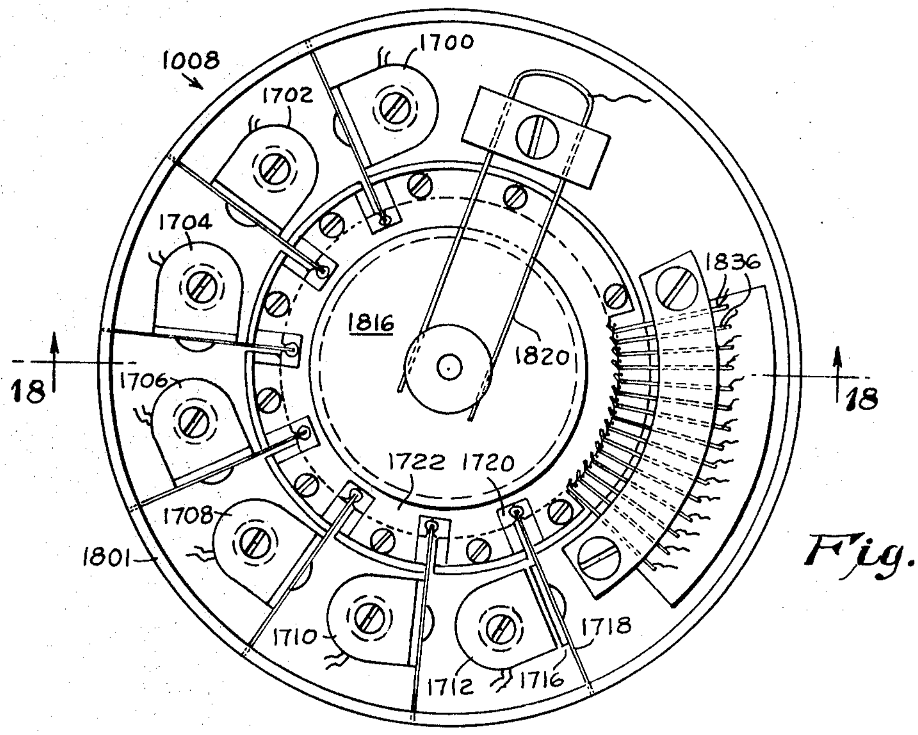

FIG. 17 is an end view of the selector mechanism of the machine, with its cover removed, looking generally at the right side of the machine in FIGS. 1 and 10.

Figure 18:
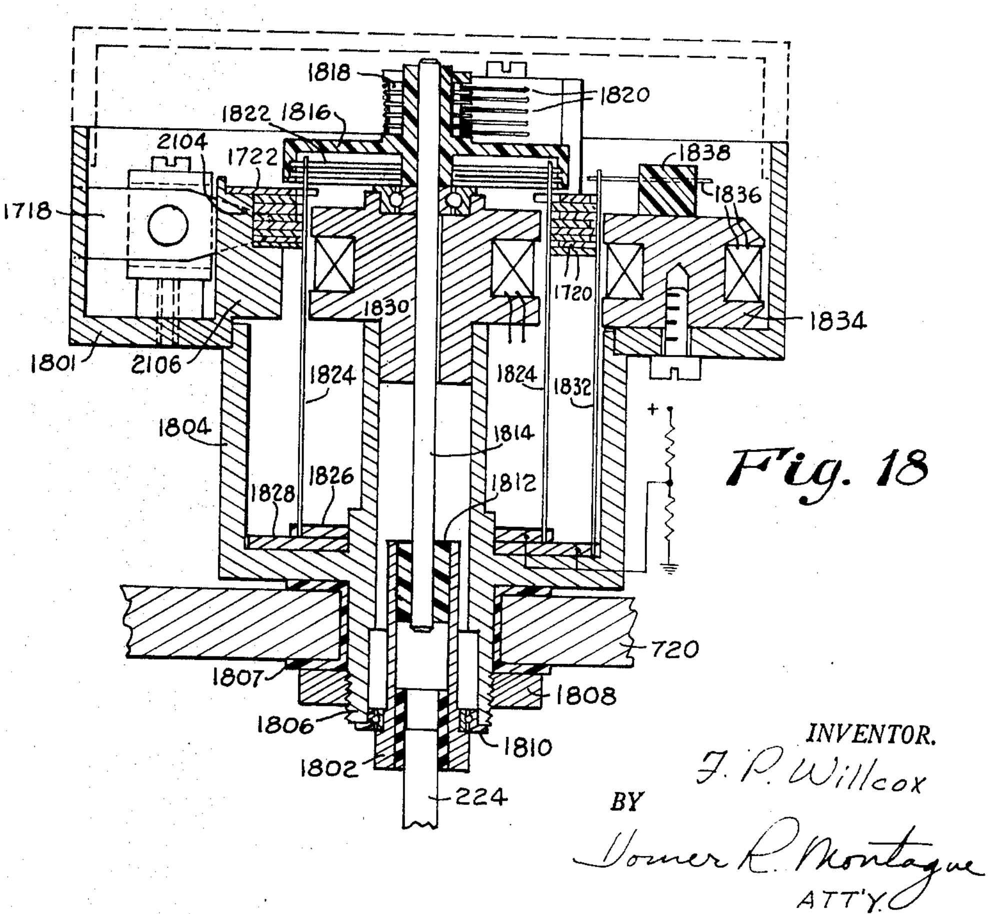

FIG. 18 is an axial sectional view of the selector, taken along line 18—18 of FIG. 17.

Figures 19, 20, 21, 22:
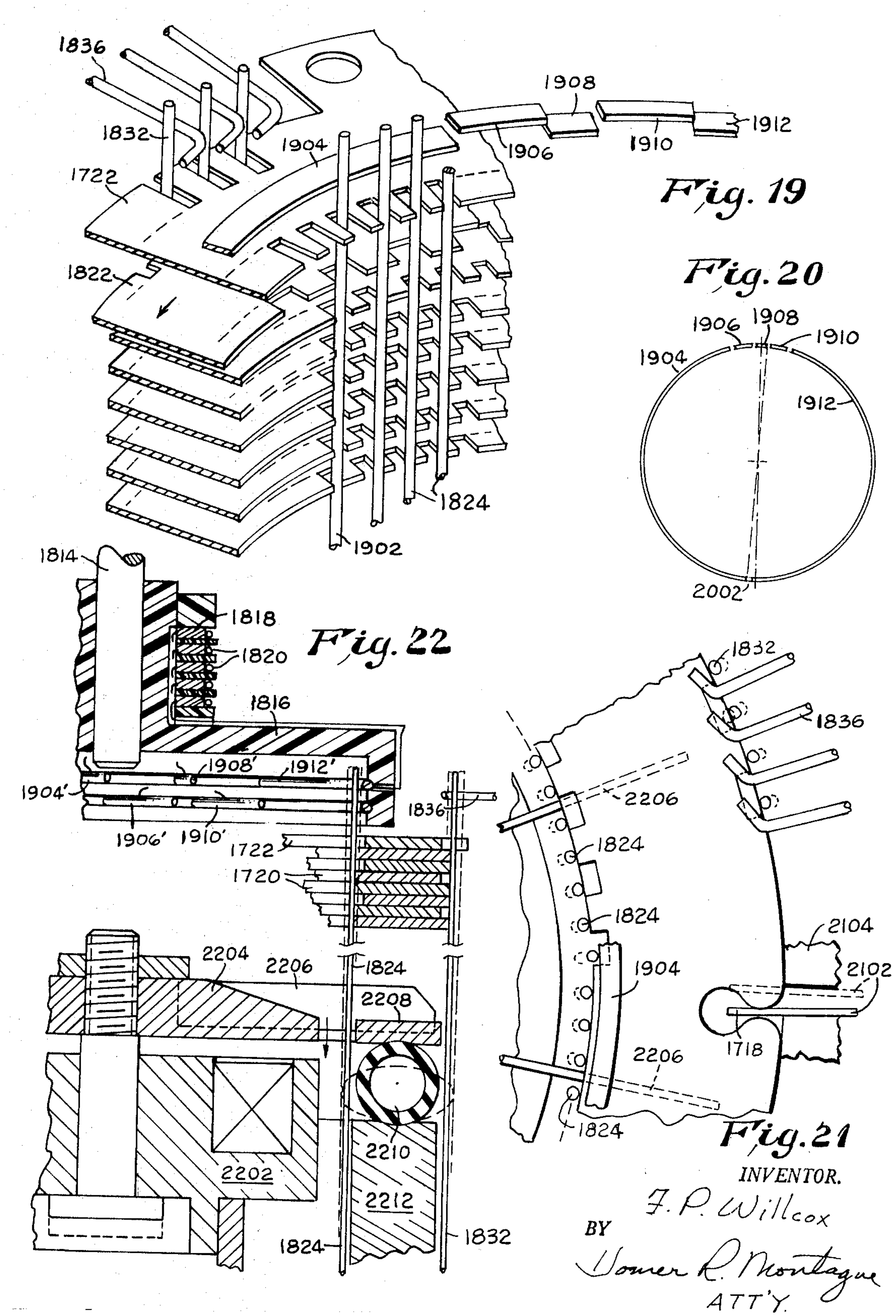

FIG. 19 is an enlarged fragmentary and diagrammatic perspective view of portions of the selector mechanisms.

FIG. 20 is a diagrammatic view of the segmented ring shaped switch or commutator of the selector mechanism.

FIG. 21 is a greatly enlarged fragmentary face view of a portion of the code ring assembly of the selector mechanism, detailed the positioning means for one ring, and the contact devices for selection of non-printing functions.

FIG. 22 is an enlarged fragmentary axial sectional view oriented comparably to FIG. 18, but clarifying certain details as well as illustrating a modification of the selecting finger or wire displacing mechanism.

Figure 23:
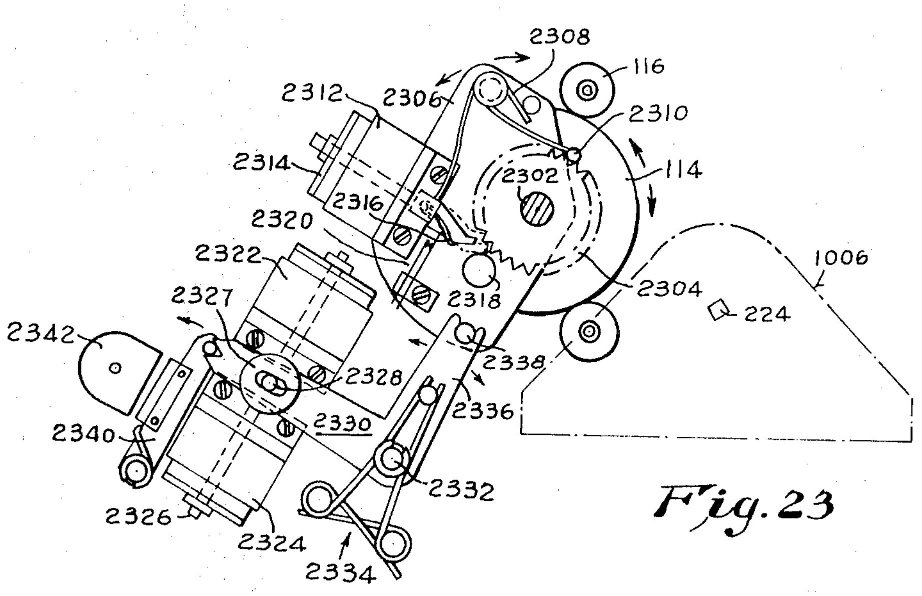

FIG. 23 is an end view of the paper- or line-feed mechanism and illustrating further arrangements for the support and guidance of the printing font spool in relation to the paper platen, as well as performing subscript and superscript printing.

Figure 24:
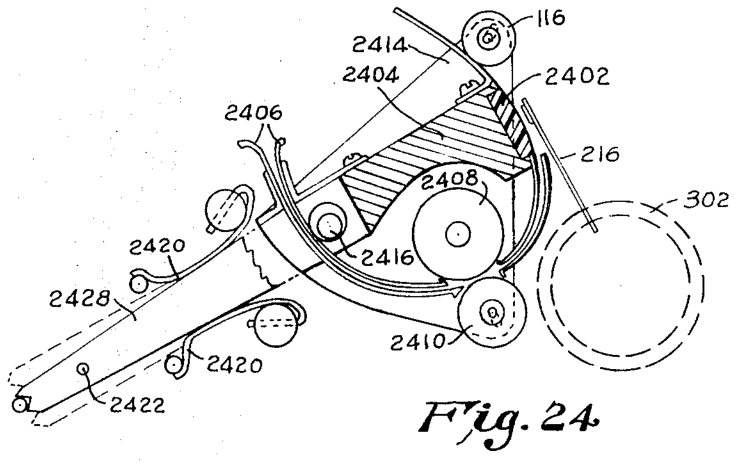

FIG. 24 is a similar view, partly in transverse section, of an alternate form of platen, also with provision for subscript and superscript printing.

FIG. 25 is a plan view with parts broken away, illustrating one form of mechanism for advancing the font spool to successive writing positions along a line, for backspacing the same, for performing a tabulating (multiple advance) operation, and for releasing the carriage for a carriage-return operation.

FIG. 26 is a fragmentary view showing some of the parts of FIG. 25 during a backspacing operation.

FIG. 27 is a view similar to FIG. 26 with parts shown during a carriage-return operation.

Figures 28, 29:
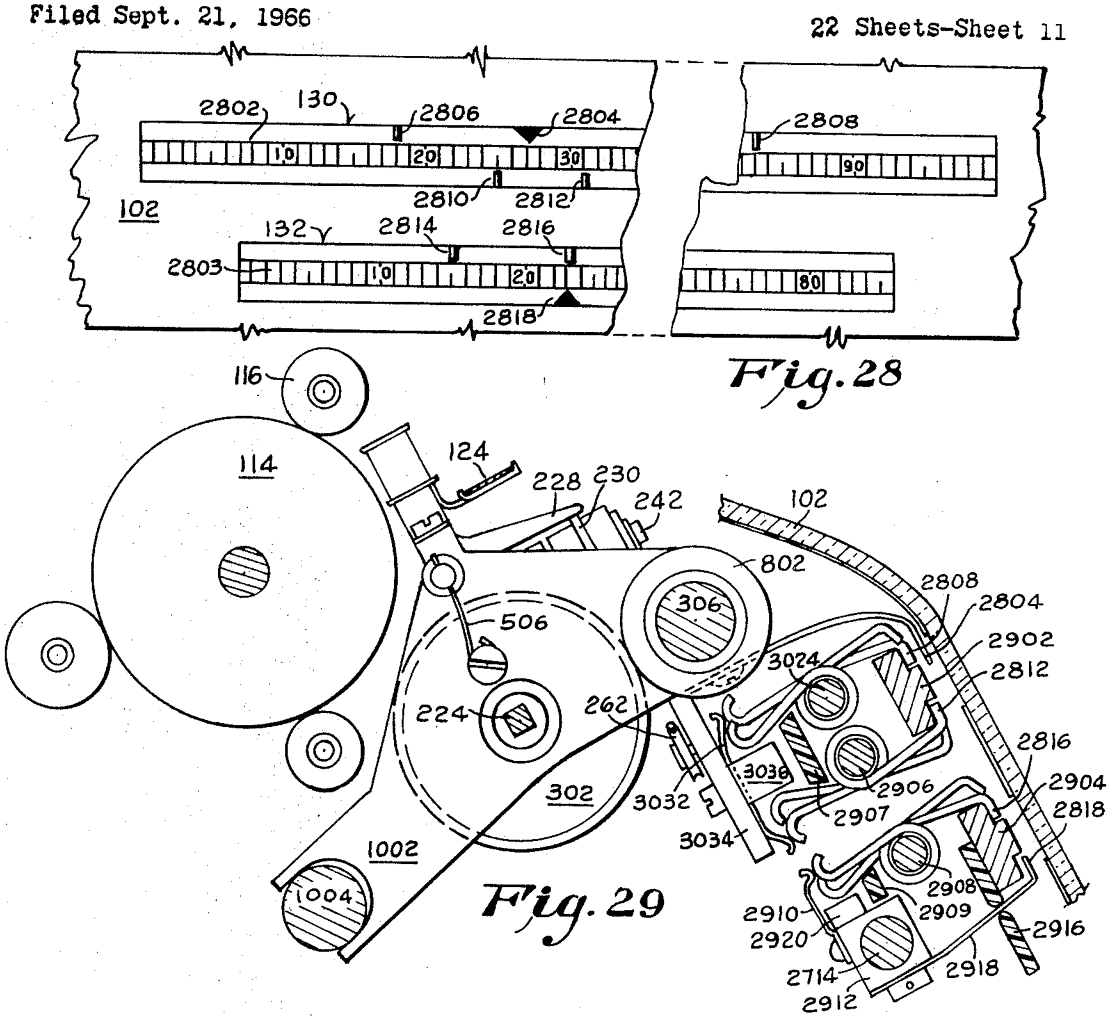

FIG. 28 is a fragmentary front elevation of the arrangement of margin stop position indicators, horizontal and vertical tabulating stop position indicators, and carriage position and line-count indicators, as viewed from the operator's position.

FIG. 29 is a transverse sectional view showing the positioning and arrangement of the stop and indicator mechanisms in relation to the platen and the printing carriage.

Figure 30:
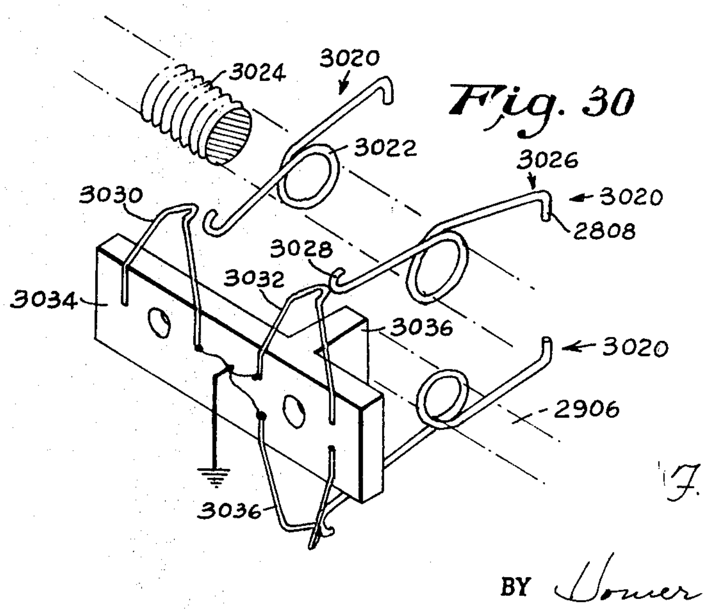

FIG. 30 is a fragmentary exploded perspective view of the mounting of the stops and indicators in relation to a portion of the printing carriage.

Figure 31:
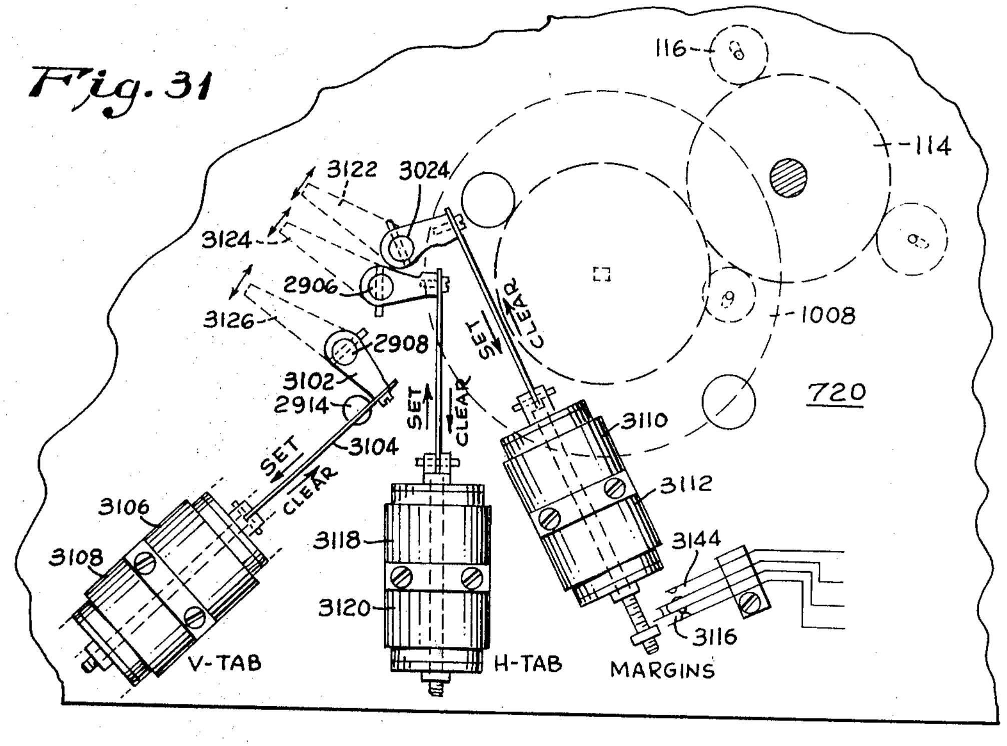

FIG. 31 is a fragmentary elevation of the magnetic control means for operating the threaded rods to set and reset the stops and indicators mentioned above.

Figure 32:
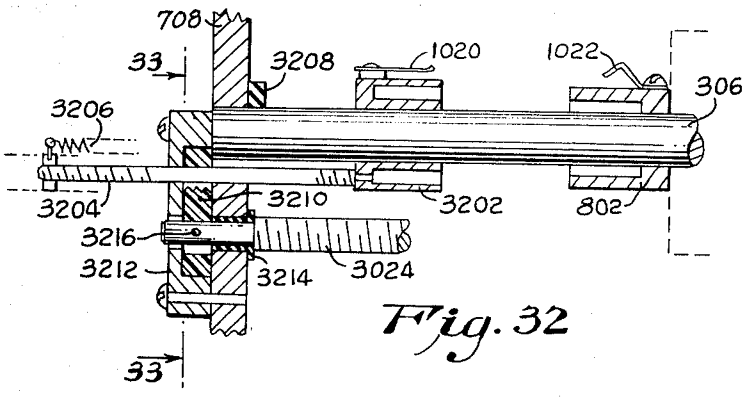

FIG. 32 is a diagrammatic sectional view of parts associated with the setting and releasing of the left-margin control of the machine.

Figure 33:
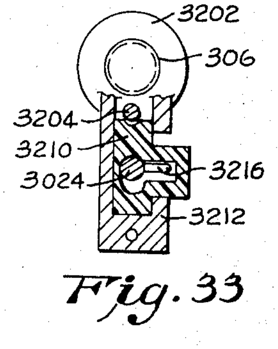

FIG. 33 is a sectional view thereof taken on line 33—33 of FIG. 32.

Figure 34:
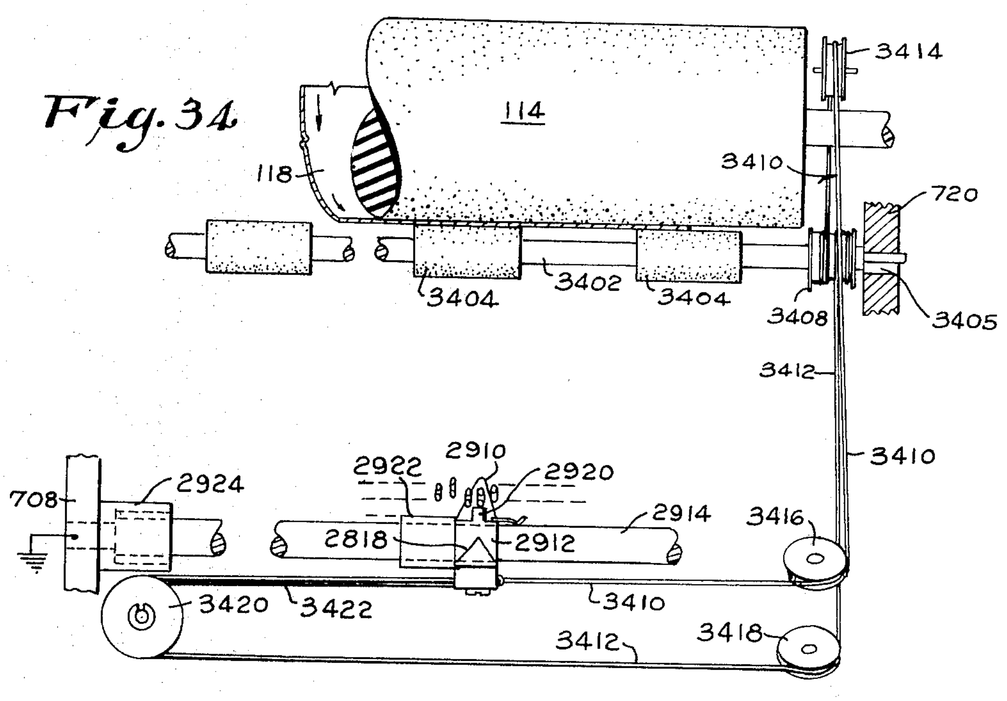

FIG. 34 is a diagrammatic view from the front of the machine, showing parts associated with one form of line-count indicator control and for mechanically sensing the entry of impression paper to a fiducial position.

Figure 35:
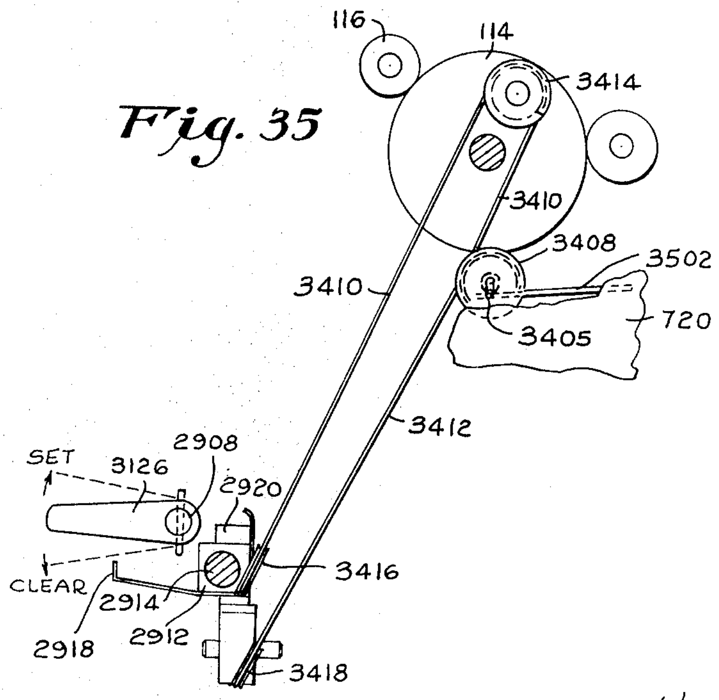

FIG. 35 is a side view thereof.

Figures 36, 37:
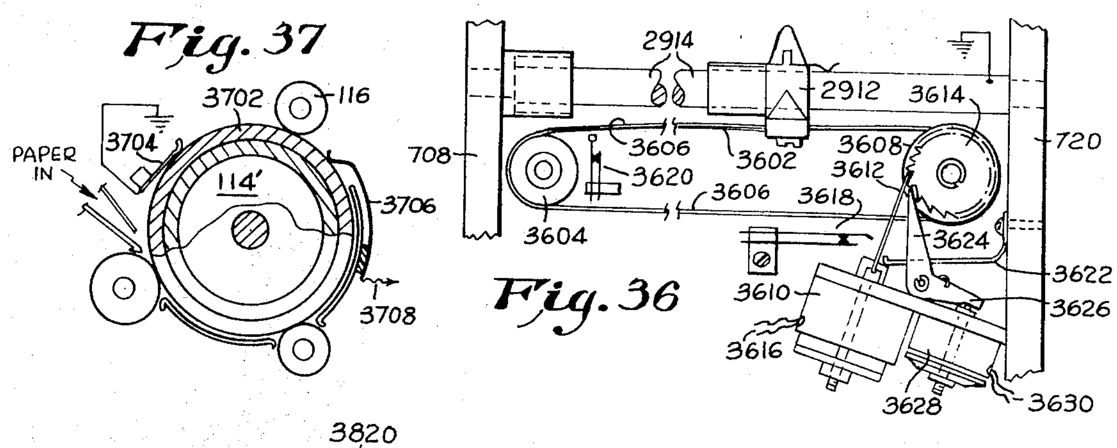

FIG. 36 is a view similar to the lower portion of FIG. 34, with provision for an alternate form of line-count indicator control, and for automatic (e.g., under code control) setting of the start of line-counting as each new sheet or form area is moved to printing position.

FIG. 37 is a partial transverse section taken through the roller platen and showing one way of sensing the arrival of an impression sheet at a zero-line-count position in the machine.

Figure 38:
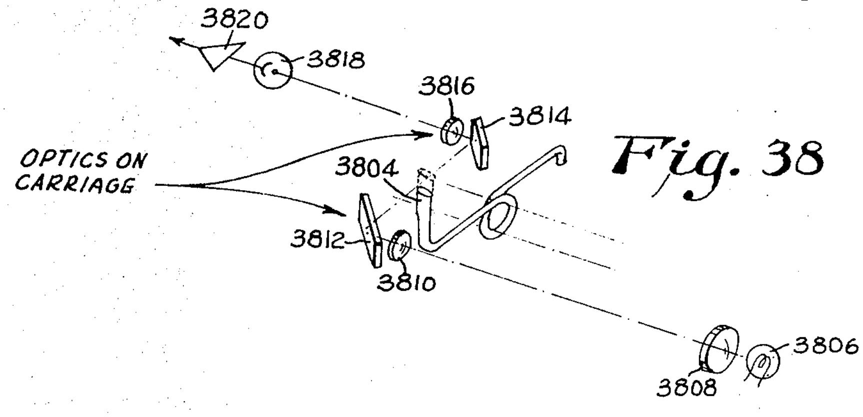

FIG. 38 is a fragmentary and diagrammatic view of an alternate photoelectric arrangement for sensing the arrival of the printing carriage at a predetermined location as set by the array of stops and indicators of FIGS. 28–30.

Figure 39:
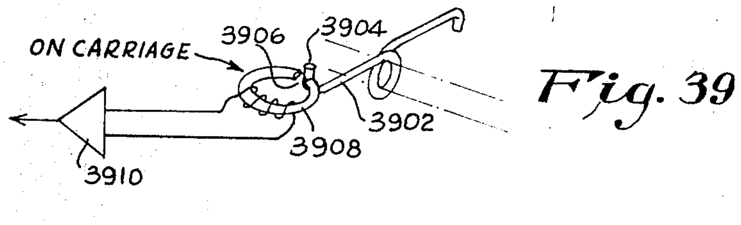

FIG. 39 is a view similar to FIG. 38 but illustrating a magnetic sensing embodiment.

FIG. 40 is a diagrammatic perspective view of an arrangement for handling and feeding an impression ribbon in the machine.

FIG. 40–A is a similar view of an alternate arrangement for a ribbon.

Figure 41:
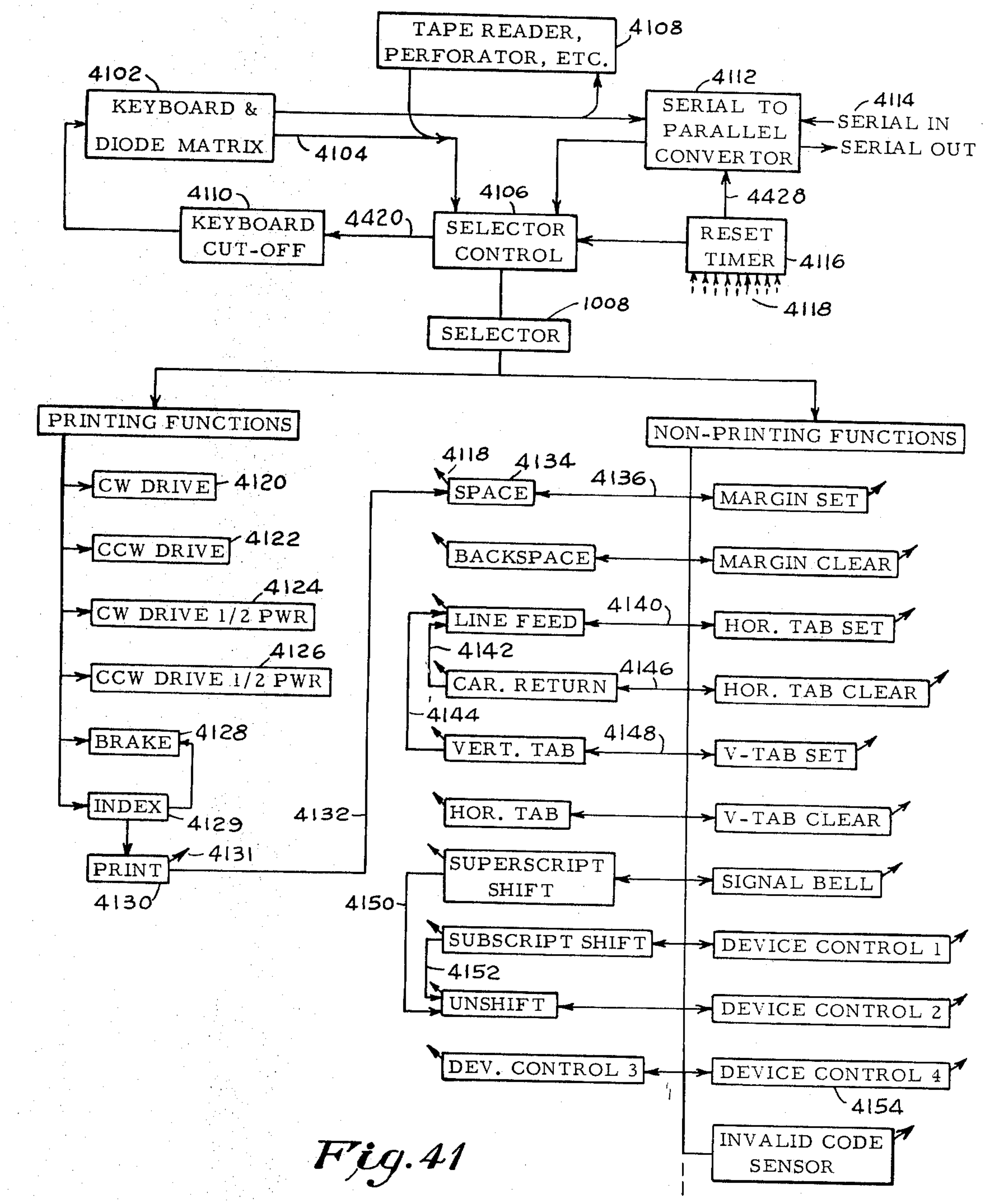

FIG. 41 is a block diagram showing the signal processing paths through the machine, including the central role of the selector mechanism (FIGS. 17–22) in controlling both printing functions and non-printing functions.

Figure 42:
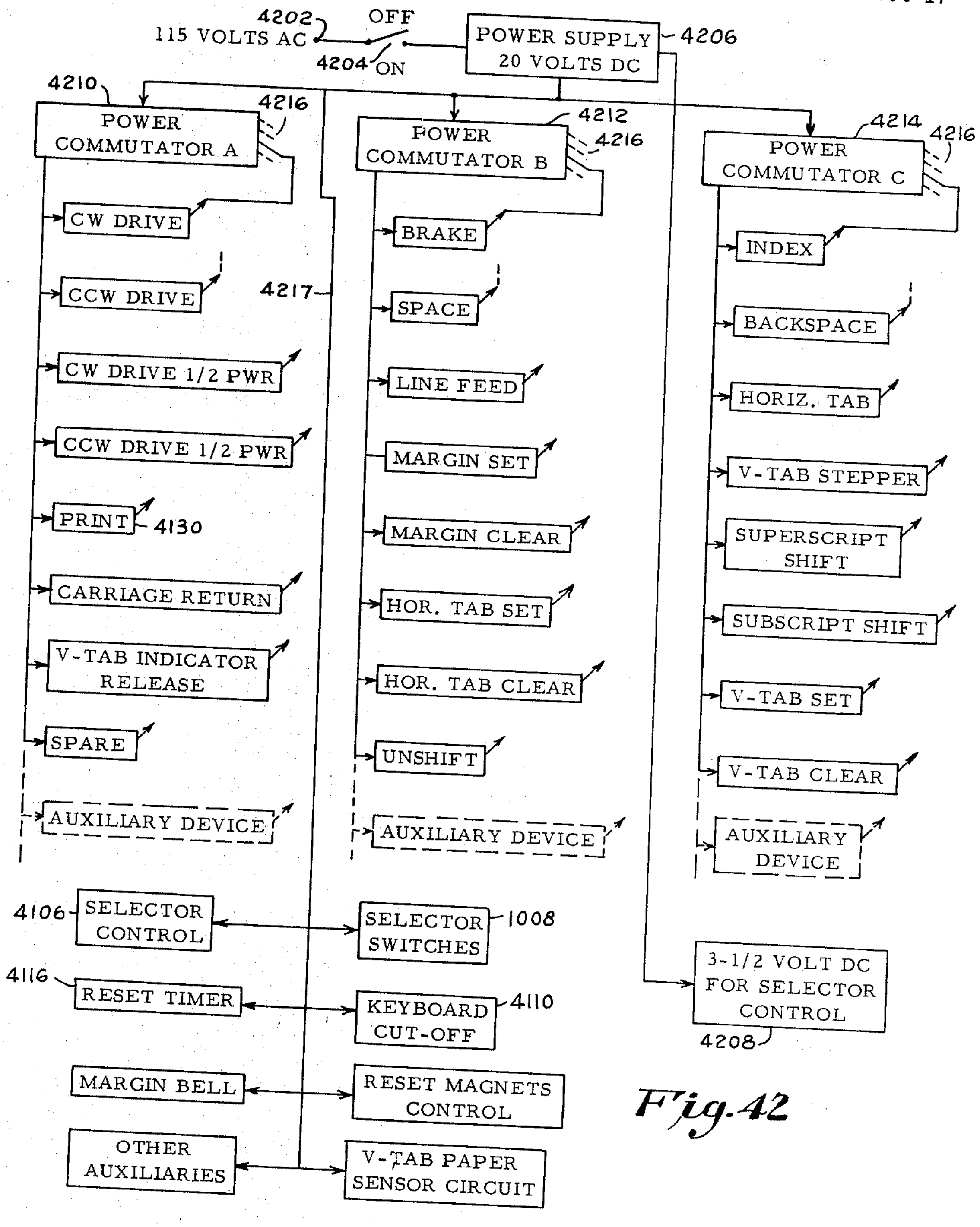

FIG. 42 is a block diagram showing the paths of power flow to the operating instrumentalities (magnets), and the provision for commutating (turning off) the operating currents.

Figure 43:
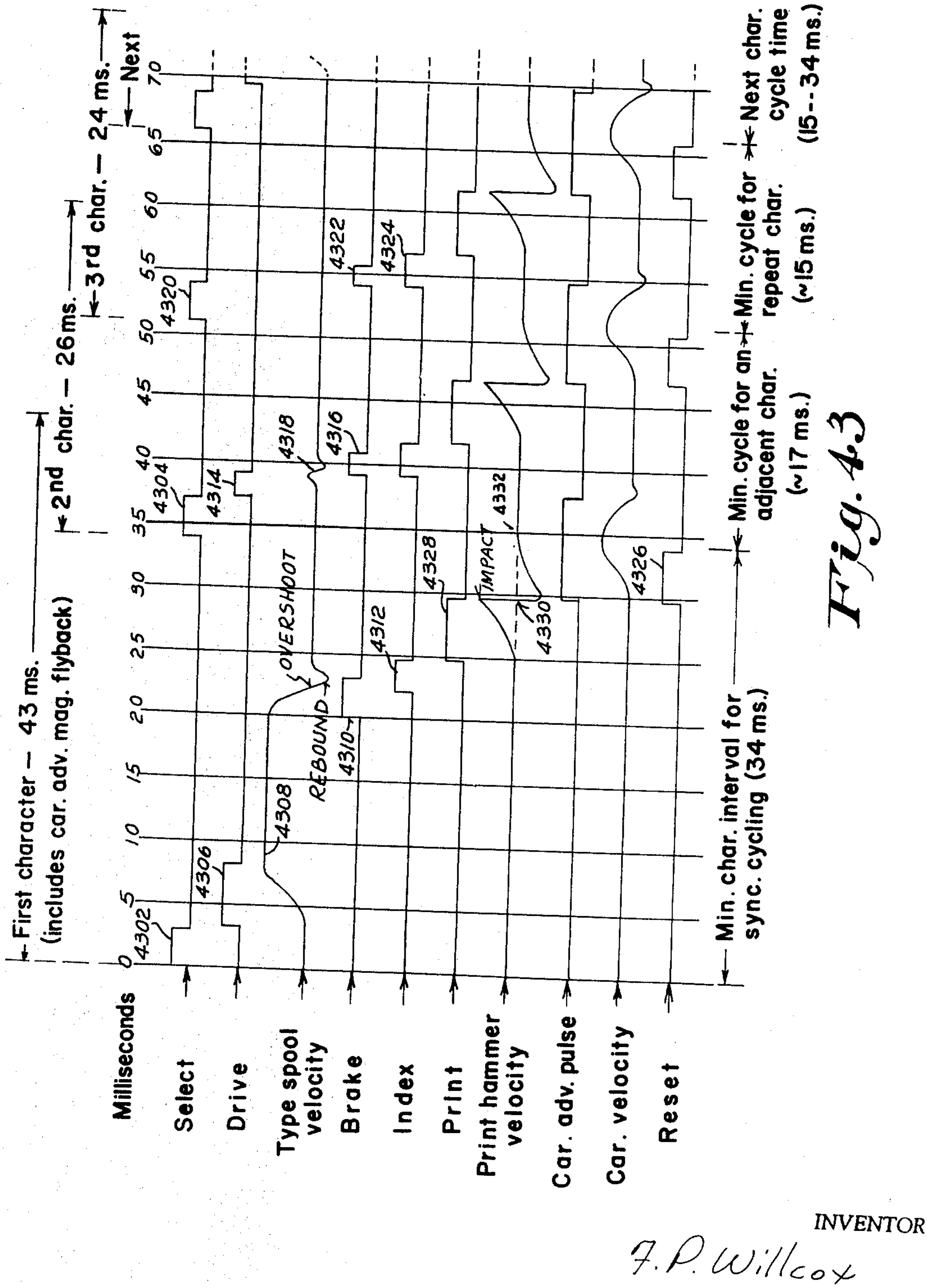

FIG. 43 is a diagrammatic timing chart showing the time relationships for various phases of a succession of character printing operations.

Figures 44, 45, 46, 47, 52:
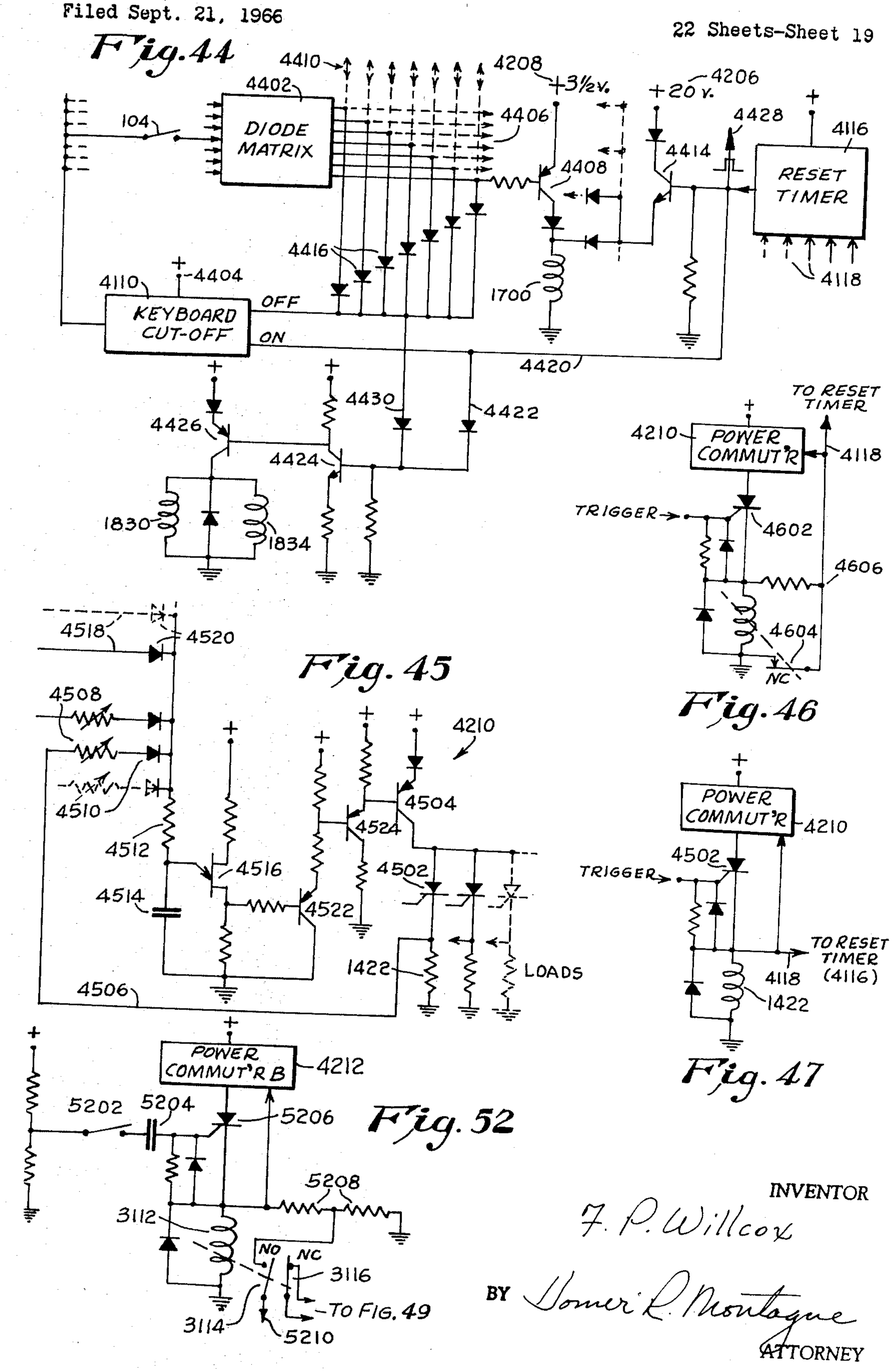

FIG. 44 is a schematic circuit diagram of parts directly associated with both local (keyboard) and remote (code signal) control of the selector mechanism of the machine.

FIG. 45 is a similar diagram of a typical power commutator circuit for momentarily turning "off" and then turning "on" again (momentarily interrupting power circuits completed through silicon controlled rectifiers (or the like) of the machine.

FIG. 46 is a schematic circuit diagram of a "directed" turn-off operation of an SCR substantially immediately upon completion of an operation such as the energization of a magnet.

FIG. 47 is a similar diagram illustrating a "timed" turn-off operation, such as turn-off following (by a preselected interval) a turn-on or energization operation.

Figure 48:
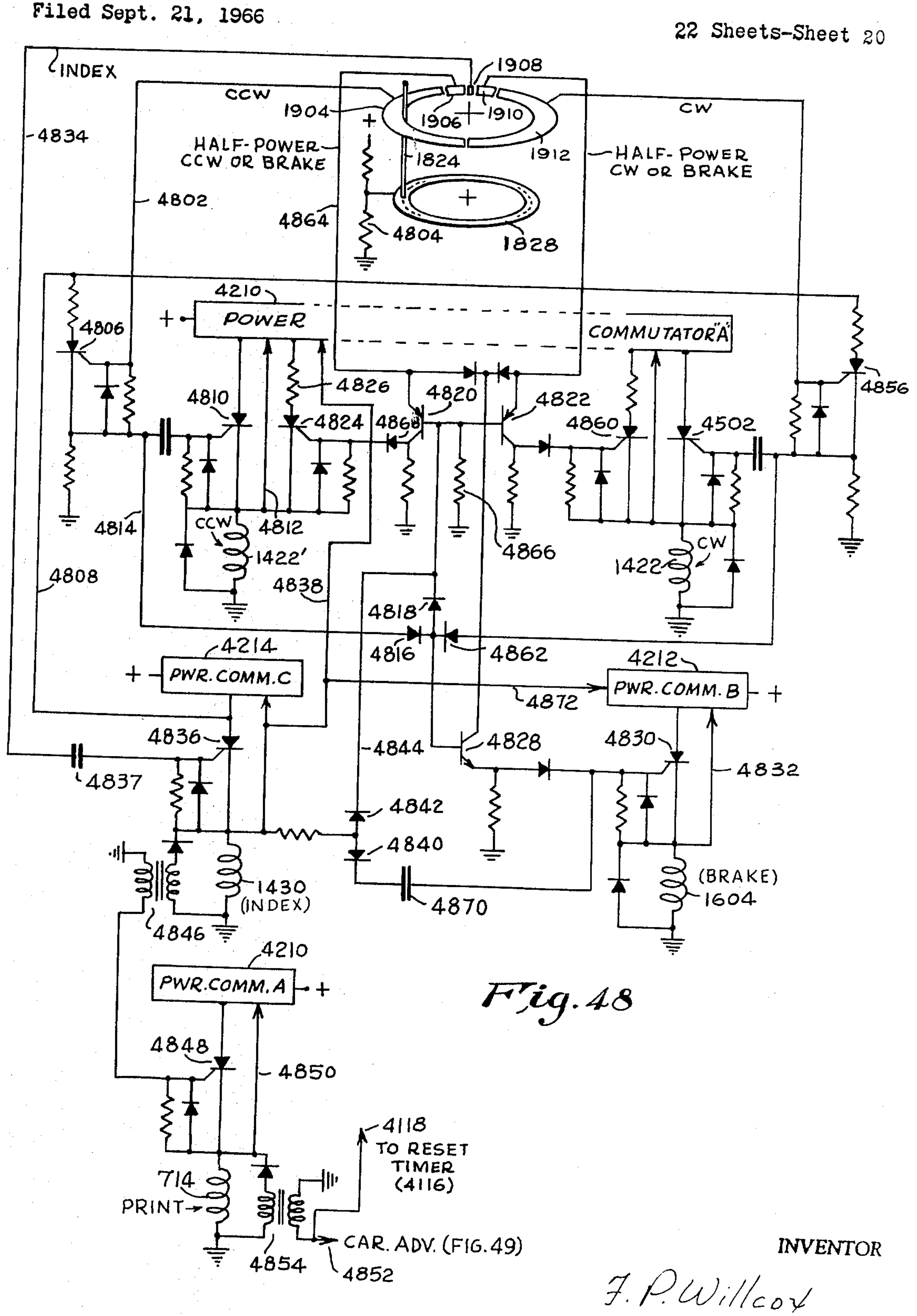

FIG. 48 is a schematic circuit diagram of the control paths associated with the "printing" function operations of the selector, corresponding to the left-hand column of the lower part of FIG. 41.

Figure 49:
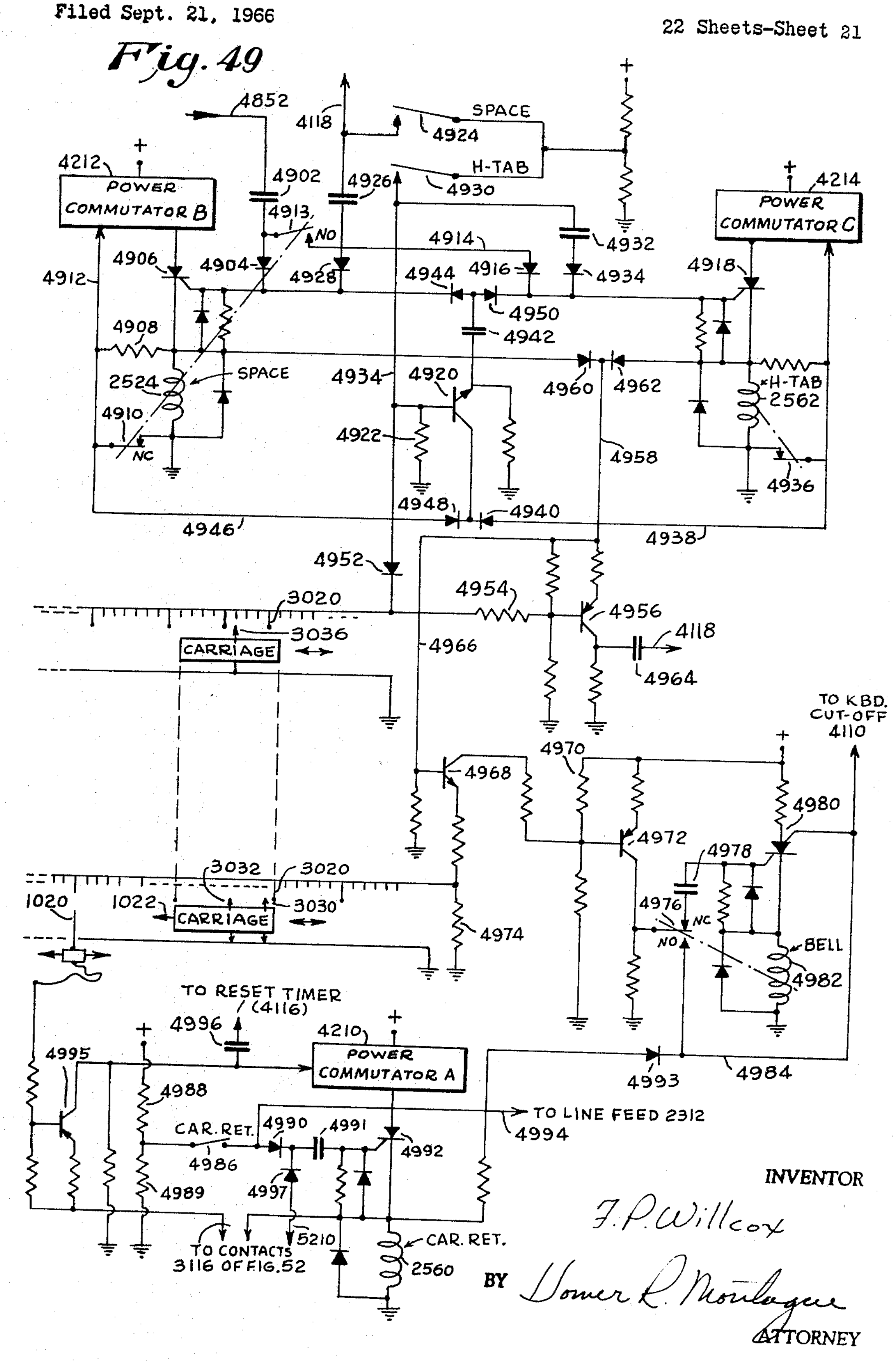

FIG. 49 is a schematic circuit diagram of the control paths associated with certain "non-printing" function operations of the selector, corresponding to the space, H-Tab and carriage return (for example) blocks in the two right-hand columns of the lower part of FIG. 41.

Figures 50, 51:
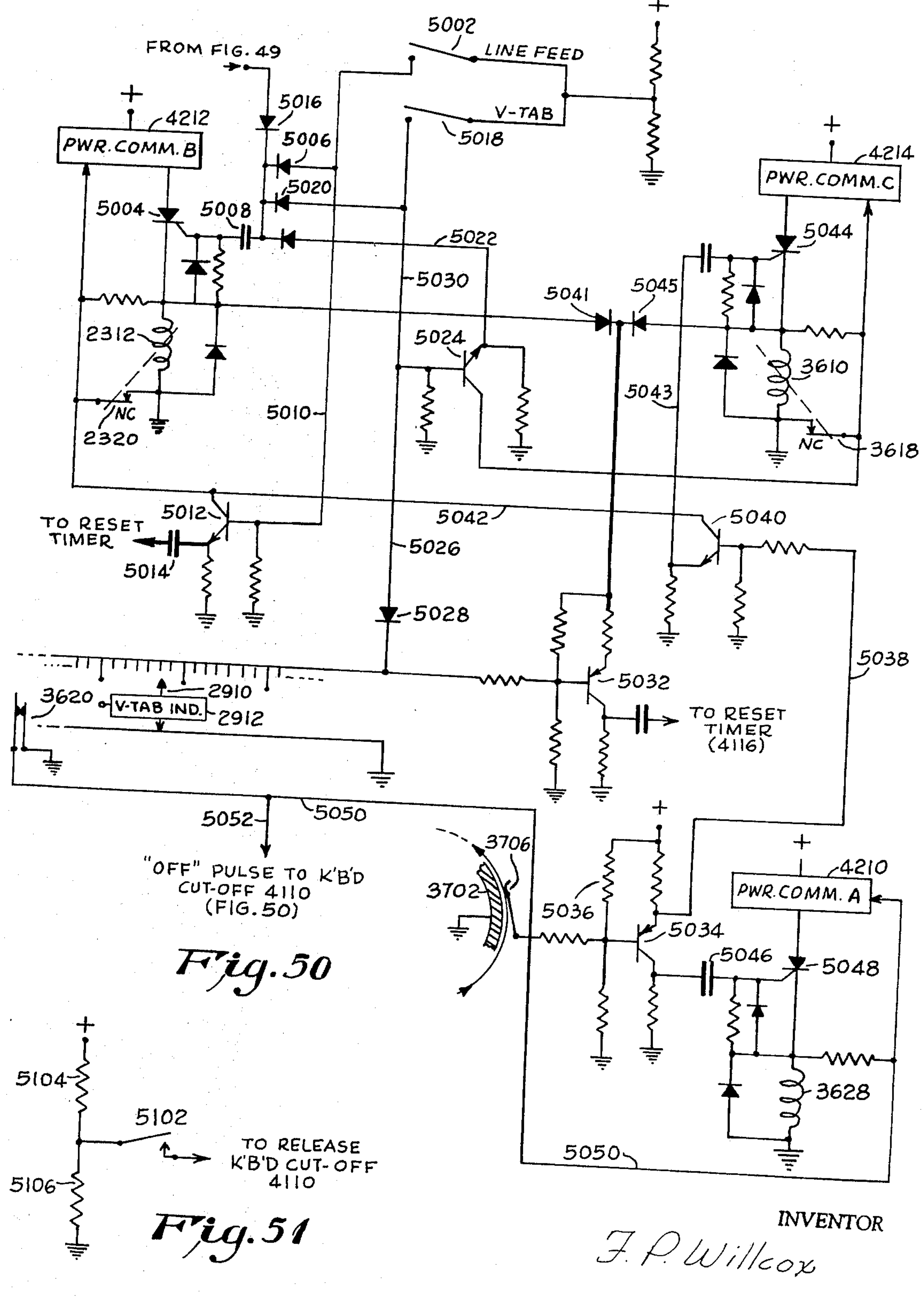

FIG. 50 is a schematic diagram of circuitry associated with the line feed and vertical-tabulating operations called for by the selector mechanism, and those blocks of FIG. 41.

FIG. 51 is a fragmentary circuit diagram illustrating a typical way in which the momentary closure of a particular keyboard contact may provide an "on" pulse to the keyboard cut-off circuit, to override the locking-out of the keyboard control.

FIG. 52 is a fragmentary diagram of circuitry employed during the accomplishment of a "clear-margin" function.

In describing the drawing figures, the same element appearing in various figures is given the same reference numeral throughout. In order to aid in locating an element on the drawings, the reference numeral is formed of a prefix of one or two digits designating the principal drawing figure in which that element appears, followed by a two-digit numeral that designates the element itself. Thus, the element numbered 102 is found principally in FIG. 1 (and perhaps in other figures), while the element numbered 2344 can be found immediately in FIG. 23. Obviously, to maintain the principle of always designating an element by the same numeral, element 2344 may also appear in other figures as well as FIG. 23.

Referring first to FIG. 1 of the drawings, a perspective view of the machine as a whole, in a typical embodiment, is shown, and it will be seen that the general configuration is similar to other known typewriters or printers. Thus, FIG. 1 shows the general outer casing 102 with a slanted forward portion on which appear the usual rows of function and character keys 104, and at either side of the main keyboard lie auxiliary device or other function keys indicated by numerals 106 and 108. The usual space bar 110 is also present at the front of the keyboard.

In the embodiment shown in FIG. 1, and principally throughout the specification, the paper supporting elements are relatively stationary, and the progression of imprints along the writing line is attained by the use of a movable printing carriage assembly. This assembly is designated as a whole in FIG. 1 by numeral 112, and moves back and forth horizontally along a line parallel to the paper-supporting platen 114. Usual guide and hold-down rollers 116 are provided on a longitudinal bar to hold the impression paper 118 against the roller or platen (a non-roller variant will be described herein), and paper is fed through the machine by the operator by turning knobs 120, 122 (or under remote control as will be described).

Figure 2:
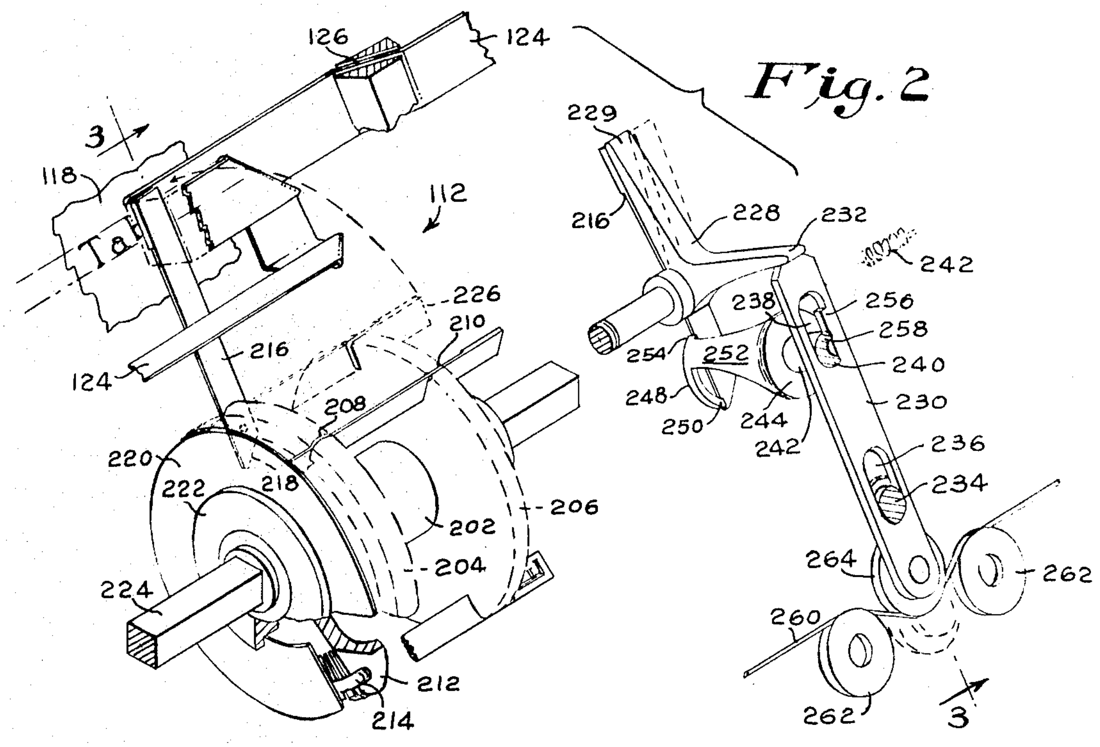
FIG. 2 is an exploded fragmentary perspective view of the preferred font spool configuration and disposition, with its support and the mechanism for swinging out a selected type element and for impacting its type face against the impression paper.

The type face elements of the machine are impacted against the impression paper to form the imprints of characters, and for many purposes the impression paper will be of pressure-sensitive type which does not require the use of an inked ribbon between the type face and the paper. In other applications, as where superior imprint quality is desired, a ribbon will be employed, and such is indicated in FIG. 2 at 124, being supplied from a supply roll at the right side of the casing, and proceeding to the printing assembly leftwards. Adjacent or slightly in advance of the printing point, the ribbon jogs toward the impression paper (at 126) through a guide carried by the printing carriage assembly, moves past the printing point, and loops around a guide into a path which brings it away from the printing point at a lower level, whence it passes along a horizontal path indicated at 128 and thence passes into a take-up arrangement housed in the left side of the machine casing.

This is one preferred arrangement by which the entire extent of a line which has been printed is rendered constantly visible to the operator without requiring the use of a so-called ribbon vibrator which in a standard typewriter drops the ribbon away from the printing line after each character has been impressed. Other ribbon feeding and take-up arrangements may, of course, be employed as desired.

The upper front portion of the casing 102, above the keyboard, has a pair of longitudinal parallel windows 130 and 132, behind which are visible traveling indicators that indicate continuously to the operator the position of right and left margin stops, and of the printing carriage along the printing line direction, and also the count or number of the line, on a page format, which is being printed. The latter indication is measured from a standard starting position of the impression paper after it has been inserted in the machine, by means to be described. Also visible through these windows are settable indicators which show the operator the positions of "set" stops for purposes of horizontal and vertical tabulating operations. These stops provide for automatic advancement of the printing carriage to a series of pre-set positions along a writing line, as for printing columnar matter, and also provide for automatic line-feed operations to establish a desired vertical format of matter printed on the page.

As will be described below, it is an important feature of the invention that as a preliminary to the use of the machine for reception of code signals, the set positions of all these "stops" may be directed from the remote end of a communication channel, following a necessary clearing of the previously-set stops for some preceding message format. Likewise, the left and right hand margin stops may be set by the local operator, or may be set under remote control in the same general way as the tabulating stops. However, apart from the utility of providing remote setting of these stops and margin settings under received code signal control, the machine, considered purely as a typewriter, is vastly improved by the provision of margins and vertical and horizontal tabulating positions settable from the front (or keyboard) of the machine. This is contrasted with many conventional teleprinters and typewriters, in which the tabulating stops, and often the margin stops, require the operator to perform setting and clearing operations away from the keyboard.

To the left and right of the indicator windows 130 and 132 are shown indicator or pilot lights such as 134 for various purposes, and to be described below.

FONT AND PRINTING MECHANISM

FIG. 2 shows in exploded perspective view the major components of the printing font and impacting assembly, which were designated as a group by numeral 112 in FIG. 1. This entire assembly moves horizontally along the writing line, but the carriage itself is omitted from FIG. 2 in the interest of a clear showing of the novel font and impacting arrangement. Thus, the font unit comprises a spool-shaped member having a central hub or sleeve 202 and at opposite ends thereof the flanges 204 and 206. Both the flanges are radially slotted for short distances inward from the periphery, as indicated at 208 and 210, and the left hand flange 204 has an enlarged rim section 212 which contains a semicircular groove 214 receiving a short pivot pin integral with each type arm element 216. The type arms are made of flexible metal or other suitable material, and are normally stored edgewise in the slots 208 and 210, with their pivot pins in the groove 214 which intersects the slots of flange 204. Each type arm element is cut off at an angle as indicated at 218, providing a relatively narrow point at its left end, and the type elements are held with their pivot pins in the groove 214 by the pressure of a resilient or springy disc 220 secured to the hub 202 (or flange 204) as by a collor 222. The entire type font spool is slidable along a non-circular shaft 224 that parallels the platen roller and the writing line, the shaft being shown as of square cross-section and the hub having a mating bore.

When a given character is to be printed, the shaft 224 is rotated (by means to be described) into a position placing the selected type arm at the angular position denoted by numeral 226 with reference to the platen, and that type arm is then caused to pivot up to the full-line position of FIG. 2, after which it is pressed against the impression paper (or against a printing ribbon if such is employed) to make the imprint, and thereafter the type element is again swung down to the stored position defined by the slots in the flanges. Thus, during the rotational motion needed for character selection, the moment of inertia of the type spool is at a minimum, as desired for maximum selection speed. It is to be noted that since the type face occupies a flat end surface of each type arm, the width of the character selected does not control the angular spacing of the type arms or their slots. For a 90-character font (which is adequate to make unnecessary any shifting as between capital letters and small ones, for example), the slots will all be spaced at the same angle of 4 degrees from one another.

The square shaft 224 carries only the weight of the font spool assembly, but acts principally to control the angular position of the spool. The horizontal alignment of the spool is controlled by a bearing unit in a side arm of the carriage frame (omitted from FIG. 2), and the carriage frame also is the support for type arm impacting means, which is in the form of a crank 228 pivoted in the carriage frame so that its upper end 229, when moved from the dashed-line rest position to the full-line printing position, flexes the type arm toward the platen, and forces the type face against the paper, or ribbon if such is employed. This rotation of the crank 228 is produced by the upward motion of a slide 230, whose upper end engages and raises the tail portion 232 of the crank.

Reciprocation of the slide 230 is guided and limited for both directions of travel by a pin 234 fixed on the carriage frame, operating in a slot 236 of the slide. An upper slot 238 surrounds a portion 240 of the shaft 242 which journals on the carriage frame a type-arm operating element 244, normally urged clockwise in FIG. 2 by a coil spring 246. The position shown is one in which the type arm element 216 is being printed, it having been raised from its stored position in the spool slots so that it lies in front of the upper arm 229 of the crank 228. This rotation of the type arm results from the action of the arcuate segment formation (nearly a half ring) 248 integral with and at the platen-facing end of operator 244. This ring segment is concentric with the pivot pin of the type arm when the latter has been brought ot selecting position by rotation of the font spool assembly, and the counter-clockwise quarter-turn of the semicircular formation brings its lower extremity 250 into engagement with the projecting tip of the type arm to the left of its pin axis and turns it to the full-line position as shown, with the body of the type arm in front of the impacting or pressing arm 229 of the crank 228. The operator 244 is hollow for the most part, only so much of its sleeve-like body being retained as to provide the half-ring formation 248 as described. In particular, the remaining web portion 252 has edges suitably curved as to clear the assembly of type arms in the type spool throughout the rotation of the operator 244 (and throughout the rotations of the spool assembly during character selection). When operator 244 is allowed to return a quarter-turn clockwise under the tension of spring 246 after the imprint has been made, the upper extremity 254 of the half-ring formation engages the edge of the type arm above its pivot pin and pivots the arm back into the spool slots, ready for a new selecting motion of the spool.

The rotation of operator 244 as above described is also caused by the upward sliding motion of slide 230, but slightly in advance of the instant at which the slide produces the type-pressing action of crank 228. The upper semicircular portion of slot 238 is sized to receive the shaft portion 240 of the operator's stub shaft 242 when the slide is lowered. This shaft portion 240 is shaped in the region of the embracing slide, to provide a cam section so that as the slide rises, a projecting portion 256 of the slot 238 engages a rounded portion 258 of the cut-away or cam section of the shaft, rotating the shaft and the operator substantially 90 degrees, counter-clockwise, as described above. During the remainder of the slide's rising motion, the narrow portion of slot 238 locks the operator 244 (and the type arm 216) in the position shown, holding the selected type arm ready for the operation of the printing impression crank 228. After printing, the slide is lowered, and the operator is allowed to return clockwise when the cam section 240 clears the projection 256, thus returning the type arm element into its stored position in the spool slots.

The rising motion of slide 230 can be obtained in various ways, and in the form detailed in FIG. 2 is accomplished with a minimum addition of weight to the printing carriage assembly, by means of a jerk wire or cable 260 extending between the side frames of the machine, forward of and parallel to the platen. This arrangement will be detailed later, but for the present it is shown as including a pair of pulleys 262 mounted on the carriage (and freely rotatable thereon), and a rotatable pulley 264 mounted at the lower end of the slide 230, these three pulleys guiding the jerk wire idly so long as its tension is insufficient to overcome the downward force of the slide resulting from the pressure on its upper end of the tail portion 232 of crank 228. The latter is urged to non-printing position (dash lines in FIG. 2) by a spring to be illustrated in a subsequent detail drawing. Thus, when the jerk wire ise relatively loose, and only taut enough to maintain its position as it passes from between the pulleys 262 and 264, the slide 230 is kept in its lower position.

The carriage being held stationary at the next printing position, tightening of the jerk wire (by means to be disclosed below) causes the pulley 264 to be raised to the full line position of FIG. 2, and the upward motion of slide 230 results. By this arrangement, the power means for operating the slide need not be mounted on the printing carriage, so that a faster carriage motion can be attained. In a variant arrangement to be described, however, an operating magnet for slide 230 may be mounted directly on the printing carriage.

Figures 3, 4:
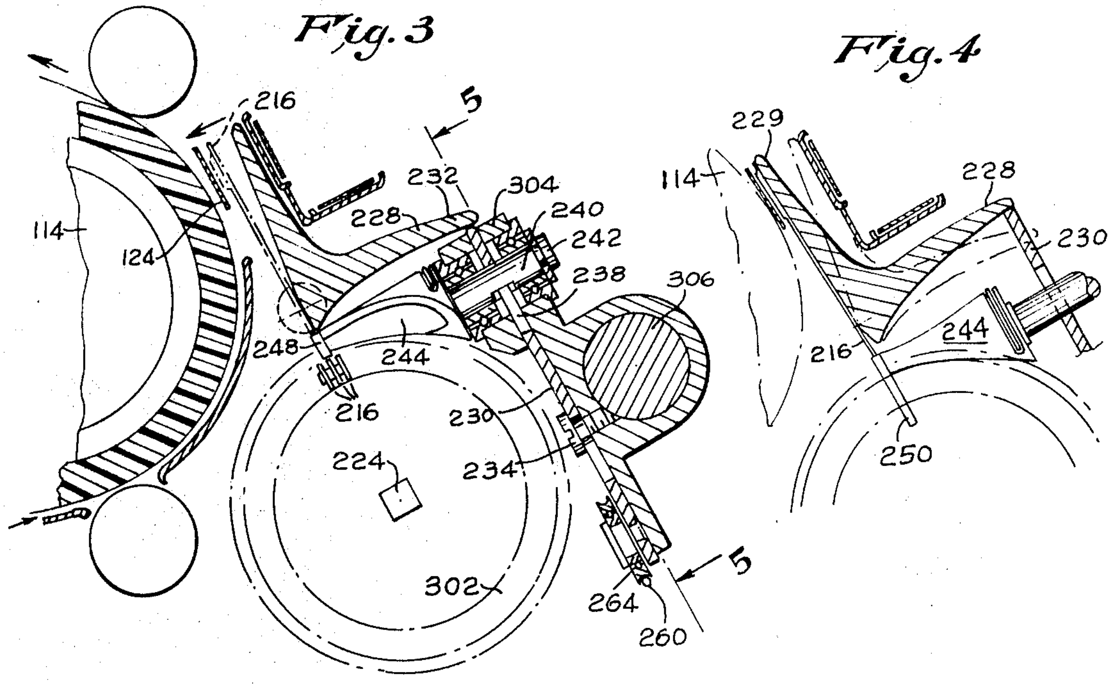
FIG. 3 is an axial fragmentary sectional view of the font spool, platen, type arm positioning means and ribbon guides and associated parts, taken substantially on line 3—3 of FIG. 2.
FIG. 4 is a similar view showing the parts at the instant of imprinting.

FIGS. 3 and 4 are sectional views detailing the construction of parts described above, the views being taken in a section plane transverse to the platen 114 and through the printing carriage assembly. In FIG. 3, the type font spool position is indicated by dotted lines at 302, but the tail ends of three of the type arms 216 are shown in full lines. Chain lines also indicate the position of a particular type arm after it has been swung up into printing position with its upper end aligned with the ribbon 124 relative to the platen and the impression paper. However, the operator 244 in FIG. 3 is shown in position just before its end 248 rotates one of the type arm elements. The operator is shown as journaled by means of ball bearings in a boss 304 of the printing carriage, the cut-away portion 240 of the shaft passing through slot 238 of slide 230 which is guided in a suitable guideway of the carriage. The carriage assembly is shown as mainly supported by a longitudinal guide rod 306 which runs transversely of the machine (forward of platen 114).

In FIG. 4, the parts are shown at the instant of printing, slide 230 having rotated operator 244 so that its tip end 250 has rotated type arm 216 (now shown in full lines) to bring its type face between the upper end 229 of the crank and the marking ribbon. Also, the upward motion of slide 230 has turned the crank 228 so as to impact the type face against the ribbon, and the latter against the impression paper on the platen.

Figure 5:
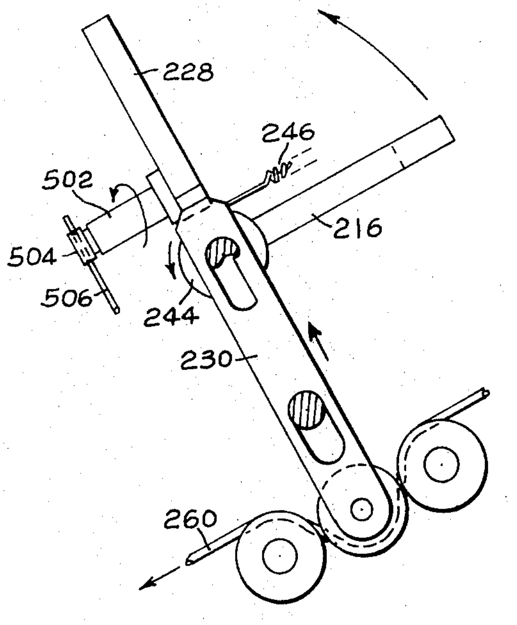
FIG. 5 is a sectional view looking at the front of the type carriage, and taken substantially on line 5—5 of FIG. 3.
Figure 6:
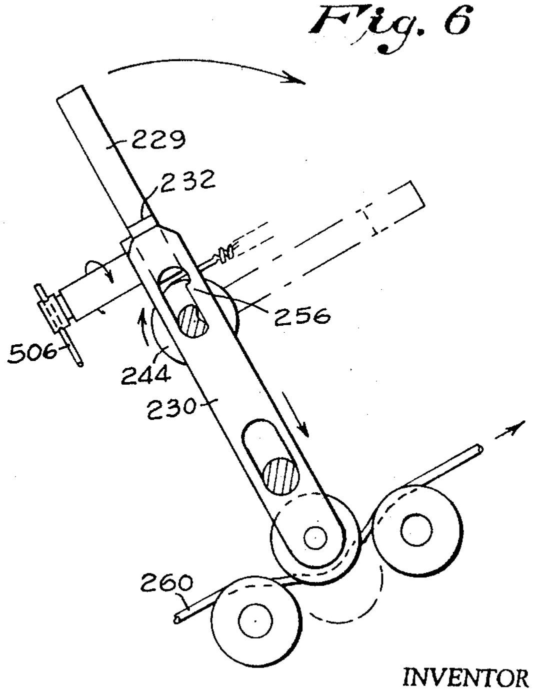
FIG. 6 is a view looking in the same direction as FIG. 5, but showing the parts as in the FIG. 4 position.

The corresponding stages of the slide, cam and impression crank are shown in FIGS. 5 and 6 respectively. In FIG. 5, the jerk wire 260 is relatively loose, slide 230 is in its lower position, spring 246 is urging the operator 244 to its clockwise position, and type arm 216 is stored in the spool slots (not shown in this figure). In FIG. 6, the wire 260 has been tightened, raising the slide so that its projection 256 has rotated operator 244 counterclockwise rotating the type arm to printing position, and finally striking the tail 232 of the impression crank.

FIGS. 5 and 6 also indicate, at 502, the pivot shaft for the crank 228, the same being journalled in the carriage body and having a projection end 504 through a transverse hole of which extends a restoring spring 506, normally tending to hold the tail 232 of the crank against the upper end of slide 230, and thus biasing the latter toward its FIG. 5 position.

OFF-CARRIAGE IMPRINTING DRIVE

Figures 7, 8:
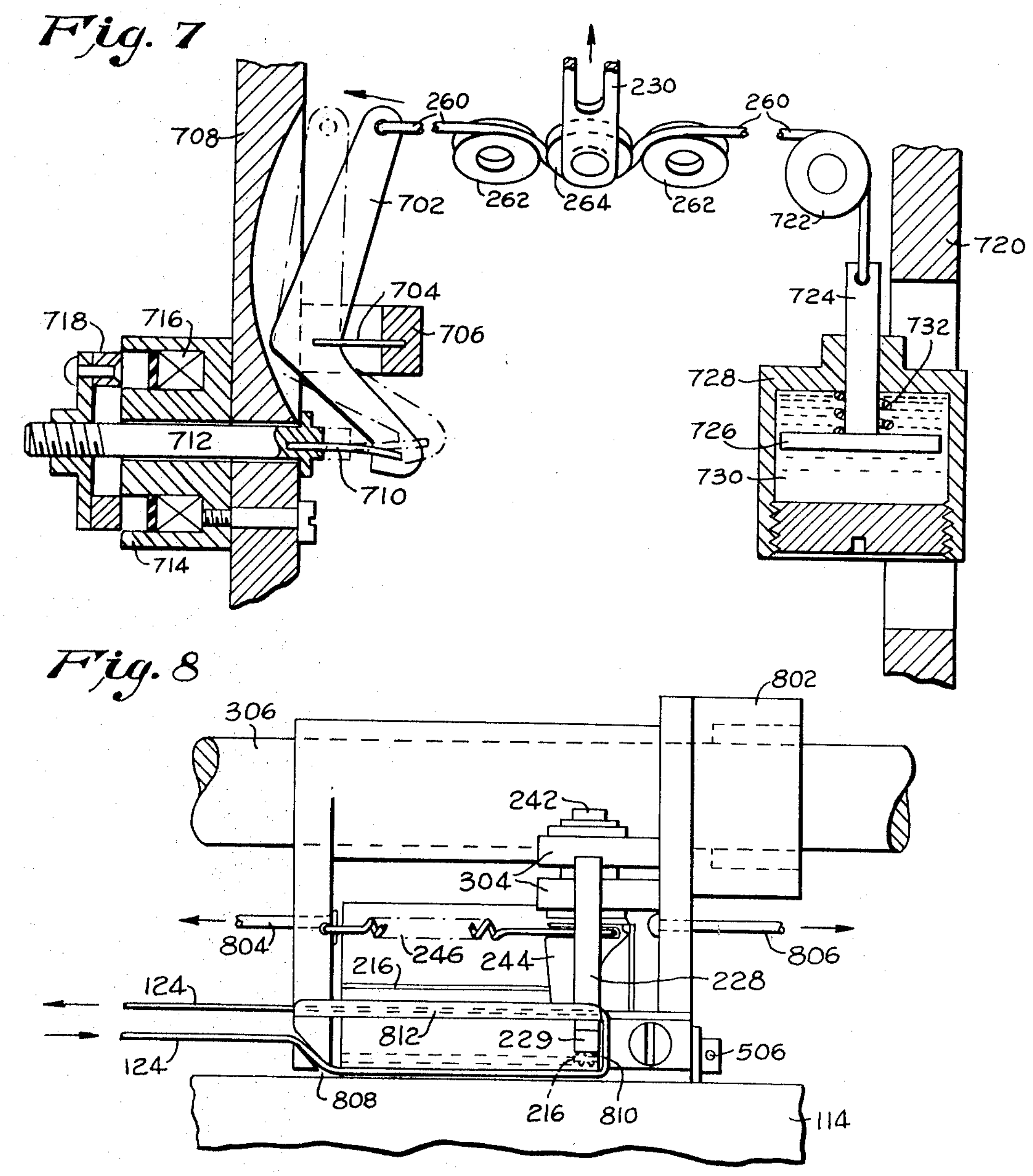
FIG. 7 is a schematic sectional view illustrating the way in which the type-arm swing-out and the impacting bar of FIGS. 2–6 are operated by off-carriage magnetic power means.
FIG. 8 is an enlarged fragmentary view of the printing carriage assembly, looking at it from above, and illustrating one form of ribbon guide.

FIG. 7 shows in sectional schematic form a preferred arrangement for operating the jerk wire 260 to produce the actions described above, for any position of the printing carriage assembly. In this figure, the left end of the jerk wire 260 is secured to one arm of a crank 702 pivoted by a leaf spring 704 secured to a bracket 706 which is attached to a left side frame plate 708. The lower end of crank 702 is secured by a leaf spring 710 to one end of a rod 712 passing through plate 708 and through the cupped body of a magnet 714 containing the ring winding 716. At its outer end, rod 712 is secured to the annular armature 718 of the magnet, so that when the winding is energized, the magnetic annulus 718 is pulled into the body of the magnet, forcing rod 712 to the right and pivoting crank 702 counter-clockwire to the position indicated by chain lines, thus pulling on wire 260 and elevating slide 230 as already described.

To provide smoother operation of the jerk wire, its right hand end (which could, if desired, be solidly anchored to the right side machine frame plate 720) is passed around a fixed pulley 722 and connected to the piston rod 724 whose piston 726 lies within the chamber of a compensating device filled with a viscous material 730 such as a silicone putty or heavy liquid, for long-term compensation for temperature changes or cable stretch. The chamber is closed by a suitable plug, and a coiled spring 732 surrounding the inner end of a piston rod 724 maintains a steady rest position and thus keeps a suitable relatively low value of tension in the jerk wire 260.

CARRIAGE PLAN VIEW

FIG. 8 shows in fragmentary plan view parts of the printing carriage assembly slidable along hte guide rod 306. The orientation is as though the viewer were standing over the machines and looking downward from the back of FIG. 1 along a direction tangent to the platen 114 at the writing line. The parts already described will be recognized from the reference numerals repeated in this figure. In addition, there is shown the dashpot cup 802 secured to the carriage about rod 306 for a purpose to be described below, as well as a pair of cables 804, 806 secured to the carriage assembly and by which it is caused to traverse back and forth along the guide rod 306. In this figure, a variant of the ribbon guide is illustrated. As in the form previously prescribed, the ribbon 124 passes to the carriage and through a guide slot 808 in a carriage frame member so as to be jogged into a path lying close to the platen 114. Thence it passes at 810 around the upper end 229 of the impression crank 228, by way of an end-guide portion 810, and loops back along guide 812 to lead the ribbon away from tbe printing carriage back toward the same direction from which it arrived.

ON-CARRIAGE IMPRINTING DEVICE

Figure 9:
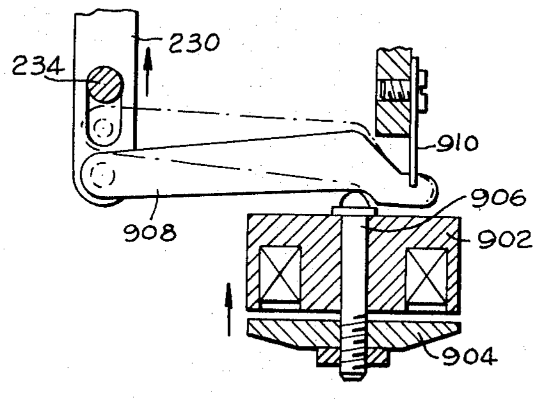
FIG. 9 is a fragmentary sectional view showing an alternate arrangement of a magnet carried on the printing carriage for operating the type-arm swing-out and the impacting bar.

FIG. 9 illustrates schematically an alternate means for operating the slide 230, in place of the jerk wire arrangement of FIG. 7. In this modification, a pot magnet 902 is secured directly on the carriage frame and has a movable armature 904 whose guide pin 906 operates a lever 908 pivoted on the carriage frame by a leaf spring 910. The opposite end of the lever is pivotally connected to the lower end of slide 230 so that upon energization of magnet 902, the slide produces type arm rotating and impression crank rotating movements in the same way as already described. This modification, however, entails some increase in the total mass that is associated with the printing carriage.

GENERAL MECHANISM ARRANGEMENT

FIG. 10 of the drawings shows in front elevation the main parts of the machine as they would appear if the major portion of its outer casing 102 were removed; only small segments of the casing 102 are indicated in FIG. 10, just within the paper freed knobs 120 and 122. The orientation of parts already described will readily be recognized from the indicated positions of the platen 114, paper rollers 116, and main carriage guide rod 306. Additionally, this figure shows one of the printing carriage side rails 1002 extending downward to embrace, by a bifurcated end, a second guide rod 1004 also mounted between the end frame plates 708 and 720. The guide rod 306 carries the entire weight of the printing carriage and font spool, rod 1004 constraining the angular position of the carriage, leaving the square shaft 224 free to perform its character selecting function at maximum speed.

To the left of side frame 708 is disposed the drive mechanism 1006 forf the square shaft, and the jerk wire magnet 714 which was described in connection with FIG. 7. Also, to the right of side frame 720, there is indicated the selector mechanism 1008 which controls the drive mechanism 1006 and performs many other machine functions, to be described below.

FIG. 10 also shows a simple form of adjustable left marin stop for establishing a fixed starting point for each printed line. This comprises a dashpot cup 1010 encircling guide rod 306 and adjustably fixed in position therealong, at character spaced intervals, by a pin 1012 having a detent end engageable with dimples 1014 along the rod. The dashpot cup 1010 fixes the left margin position that results when its mating dashpot cup 802 (fixed to the printing carriage) is fully received therein. It will be noted that the central portion of cup 802 is cut away as indicated at 1016, to leave only a relatively thin outer annular wall to operate as one of the pistons of the duplex dashpot unit. Likewise, cup 1010 is solid except for the annular recess 1018 sized to receive the solid outer ring of cup 802. This arrangement provides a double air leak (complementary concentric pistons) which gives very smooth deceleration of the printing frame assembly at the end of its leftward (carriage return) movement. To provide a control circuit that is effective when carriage return movement has been completed, the cups are provided with electrical contacts 1020 and 1022 which become engaged when the cups are fully telescoped one within the other.

FONT SPOOL DETAILS

Figure 11:
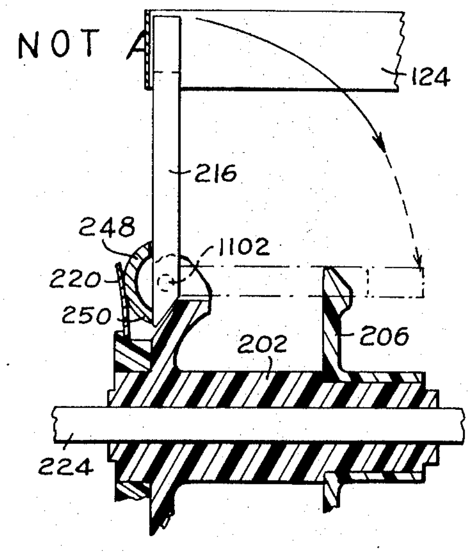
FIG. 11 is a fragmentary sectional view taken through the type font spool, with a type arm element shown in full lines in imprinting position.

FIGS. 11 and 12 are axial sectional views which further clarify the construction and operation of the type font spool. In FIG. 11, the type arm 216 is shown in printing position in solid lines, its upper end having passed into the loop of ribbon 124 when the ring segment 248 of the operator 244 was rotated a quarter turn counter-clockwise. This figure shows how the lower tip 250 of the half-ring has pivoted the type arm about its pivot pin 1102 held in the circular groove 214 (see FIG. 12). Also, FIG. 11 shows how the lower tip has been forced down away from the edge of the spring retaining disk 220, which continues to rest against and stabilize the tips of the majority of the other type arms, particularly those at the bottom of the spool which might otherwise pivot down due to their own weight. Of course, since at this time the font spool is at rest, there are no centrifugal forces tending to throw the arms outward, as is the case when the spool is being rapidly rotated during character selection. When ring segment 248 is rotated clockwise a quarter turn after the selection character has been printed, type arm 216 is restored to its storage slot in flange 206 as is indicated by the directional arrow in FIG. 11.

FIG. 12 shows the parts as they lie after restoration of the previously used type element, or in preparation for selecting another type element 216'. Ring segment 248 is in its rest position out of contact with any of the type elements in the spool or cage, so that the rotation of the square shaft 224 can make the new character selection without there being any restraints on the type font spool other than that provided by its ball bearing 1202 in the printing carriage frame arm 1002. The spool is axially aligned by its right end bearing against a carriage frame side 1206, and a slide-guide sleeve 1203 pressed into the inner race of the ball bearing 1202. FIG. 12 also details the way in which the stub axle 502 of the impression crank (broken away in this figure) is mounted in the same carriage side arm, with its return spring 506 anchored to the arm by a screw 1204. In addition, FIG. 12 shows the slot 808 in the opposite printing carriage side arm 1206, which slot jogs the incoming ribbon 124 to a position close to the impression paper. Finally, the figure shows the left-hand edge of the ribbon guide, at 810, which guides the ribbon around the printing element and forms a positive locating stop for the type arm in its up-swung printing position. A screw 1208 secures the ribbon guide to the carirage frame 1002.

FIG. 12–A is a perspective view of the formed metal guide 810 of FIG. 12, held on the printing carriage by screw 1208 and another screw at 1210 in carriage side arm 1206.

FIG. 13 shows a portion of the type font spool in end view, including the slots 208 which contain the type arms, of which 216 is shown elevated ready for printing. It will be noted that the slots 208 are not truly radial, but are parallel to the radial direction indicated by the chain line, and offset from that radial line one-half of the distance between slots. Thus, the integral pivot point 1102 of each type arm is truly tangent to the circle of pivot pin centers.

FONT DRIVING

FIGS. 14, 15 and 16 show the construction of the combined impulsing, braking and indexing mechanism designated as a unit in FIG. 10 by numeral 1006. FIG. 14 shows the interior of the mechanism, with its housing removed, as viewed from the left side of the machine. Square shaft 224 passes through a square hole in ratchet wheel 1404 which in turn is supported by spaced bearings in bushing 1620 (FIG. 16) the support plate 1402 fixed to the side plate 708 of the printer, and is fixed to the toothed wheel 1404 by passing through a square bore in the latter; its end extends through a second bearing in the bracket 1406 secured to an upstanding flange 1408 of plate 1402.

To avoid wear at pivots, the toothed wheel is driven by drive pawls which employ only flexure hinges. The pawl for clockwise rotation of shaft 224 is numbered 1410, riveted at 1412 to a leaf spring 1414 fastened to flange 1408 by a screw 1416. The leaf spring pawl tooth 1418 is riveted to a second flexure hinge 1420 in turn riveted to the free end of the pawl body, these parts being so shaped that when the pawl is at rest, its position against flange 1408 places the tip of tooth 1418 against a fixed stop and just clear of the toothed wheel. A pot magnet 1422 mounted on the flange 1408 has an armature 1424 connected to a plunger 1426, so that when the magnet is energized, the plunger tip swings the pawl upward, tooth 1418 sharply impulsing wheel 1404 as the pawl tip leaves its stop and flexes toward the wheel.

The corresponding pawl and magnet parts for counter-clockwise rotation are shown at the right of FIG. 14 with primed numerals, and the pawl in mid-stroke position, at the end of the powered phase; tooth 1418' having impulsed wheel 1404 and being ready to disengage by reason of its inertial overtravel and to move away, as indicated at 1428, to the final operated position of the pawl. Either pawl and magnet is capable of impulsing the wheel (and shaft 224 and the font spool) through a full turn at high speed, although for bidirectional shortest-distance operation, only slightly over half a turn is ever required. During the return travel of the pawls, the ratchet wheel is held against rotation by indexing means now to be described.

A third pot magnet 1430 operates a plunger which operates an index pawl 1432 (also on a flexure hinge) to engage its toothed end with the wheel, to stop the same positively in the selected position (in predetermined relation to a braking operation described below) when the specified character of the font spool has arrived at printing position. The firing of magnet 1430 is thus under control of the selector 1008 (FIG. 10) at the other end of shaft 224, as will be described below.

In order to furnish a braking action, preliminary to or concurrently with final stopping and indexing of the wheel 1404, and to absorb the excess energy of the impulsed wheel, an arrangement detailed in FIG. 16 is provided. The toothed wheel 1404 is cup-shaped, and mounted on a leaf spring spider within the cup is a brake armature 1602 whose face lies close to the poles of an annular brake electromagnet 1604 carried in a circular cup 1606 journalled in bracket 1406. A radial arm 1608 extends outward from the cup 1606 (see also FIG. 14) and lies between resilient dampers or bumpers 1610 of rubber or the like. With the shaft 224 and wheel 1404 in motion, energization of magnet 1604 attracts armature 1602 into frictional engagement with the magnet poles, in cup 1606, seizing the armature and dissipating the kinetic energy by imparting torque to the magnet and cup, rapidly braking the wheel motion. This energy transferred to the magnet and the cup is ultimately dissipated by viscous friction in the high-hysteresis damper material 1610. The brake electromagnet will be energized either concurrently with or just prior to energization of the index magnet 1430.

The bearing 1612 of circular cup 1606 (which has a hollow shaft extension 1607 retained in bearing 1612 by snapring 1613) is threaded in arm 1406, as shown, to permit precise axial air-gap adjustment between the pole faces of magnet 1604 and armature 1602. A set screw 1614 holds this adjustment securely.

FONT CHANGING

An optional knob 1616 may be provided on an end of shaft 224 which protrudes past bearing 1612, to enable the shaft to be slid out enough to free the font wheel for removal. It will be understood that the positive interconnection of shaft 224 and the toothed wheel, for rotation, is provided by a square hole in the latter which slidably fits the shaft for easy movement therealong. As shown in FIG. 16, wheel 1404 is preferably captivated by being mounted directly on a sleeve 1618 secured in the bearing structure 1620, so that even complete withdrawal of the shaft leaves the other parts undisturbed. A similar arrangement for cup 1606 is provided by the bearing 1612 as described above.

SELECTOR MECHANISM

A preferred form of selector mechanism (1008) is detailed in FIGS. 17 through 22 of the drawings. The principal function of this device is to respond to binary coded control signals and to prepare circuits for (a) initiating the driving impulse furnished to the font spool in its character-setting rotation, (b) determining the direction (and magnitude) of that impulse required for ensuring proper acceleration, having consideration for the position already occupied by the font spool as a result of a preceding character selection, (c) initiating the braking and indexing functions to bring the font wheel to rest with the desired character in position preparatory to printing, and (d) for non-printing functions, establishing the proper operating circuit as called for by each received non-printing or function code.

The selector also necessarily receives information as to the presently-occupied position of the font wheel. This information is obtained from square shaft 224, which enters the selector housing at a socket 1802 for sliding withdrawal already described. If a received code calls for printing of the same character as before, the selector omits the drive impulse and the braking impulse, merely energizing the indexing magnet 1430. If a different character is called for, the selector determines which impulse drive magnet 1422 or 1422′ is to be energized to drive the font wheel through the smaller of the two possible angles to bring the new character into position. When the rotation required of the font wheel is small (i.e., the new character is close to the one previously selected) the selector molulates the amplitude of the drive pulse to the magnet to avoid overshoot and unnecessary braking. When the full driving impulse is required, the selector senses the approach of the driven font wheel to its desired final position, and applies the braking effort at the proper time in preparation for final indexing at the selected position.

Referring to FIGS. 17 and 18, the former is an end view of this form of selector with its cover (indicated in dash lines in FIG. 18) removed. In the outer annular space of the cylindrical casing are mounted a plurality, here seven, of code operated magnets 1700, 1702, 1704, 1706, 1708, 1710 and 1712, which are duplicates of one another so that a description of one of them will suffice to explain the structure. Thus, magnet 1712 is shown in its released condition, the armature 1716 being spaced from the magnet poles. The armature is secured to an intermediate point on a radial leaf spring 1718 whose outer end is secured to the casing wall, and whose inner end engages in a rounded slot in the periphery of a code ring 1720. There is a leaf spring and a code ring for each of the code electromagnets, the code rings being stacked one above another and surmounted by a fixed guide ring 1722. The leaf springs are adjusted so as to move the respective code rings normally to a rest position, and when the armature of any spring is attracted to its pole pieces, the spring shifts the corresponding code disc or ring through a small angle. This action causes (for each combination of released magnets) the establishment of a single clear channel through edge notches provided in each ring.

Turning now to FIG. 18, the parts described above are indicated by the same numerals in the upper (enlarged) cylindrical portion 1801 of the casing, which is *shown* supported by a reduced-diameter lower cylindrical section 1804 which has a threaded extension 1806 passing through an insulating bushing 1807 so as to mount the whole selector unit on the machine side plate 720, as by a nut 1808. A ball bearing 1810 fixed in this extension carries the socket 1802 which slidingly receives the end of square shaft 224. The inner end of socket 1802 is connected by an insulative bushing 1812 to rotate the shaft 1814 which extends into the upper casing section and carries a commutator or rotor 1816 of plastic or similar insulating material. A reduced-diameter portion of this rotor 1816 carries insulated slip rings such as 1818, each cooperating with a wire-like brush pair 1820 better seen in FIG. 17 as fixedly mounted in the upper casing portion.

The larger-diameter lower portion of rotor 1816 has a downwardly-facing cupped construction (FIG. 18) within the rim of which are mounted a pair of commutator elements each consisting of a segmented ring such as 1822 of wire or other conductive material, each segment being connected to a corresponding one of the slip rings 1818 mentioned above as by wires that pass through or around portions of the rotor. Within the cup portion of the rotor, there extend the upper ends of a multiplicity of resilient stiff conductor wires 1824 of iron or other paramagnetic material, the lower ends of these wires being secured at equally-spaced angular positions around the outer edge of a mounting disc 1826 attached to the annular plate 1828, or both 1826 and 1828 may be suitably secured to an upward extension of the cylindrical section 1804. In the case of a selector for a 90-character font, there will be a magnetic wire 1824 spaced each 4 degrees around the circle.

The magnetic wires 1824 are so adjusted that their upper tips lie normally just out of contact with the commutator segments 1822 because the wires are normally, in the absence of energization of any of the code magnets, held away from the commutator segments by the inner peripheral rims of the code discs. However, the springiness of the wires biases them outward, towards contact with the commutator segments, when any combination of shifted code discs provides a clear channel alongside a selected one of the magnetic wires. Thus, when an incoming code group has been utilized to release selected ones of the code magnets 1700–1712, the combination of binary coded peripheral slots in the code discs will provide a single clear channel (extending parallel to the axis of shaft 1814) through all of the disc edges. A central electromagnet 1830, having annular pole faces adjacent the array of wires 1824, is energized to attract, and to hold away from the code discs and the commentator segments, all of the wires during periods when an incoming code is being set up in terms of code disc shifts, and is later de-energized to release all of the wires, of which one only can then spring into a clear channel along the discs, and contact the commutator segments.

The annular plate 1828 also has secured thereto a plurality of similar magnetic-material spring wires 1832, the upper ends of which similarly cooperate with code notches or slots in the outer edges of the same code discs. These wires are biased inwardly so that a selected one will fall into a clear channel on the outside of the ring array, when the annular segmental electromagnet 1834 is de-energized. The upper tips of the wires 1832 are disposed adjacent hooked contact wires 1836, mounted on an insulative block 1838, so that a particular selected contact will be made depending again upon a non-printing (function) code set up by the code disc magnets 1700–1712. The use of seven binary code discs provides a possible 128 combinations, of which 90 may be employed for character selections by wires 1824, and the remainder for non-printing functions selected by wires 1832 (here shown as fifteen in number, although not limited to this number).

It will be noted that apart from the extremely small angular motions of the armatures of the code magnets, the armatures of the reset magnets 1830 and 1834, and the wire tips, the only moving part within the selector is the rotor 1816, whose motion is retarded only by the bearing friction, that due to the slip ring brushes 1820, and, on occasion, the friction due to contact of a single tip of a wire such as 1824 with the commutator segment. Thus, there is very little resistance to the impulses provided by the drive mechanism 1006 for shaft 1814 and its connected square shaft 224, and extremely high speed selection is obtained.

The arrangement of the code discs, contact wires and commutator segments is shown more clearly in FIGS. 19 through 22. In FIG. 19, the particular uppermost code disc (annulus) 1822 is indicated as shifted the binary distance to the left, as though only code magnet 1712 of FIG. 17 were de-energized; "left" here means counter-clockwise in both these figures. The particular magnetic wire indicated by numeral 1902 has entered the clear channel established by the binary positioning of all of the code discs, allowing its tip to contact the commutator segment 1904 of the lower row of segments. The circuit established by this connection ultimately controls the drive impulse magnet (1422' of FIG. 14) to impart a full-power counterclockwise impulse to the square shaft 224. To the right of segment 1904 in FIGS. 19 and 20, the other segments are designated 1906 (controlling the braking magnet 1604 of FIG. 16 and a half-power circuit for the CCW drive magnet), 1908 (controlling the indexing magnet 1430 of FIG. 14), 1910 (controlling the braking magnet and a half-power circuit for the CW drive magnet 1422), and finally segment 1912 which controls the application of full drive power to clockwise drive magnet 1422 of FIG. 14. The angular extents of these segments are indicated in FIG. 20, which also shows the small non-conducting gap 2002 between the segments 1904 and 1912.

Bearing in mind that the commutator segments are rotated as a unit along with shaft 224, and that these segments therefore occupy angular positions about the axis established by the last previous position of the font spool (corresponding to the last character selected), it will be clear that selection of the next character will allow the newly selected wire 1824 to touch a particular commutator segment that sets up the proper circuit either to drive the shaft 224 clockwise or counter-clockwise as required for the least of the two possible angular rotation directions of the font spool, or possibly to choose a half-power impulse for the proper direction. In the case of a repeat of the previously printed character, only the index function will be operative (segment 1908). Also, where a non-printing function is called for by the code received, the commutator segments and the wires 1824 are not involved, but a selected wire 1832 will be allowed to contact the appropriate one of hooked contacts 1836 to set up the proper circuits for that function.

Due to the low tension value in the wires 1824, the contact that is established with the commutator segments is essentially a noisy one, in the electrical sense. As will appear more clearly when the circuit description is reached, this is not a disadvantage, as the appropriate circuit is energized, and kept energized for the proper interval, as soon as any initial current flow across the contact is established, usually within a few micro-seconds after initial engagement. The use of an arrangement of this kind enables substantial savings in the cost of selector, and contributes to the low drag, and hence, the maximum speed at which selection can occur.

FIG. 21 shows from above, in greatly enlarged scale, other details of the mechanism as described above, the dash line position of leaf spring 1718 indicating the slight degree of movement required of the code magnet armatures and the code discs. The movement is limited by the gap width between edges of radial slots 2102 in the upper edge 2104 of an inner annular member 2106 which also provides an outer rim bearing and locating means for the code discs, and which is in effect with the outer remainder of cup section 1801. FIG. 22 also details the slip ring and commutator segments to larger scale, as well as other parts, and in addition shows the use of round-wire commutator segments (with primed numerals) in place of the rectangular strips of FIG. 19. FIG. 22 also illustrates a variant for the operation of the spring wires, a single central pot magnet 2202 having an armature 2204 whose radial arms 2206 (see also FIG. 21) pass between certain pairs of wires 1824 and operate to cause slight axial downward motion of a rigid ring 2208, thus compressing a toroidal elastic tube 2210 so that its lateral bulge (shown in dashed outline) will furnish the force against the wires, both inward and outward, necessary to reset and hold them, between code selections, in the disengaged positions. The ring tube 2210 is suitably supported by a fixed part 2212 bottomed on plate 1828, for example. The commutator rotor is here shown as on a shaft 1814' entering the device from the opposite direction, to avoid interference with the magnet 2202, but the armature plunger could easily be arranged to pass the rotor shaft if desired, as shown in FIG. 18.

LINE FEED AND OFF-LINE CHARACTERS

FIGS. 23 and 24 of the drawings show two ways of providing for either local (keyboard) or remote control of the machine for the purpose of providing subscript and superscript characters. In addition, FIG. 23 shows such mechanism applied to a machine, such as earlier described herein, with a roller platen for supporting and feeding the impression paper, while FIG. 24 shows its application to a machine employing a relatively flat platen (that is, one whose curvature, beneath the writing line, corresponds to a very long radius). The latter embodiment also shows a very simple means for adjusting the fore-and-aft position of the platen (and the impression paper) relative to the impacting type faces.

Looking first at FIG. 23, the orientation relative to other figures will be recognized from the indication at 1006 of the characteristically shaped profile of the font wheel impulsing mechanism of FIG. 14, and the position of square shaft 224 within that outline. The platen roller is again designated 114, and one of the paper bail rollers (FIG. 1) by 116. The center shaft of the platen roller is indicated by 2302, and besides the platen roller, it has secured to it the usual form of line-detent ratchet wheel 2304. Pivoted loosely about the shaft 2302, and lying between the near end of the platen roller and this ratchet wheel 2304, is a control mechanism plate 2306 which can be rotated clockwise or counter-clockwise a slight amount, typically by angles corresponding to some substantial fraction of the character height.

On plate 2306 is mounted a spring 2308 whose outer end has a small detent roller or loop 2310 engaging the teeth of ratchet wheel 2304, and thus performing the usual detent function to maintain the impression paper in correct position for accurate alignment of characters of a line. The spring 2308 is strong enough so that, when the control plate is rotated as described above, it will carry with it the ratchet wheel and the platen 114, moving the impression paper a corresponding amount, and allowing it to be restored to "line-aligned" conditions when the control plate is returned to its centered position.

Line feed movements of the usual variety are performed by a magnet 2312 mounted on plate 2306, and having an armature 2314 as before, the forward end of a rod connected to the armature having the pivoted pawl 2316 urged by a spring into engagement with the teeth of ratchet wheel 2304 when the magnet is energized. At other times, the pawl is retracted from those teeth. Each time the magnet 2312 is pulsed, the platen will be advanced one tooth-space, the drive action being limited as by a fixed stop pin 2318. A contact pair 2320 is caused to open at the end of the stroke upon each line feed operation of the magnet. It will be seen that the foregoing enables line feeds to be accomplished without interfering with the subscript and superscript operations of the control plate as now to be described.

Fixed to a side frame of the machine are a pair of magnets 2322 and 2324, having a common armature connecting rod 2326 to which is affixed, between the magnets slotted yoke 2327 receiving a pin 2328 on one arm 2330 of a crank lever pivoted at 2332 on the same side frame plate. With both magnets deenergized, this crank is maintained at a centered position by a pair of springs 2334 of known construction, and from which centered position it will be moved, in one direction or the other, upon the energization of one of the magnets. The other arm 2336 of the crank lever is connected to a pin 2338 on control plate 2306, and the latter can therefore be tilted, a small angle as described above, in a direction chosen by which of the magnets is energized. A detent arm 2340 is also pivoted on the side frame member, and urged by a spring in the clockwise direction, a pin thereon entering a notch in the end of crank arm 2330, to maintain the crank in its shifted position (against the centering action of springs 2334) by engaging the bevelled edges adjoining the notch. A magnet 2342 is provided on the side frame of the machine, to attract an armature secured to the detent arm 2340, and withdraw the pin from the tail of the crank arm 2330 when desired.

From the foregoing, it will be clear that operation of magnet 2312 will produce an ordinary line-feeding operation, while the platen may be shifted a controlled amount either up or down to permit printing of a suscript or superscript character, by energizing one of magnets 2322 or 2324. A choice of operations is provided, in that if desired, and as descirbed below in connection with the circuitry, the shifted position of the platen may be maintained by detent arm 2340 so that plural high or low characters may be printed before the platen is restored to normal alignment; or, on the contrary, the circuitry could be such that the platen would be automatically restored to centered condition after each high or low character has been printed.

LONG-RADIUS PLATEN

In the modification shown in FIG. 24, the roller platen is dispensed with, and in its place is provided a relatively flat (long radius) platen in the form of a transverse strip of plastic or the like 2402, secured to a backing bar 2404 of rigid material. These parts extend along the printing line position transversely of the machine (note the position of printing arm 216 and the position of the font spool, indicated at 302) and the impression paper is fed between usual paper guides 2406 to the nip between a feed roller 2408 and the usual back-up roller 2410. These parts, as well as a guide roller 116, are all secured between a pair of end plates of which the "far side" one is indicated at 2414. The plates are affixed to the right and left hand ends of bar 2404 and are adjustable about an axis provided by a transverse shaft 2416 eccentrically mounted in the machine side frames, for type face pressure adjustment. A control arm 2418 is an extension of the "near" side and plate (analogous to plate 2306 of FIG. 23) and is centered in the normal writing-line position by respective wire springs 2420, and the arm has a control pin 2422, which, like pin 2338 of FIG. 23, is under the control of a pair of magnets exactly similar to those of the preceding figure. The tail of arm 2418 is shaped just as the tail of crank arm 2330 of FIG. 23, and a detent and magnet like 2340 and 2342 are provided for the same purposes as before. It is considered unnecessary to duplicate these parts, already described, in FIG. 24.

On the "near side" plate corresponding to plate 2414, a line feed magnet just like magnet 2312 is mounted, cooperating with a line feed ratchet wheel and a detent spring, all as already described in connection with FIG. 23, except that the ratchet wheel is affixed to the shaft of feed roller 2408. Functionally, therefore, the FIG. 24 variant operates just as already described, except that it enables a platen strip to be employed which has a much larger radius than in the case of a roller platen, providing a flatter (or even a perfectly flat) impact area for the type faces, and thus making totally unnecessary any cupping of the faces to produce superior printing. The variant also provides a very simple adjustment, by way of the eccentrically mounted pivot shaft, for the positioning of the platen face, and the impression paper, with respect to the type face at the moment of printing impact, and thus to provide superior print quality as well as accommodation for various thicknesses of the impression sheet or sheets.

CARRIAGE MOVEMENT MECHANISMS

FIGS. 25, 26 and 27 are plan views of the mechanisms for advancing the printing frame or carriage (and thereby the type spool) one step at a time as each character (or blank letter-space) is called for, for repeatedly advancing the carriage at higher speed when a considerable carriage advance is required (as for horizontal tabulating motion), for backspacing the carriage a single letter-space at a time when required, and for releasing all of these drives when a carriage return operation is called for.

The mechanism is disposed in the bottom of the machine, beneath the platen and printing mechanisms, as on a base 2502 (see also FIG. 10) and connected to the carriage by the cables 804 and 806 whose opposite ends are secured to the right and left sides of the carriage, passing horizontally toward the right and left sides of the machine, and thence downwardly over suitable idler pulleys such as 2504 and being wrapped about and anchored to a drum 2506 which is secured to a ratchet wheel 2508. A carriage return spring 2510 of the constant tension type, in a spring barrel, is connected to the joined cables at 2512 so as normally to urge the carriage to its leftmost position (thus pulling to the right on the lower pass of the cable as seen in FIG. 25).

Loosely pivoted on the same axis as ratchet 2508 is a control plate 2514 normally urged clockwise by a spring 2516, so that a pin 2518 on the plate strikes a lever 2520 pivoted on the base or mechanism plate 2502, urging it against a stop provided by fixed pin 2522. A space magnet 2524 is affixed to the base, and its armature 2526 is pulled into the magnet winding structure, to the right, when the magnet coil is energized, against the force of a restoring spring 2528. A rod rigid with the armature extends through the right end of the magnet body, and carries a leaf spring 2530 normally urged against the teeth of the ratchet wheel. When the magnet 2524 is energized, the tangential motion of the tip of the leaf spring advances the ratchet wheel slightly more than one tooth space, and when the magnet releases, the ratchet is held against reverse (clockwise) rotation by a pawl 2532 pivoted on the base plate (as shown, on the same axis as a control lever 2534) and urged to the left by a spring.

The control plate 2514 has three fingers 2536, 2538 and 2540 which project beyond the ratchet teeth and in an idle position, as shown in FIG. 25, they do not interfere with the tip of spring 2530, the tip of pawl 2532, or other agencies to be described. However, when the control plate 2514 is given a slight counter-clockwise rotation, these fingers will hold away from the ratchet teeth the spring 2530 and the holding pawl 2532, for example; these are wider than the thickness of the ratchet wheel to make this interference possible. For producing a backward step of the carriage, the control plate will be so rotated when a magnet 2542 (the backspace magnet) is momentarily energized, attracting an armature affixed to lever 2534 so that its long finger 2546 allows pawl 2548 (under the urging of spring 2552) to engage the ratchet wheel. As lever 2534 completes its motion, its short finger 2543 (now in engagement with pin 2544) rotates the control plate 2514 counter-clockwise so that the tips of springs 2530 and 2564 are lifted out of engagement with the ratchet, and holding pawl 2532 is also disengaged. Thus the ratchet can rotate one space in the clockwise direction, allowing the carriage return spring 2510 to move the printing carriage one space to the left. This amount of movement is permitted because, as shown in FIG. 26, the pawl 2548 is pivoted on a short crank 2550 urged by a spring 2554 in the counter-clockwise direction (full lines in FIG. 26), but, when the pawl 2548 is urged to the left as ratchet wheel 2508 engages it, it turns the crank 2550 clockwise to its dotted line position in FIG. 25 which is the full line position of FIG. 26. The spring 2554 is provided for urging crank 2550 counter-clockwise, against a limiting stop 2556. Note the on-center final position of the crank 2550 as the end of its stroke is reached; the increasing tension in spring 2554, acting on the constantly-shortening effective radius, bringing the pawl 2548 and the ratchet wheel to a gentle stop.

While lever 2534 and pawl 2548 are shown as in the same plane in these fiigures, it will be understood that the tip or tooth of pawl 2548 extends downwardly beneath the plane of the lever, so that it can engage the teeth of the ratchet wheel, yet be lifted away from them by the extremity of the lever 2534. During the backspacing operation described, the tips of leaf spring 2530 and 2564 are held away from the ratchet teeth by the fingers 2536 and 2540 of plate 2514. When the backward step of the ratchet is completed (magnet 2542 having been de-energized), the counter-clockwise rotation of lever 2534 returns plate 2514 to its FIG. 25 position, and pawl 2532 again holds the ratchet wheel against clockwise rotation. Finger 2538 allows pawl 2532 to secure the ratchet wheel slightly before pawl 2548 is disengaged, to prevent uncontrolled release of the ratchet during backspacing. This is ensured by the engagement of a pin 2558 on control plate 2514 by the rear of the finger 2543 and thus now positively moving 2514 clockwise to allow engagement of pawl 2532 in the ratchet wheel teeth, before the control lever 2534 can lift pawl 2548 away.

When the printing carriage is to be returned to the left margin position of the machine, a magnet 2560 is energized, rotating lever 2520 (one end of which has secured thereto the magnet's armature) slightly clockwise, and causing its upper end to engage pin 2518 of the control plate, so that its radial fingers lift away from the ratchet wheel the tip of spring 2530, the pawl 2532, and so forth, releasing the ratchet wheel and allowing the carriage return spring 2510 to return the carriage. When magnet 2560 is energized, pawl 2548 is held away from the ratchet wheel by finger 2566 which engages the rearwardly extending tip 2568 of pawl 2548 and rotates it away from the ratchet wheel against the restoring tension of a spring 2552. This is necessary since lever 2534 will have rotated simultaneously with plate 2514.

In order to advance the printing carriage to the right as each character or letter space is called for, only magnet 2524 has to be energized and released, positively impulsing the carriage-driving ratchet wheel 2508 one tooth space at a time. This is to be contrasted with ordinary printers in which the carriage (paper or printing mechanism) is pulled in the printing direction by a spring, and given its stepwise movement by a step escapement. In the latter, return of the carriage to the starting position requires rewinding of the spring, whereas in the present machine, the impulsive carriage-advancing motions themselves wind up spring 2510 gradually, and ultimately the wound spring is employed to return the carriage to the starting position.

A second magnet 2562, a duplicate of magnet 2524, also has a leaf spring 2564) whose tip is engageable with the teeth of ratchet wheel 2508, and these two magnets are alternately energized in rapid succession when it is required to advance the carriage rapidly, as in "tabulating" operations, herein called "horizontal tab" to distinguish from "vertical tab" operations involving the vertical spacing of lines on the typed sheet. By energizing the magnets in alternate succession from a suitable pulse source, and cutting off that source when the carriage reaches a preset tab position, by means described below, horizontal tab operations are readily performed. Before describing the horizontal and vertical tab position setting and indicating devices, the mechanism associated with a carriage return motion will be disposed of.

CARRIAGE AND PAPER POSITION INDICATING AND SENSING

FIG. 28 of the drawings shows, to a larger scale, the arrangement of indicators which appear in the windows 130 and 132 of FIG. 1, and by which the settings of the right and left margins, and the horizontal and vertical tabulation (tab) stops, are presented at the operator's position, as well as indications of the position of the printing carriage assembly and of the position of a sheet of impression paper (or continuous form) with respect to the line count. Each window exposes a central longitudinal scale, the upper scale 2802 being graduated in letter-space increments and the lower scale 2803 being graduated in line-space increments.

Operating along the upper scale, an indicator element 2804 which is secured to the printing carriage serves to show the printing position of the carriage, while indicator elements 2806 and 2808 exhibit the positions of the left and right margin stops, respectively. Along the lower edge of this same upper scale 2804 appear typical indicators 2810 and 2812 which represent the "set" (operative) horizontal tab positions. That is, these are positions at which the carriage will successively stop when a horizontal tab control key, on the machine keyboard, is is successively operated.

Operating along the lower scale 2803 and in particular along its upper edge, are indicators 2814 and 2816 which represent the "set" (operative) vertical tab positions, or line-count positions at which paper feeding will be interrupted in succession when a vertical tab control key on the keyboard is successively operated. Finally, operating along the lower edge of lower scale 2803, is a paper position indicator or pointer 2818, which shows the operator the number of lines the paper has been advanced from a zero or starting position relative to the leading edge of a sheet, or relative to the position of a continuous-form marker such as a perforation in the paper.

FIGS. 29 and 30 illustrate a preferred way in which all of the above pointers, indicators and markers are provided. In general, the tabulation indicators, both vertical and horizontal, and the margin indicators, are here provided by the suitably displaced ends of elements which form arrays lengthwise of the path of carriage travel, and which elements, when displaced, also form "stops" for the printing carriage or line feeding movements. In this sense of a "stop," the term is of course meant to include a positionable or displaceable element which acts to "stop" carriage movement, or line feeding, by reason of the making or breaking of an electrical control circuit. That is, the term is not intended to be limited to the use of a physical abutment or the like to form a physical limit to the travel of the controlled part. However, such physical motion-limiting means may also be employed in connection with one or more of the "stop" positions, as will appear.

The indicating and "stop" elements as described are all formed as bent-wire rockers indicated in FIG. 30 by numeral 3020 and formed of springy wire with a central eye or loop 3022 sized to engage snugly, by a friction fit, the helical thread of a control rod 3024 journalled between the main side frame plates of the machine. The pitch of the thread on rod 3024 is made double that of the letter-spacing increment of the printing carriage, at least in connection with the indicators appearing in the upper window 130, and the wire size of the rockers 3020 is such that one can be received on the rod for every other turn of the helical thread. Thus, there is a rocker on the threaded rod for each two turns of the thread, and hence one for each possible stop position.

The indicating end of each rocker is merely a turned-down (or turned-up) end of the rocker wire, this indicating end becoming visible in window 130 whenever the rocker arm on rod 3024 (for instance) is turned slightly clockwise from its raised position; this clockwise displacement being indicated by the arcuate arrow 3026 in FIG. 30. The extent of this movement, as of the corresponding movements of the other indicators, is limited by a stop bar 2902 or 2904 in FIG. 29 (on which the scales 2802 and 2803 are preferably provided), these bars running the full length of the array of rockers (the full travel of the carriage, for example) and being secured in the machine end plates. The stop bars parallel the threaded rods 3024 (the uppermost one in FIG. 29), 2906 and 2908. Other stop bars 2907 and 2909, similarly mounted, serve to limit the turning of the rockers in the opposite direction.

The opposite end of each rocker element, such as indicated by numeral 3028 in FIG. 30, is hooked upwardly (or downwardly, for the lower row threaded on rod 2906) to form a contact element which will complete a circuit to a contact spring 3030 or 3032 (for example) when the latter progresses to the appropriate point to touch that hooked end that is raised (as shown at 3028) when the opposite end is lowered. Thus, the tipping up or down of an appropriate rocker element simultaneously provides a visual indication of the position of that rocker (via the windows 130 and 132) and also a circuit-making operation when a travelling carriage, carrying a counter-contact, reaches a position such that the contacts touch. In the embodiment given in FIG. 30, the travelling contacts 3030 and 3032 are connected to, and supported by, a block 3034 which is effectively integral with the printing carriage assembly, and thus reflects the position of the latter. A third contact loop 3036 is also connected to this block, for a purpose elaborated below.

In the case of the threaded rod 2908 of FIG. 29, the upwardly-looped or hooked ends of the rockers threaded on control rod 2908 cooperate, when raised, with a contact spring 2910 mounted on a small slidable carriage 2912 supported by a transverse guide rod 2914 extending between the machine end frame plates. To inhibit rotation of this carriage about its guide rod, a slotted guide plate 2916 is fixed to the machine frame, the slot constraining against rotation the leaf spring arm 2918 secured to the under side of the carriage, and the front bent-up end of which arm serves as the paper position pointer 2818 already described.

The circuits completed by the various contact sets described are preferably established from the grounded printing carriage block 3034, its contact springs, the tipped rocker element, and the threaded rod, in which case the threaded rods must be suitably insulated from the grounded machine frame (if it is grounded) as by insulative bushings. A similar remark is to be understood as to the threaded rod 2908 if the vertical tabulation circuit includes grounding of the carriage 2912. Any other parts, such as the stop bars 2902 and 2904, with which the rockers may come in contact, must equally be insulated (or insulative). However, it will be obvious to those skilled in the art that the "stop" circuits may also be provided without depending upon machine-grounded conductors.

SETTING AND CLEARING INDICATORS

The operation of setting and un-setting (or clearing) one or several of the stops such as elements 3020, at any selected position along the array of such stops, is merely a matter of rotating the appropriate threaded rod through a small angle to either side of its normal or non-rotated position. It will observed that FIG. 30 shows the contact block 3034 as provided with a forwardly-projecting lug 3036, while FIG. 29 shows that this lug is so positioned that, for each position of the printing carriage, it will lie between the curved (contact) ends such as 3028 of the upper and lower rockers, without touching them. The same applies to a lug 2920 on the line-feed (vertical tab) carriage 2912, cooperating with the rockers on the threaded rod 2908.

For example, looking at FIG. 29, contact spring 3032 is shown as touching the contact end of that rocker element whose opposite end is displaying its positional indication at 2808 in window 130. To set that rocker element in such position, it is merely necessary to rotate rod 3024 slightly counter-clockwise, while the lug 3036 lies beneath the left end of the rocker element. This is because the rotation of the threaded rod 3024 carries all of the rocker elements thereon with it, counter-clockwise, but the particular rocker element which engages lug 3036 is restrained thereby, taking up about the axis of the threaded rod a more clockwise position than do the others. Thereafter, when the threaded rod is returned to its normal or centered position by a clockwise rotation of the same amount, the one rocker which was "set" is positioned, as shown, tipped sufficiently to bring its hooked contact end 3028 into engagement with the carriage contact 3032 (when the carriage brings the latter contact nearly to the "set" position along the writing line). Simultaneously, the indicator end 2808 of the rocker appears in the window 130.

It will be seen from an inspection of FIG. 29 that any "set" rocker can be restored to its un-set position, relative to the threaded rod, merely by rotating the rod a slight angle clockwise (in the case of rod 3024) to cause all of the set rockers to be restored to alignment with the remaining un-set rockers of that rod. When the rod is returned to its centered or normal position, all of the rockers, without exception, will be found to have been restored to unset condition, or "cleared," in the language of the typewriter industry. The operations are the same for the indicators (rockers) threaded on rods 2906 and 2908 also, except that in the case of rod 2906 the directions of rotation for setting and clearing the stops are reversed with respect to rods 3024 and 2908; this is because of the fact that the rockers on rod 2906 are arranged in a mirror image of those on 3024.

The reason for providing two contact springs 3030 and 3032 projecting above the carriage block 3034, is to allow for energizing a margin bell slightly before the printing carriage arrives at the right-margin stop position; one contact operates the bell circuit, and the following contact performs the margin stopping operation.

FIG. 31 illustrates a suitable arrangement for selectively rotating each of the threaded rods the specified small angle from its centered or neutral position. Where each of the threaded rods (3024, 2906 and 2908) passes through the right side machine frame plate 720, it is connected to a short lever (such as 3102) whose outer end is in turn connected to a leaf spring such as 3104 in its turn connected to the end of the moving element of a double-acting pair of electromagnets 3106 and 3108, operating and constructed just as the similar double pair of FIG. 23, except that the connection to the common armature connecting rod thereof is made at one end of the assembly. Energization of the winding of magnet 3106 will thus pull in its armature, rotating rod 2908 slightly clockwise (in this figure) to "set" the rocker whose rotation with the threaded rod is impeded by the lug 2920 (FIG. 29) which controls the setting of a vertical-tab position.

The action of the movements of the leaf spring connections of all three of these double sets is indicated by appropriate "set" and "clear" legends beside them. In the case of the pair of magnets 3110 and 3112 of threaded rod 3024 (which sets and clears the right and left margin positions), a set of contact pairs 3114 and 3116 are operated by movements of the magnet armatures away from the neutral or centered position, in the "clear" direction, for a purpose to be described. The leaf springs such as 3104 provide the self-centering action described, by virtue of the restoring force developed when they are moved out of their straight or unbowed condition.

LEFT MARGIN SETTING

The left hand margin stop must be adjustable through a certain range, and this was done manually in the form shown in FIG. 10. The arrangement now to be described allows this setting to be established under remote-signal or code control, or by operation of a keyboard key. In the present machine, a dashpot system is, as mentioned before, employed to limit the leftward motion of the very light carriage under its return-spring drive. FIGS. 32 and 33 show how this is arranged.

The left side of the carriage has fixed thereto, as before, a dashpot cup 802 of annular section, which mates with a similar cup 3202 that is slidable along the guide shaft 306. The carriage return operation engages these two cups smoothly and brings the carriage to a final stop at the desired and preset left marginal location. To set this location, cup 3202 has a rod 3204 (threaded or toothed) that passes through the left-hand machine side plate 708, its outer end being urged by a coil spring 3206 to the right. Spring 3206 is of course weaker than the carriage return spring, so that if rod 3204 were not impeded, it would be forced the maximum leftward distance, corresponding to zero left margin. A resilient bumper block 3208 prevents the cup 3202 from slamming against the machine frame in case the carriage is returned from a distance when the margin rod 3204 is in its released condition.

Normally, the cup 3202 is held in a preset margin-establishing position by engagement of the threads (or teeth) of rod 3204 with a half-nut 3210 (of insulating material) slidable in a cover or bracket 3212 on the left machine frame plate. The upper (locking) position of the nut is obtained by a slight counter-clockwise (FIG. 33) rotation of the control rod 3024 that extends between the right and left frame plates of the machine, and through the left plate (insulated therefrom by a bushing 3214) and has at its left end an arm 3216 in a recess in the nut. When the rod 3024 is rotated clockwise (FIG. 33), its arm 3216 slides the nut downwardly, allowing margin-setting dashpot cup 3202 to move its maximum travel to the right (if the cariage is then at some position to the right of the previous left margin setting), or its maximum travel to the left (if the rightward tension of spring 3206 is overcome by the stronger carriage return spring). In either case, the desired new margin setting is obtained by rotating rod 3024 to release the cup 3202, then returning the carriage to full left position, then advancing the carriage stepwise to the new margin setting, and then counter-rotating rod 3024 to lock the cup 3202 in that position.

To provide an electrical signal whenever a carriage-return operation has been completed, the contact springs 1020 and 1022 are provided, just as shown in the manually-set (FIG. 10) embodiment.

As stated, all of the double magnets which operate the "set" and "clear" controls are identical in construction, the two magnets for the setting and clearing of horizontal tab stops being numbered 3118 and 3120 for later reference. FIG. 31 shows, in dotted lines, three manual control levers 3122, 3124 and 3126 which may preferably be connected to the near ends of the three threaded rods (that is, on the ends thereof which project through the right machine side frame plate 720 in FIG. 10), and by which the settings can be, if desired, controlled independently of the double sets of magnets of FIG. 31. However, for the same purpose of making these settings by a local operator, the magnets and their controlling circuits can equally well be energized by the operation of function keys provided at the keyboard, and in general these will perform the same operations as in the case of the control of all "format" settings (margins and all tab stops) by code signals received over a line or channel from a remote station. It is also noted that, for manual setting of the rockers themselves, it is perfectly feasible to "set" and "reset" them individually by providing direct access to them, for individual motion such as by a pencil point or other suitable instrument manipulated by the operator.

A brief description of the way in which horizontal tab and margin setting and clearing operations are performed in a typical sequence by an operator at the keyboard or by remote control will aid in understanding the reasons for the mechanical and electrical structures so far described. Let it be assumed that previous tab and marginal settings are all to be cleared, and a new set of these is to be established, and that the printing carriage happens to be lying in some arbitrary position between the previously-set margin stops. The operator first operates an "H-Tab clear" keyboard key to momentarily energize magnet 3118 (or he may elevate lever 3124 of FIG. 31) to turn threaded rod 2906 clockwise in FIG. 31 or counter-clockwise in FIG. 29. The ends 2812 of all of the rocker elements on this rod will thus be brought up against bar 2902 and into alignment along the array, and when the threaded rod is restored to centered position, none of the contact-making ends will be in position to engage the carriage contact 3036. This clears the previous horizontal tab settings.

To clear the previously set margin stops, the operator depresses the appropriate "margins clear" keyboard key to momentarily energize magnet 3112 (or he may depress lever 3122) to turn threaded rod 3024 counter-clockwise in FIG. 31 or clockwise in FIG. 29 and this similarly restores or clears all of the previously set rockers on that threaded rod. This key energizes a circuit to provide a carriage return operation also. Referring to FIGS. 32 and 33, this same rotation of rod 3024 retracts the half-nut 3210 from rod 3204, allowing spring 3206 to push dashpot cup 3202 to its maximum rightward extent, or up against the complementary dashpot cup on the printing carriage, if it then lies close enough to the left end of the machine. This brings the carriage ultimately to its left most position, and the operator operates the space bar to advance the carriage to the desired new left margin position. Rod 3204 will follow along, and when the carriage reaches the new left margin position, the operator depresses the margin-set key of the keyboard, energizing magnet 3110 and rotating threaded rod 3024 clockwise (or he may elevate lever 3122 to do this), upon which pin 3216 of FIG. 33 raises half-nut 3210, locking the dashpot cup 3202 in the new left margin position. At the same time, this same rotation of rod 3024 rotates all of its rockers as a unit, except that one lying above lug 3036, and when the rod is restored to centered position, the indicator end 2806 thereof will appear in window 130 at the proper scale position.

The horizontal tabulating positions are cleared as described above by momentarily energizing magnet 3118 from a keyboard key (or by raising lever 3124). Any number of new tab positions may now be set by advancing the printing carriage stepwise (by operating the space bar 110) to bring the carriage position indicator 2804 successively to the newly desired tab positions, and at each such position, rotating threaded rod 2906 counterclockwise (FIG. 31) by operating an "H-Tab set" keyboard key controlling magnet 3120 (or depressing lever 3124). Looking at FIG. 29, rod 2906 will thus be rotated clockwise, and all of the horizontal tab rockers will rotate with the rod, except that particular one which is interfered with by the lug 3036 on the carriage. When the rod 2906 is returned to centered position the desired rocker element will be left tipped out of the array, and its indicating end 2812 will be visible beside scale 2802; also, its carriage-contact engaging end will be in position ready for engagement with the carriage contact spring 3036 during future traverses of the carriage.

It is mentioned here that, referring to FIG. 30, the positional adjustments of the springs 3032, 3030 and 3036 are such that, when the printing carriage is at rest at any letter-space position along its path, the springs are out of contact with the respective rocker elements by a distance of perhaps a half-space. This is provided so that when the carriage approaches a tab position (for instance), the cut-off circuit for carriage driving will be energized slightly before the carriage reaches the desired position, and interrupted as the carriage moves into its rest condition.

Other horizontal tab positions are set up in the same manner, by further advancing the carriage and operating the tab-set key or lever 3124 at each desired position. After the last desired horizontal tab stop has been set, the carriage may if desired be further advanced to a position at which the right-margin stop should be established, and threaded rod 3024 again momentarily turned clockwise (FIG. 31) by the means described above, to set the rocker corresponding to right-margin indicator 2808.

VERTICAL TABULATING

The vertical tabulating operation is analogous to the more usual horizontal tabulation, but aims to allow the impression paper (or continuous form) to be advanced desired successions of line-spaces counted from some zero or starting position, upon successive operations of a "V-tab" control key on the keyboard, or upon receipt of predetermined vertical-tabulating control codes from a remote location. For clarity of understanding, there will first be described an arrangement of this kind in which the insertion of a sheet of impression paper in the machine, and its advancement up to the desired starting position, is sensed mechanically, and in which a mechanical means provides the necessary line-counting function thereafter as required for the setting of the V-tab stops.

Referring to FIG. 34, numeral 114 again designates a roller platen about which the impression paper is rolled when inserted into the machine. For present purposes, this roller need not be the platen, but may be any paper-feed roller suitably related to the impression paper. Extending between the left and right side frames of the machine (708 and 720) is a sensing roller shaft 3402 carrying sensing rollers 3404, its ends being received in slots 3405 radial to the axis of roller 114, and urged toward that axis as by leaf springs, one of which is shown at 3502 in FIG. 35. The rest position of shaft 3402 is such that, when there is no impression paper between roller 114 and any of a plurality of the sensing rollers 3404, the latter are held out of contact with the roller 114 by the limits set by slots 3405. However, when a piece of impression paper 118 is rolled into position about roller 114, and its leading edge arrives between it and rollers 3404, further rotation of roller 114 is transmitted frictionally to the sensing rollers, so that shaft 3402 rotates correspondingly.

Fixed to shaft 3402 is a drum 3408 to which are attached the ends of a pair of flexible cables 3410 and 3412, the former of which passes from the drum to an idler pulley 3414, thence to an idler pulley 3416, and at its end is connected to the slidable carriage 2912 of FIG. 29. The other cable 3412 leaves the drum in the opposite tangential direction, and passes about an idler pulley 3418, a spring barrel 3420, and back to the same slidable carriage, to which it is affixed. As the drum 3408 correspondingly wraps and unwraps the two cables, in response to paper feeding movements of the roller 114, carriage 2912 moves a proportional amount, and its indicator pointer 2918 (FIGS. 35 and 29) continuously registers on scale 2803 the distance (from the zero position) that the impression paper has been advanced into the machine, expressed as a line count.

To reset the carriage 2912 to the left whenever paper is fed entirely out of the machine, a constant tension spring 3422 (its barrel being indicated at 3420 above) is connected to the carriage 2912 and urges it constantly to the left. When the trailing edge of the paper leaves the nip of platen 114 and rollers 3404, the sensing rollers, their shaft, and drum 3408 are free to rotate as carriage 2912 returns to its left-most position. All stopping shock is absorbed by plunger 2922 on the carriage engaging in the fixed dashpot 2924.

Due to the fact that paper inserted in the machine reaches sensing rollers 3404 some distance before it reaches the printing position, it is desirable to establish the "line No. 1" indicating position of carriage 2912 a corresponding distance to the right of the carriage's actual travel limit. A few of the whole array of V-tab rocker elements have been indicated just above carriage 2912 in FIG. 34, where their contact portions would engage the carriage-mounted contact spring 2910 if such stops were in "set" position as described earlier herein. Clearing and setting of these stops are done in the same way as for H-Tab settings as described previously.

Considering FIG. 34 prior to insertion of any paper between the rollers 114 and 3404, carriage 2912 will be to its full left position, and pointer 2818 would lie at the zero position of scale 2803. When impression paper is fed in and reaches the nip of these rollers, further insertion (or later retraction, for that matter) will cause a proportional rotation of drum 3408 and translation of carriage 2912 so that the line-count position of the paper relative to the writing line will be accurately indicated by the position of the carriage 2912 and its pointer 2818.

When the V-tab key of the keyboard is operated, the line-feed electromagnet (such as 2312 of FIG. 23) will be repeatedly energized from an oscillating circuit to be described below, advancing the impression paper and the carriage 2912 until the latter reaches a point where a rocker has been set, whereupon a cut-off circuit for the oscillator interrupts the line feeding operation. A later operation of the V-tab keyboard key will similarly advance the impression paper to successive line positions corresponding to other stops or rockers which have been set. It will be noted that in the event the operator wishes to do so, he may freely move the paper feed roller 114 forward or back, without losing the synchronism of the paper position and the indicating carriage 2912, and may resume printing or typing within the pattern of the tab stop settings by operating the V-tab key the requisite number of times from a paper position in advance of the last line where the paper had been automatically stopped.

FIGS. 36 and 37 illustrate a modified form of the foregoing Vertical Tabulating arrangement in which the entry of paper to the zero or count-starting position is sensed electrically, and the V-Tab carriage is driven in synchronized relation to line feed operations by magnetic operating means energized concomitantly with the line feed circuit. In FIG. 37, a cross section of the platen structure 114' is shown, the same including (for example, at the left of the platen in the paper margin area where printing does not take place) a metallic circumferential ring 3702 grounded as by a contact spring 3704. Arranged so as to touch the ring, at the zero-count position of the leading edge of the inserted sheet of impression paper, is a second contact spring 3706 otherwise insulated from the machine. Thus, the ground circuit at circuit lead 3708 will be interrupted when the leading edge of a sheet reaches the zero-count position (or when a marking perforation reaches that point).

In FIG. 36, the carriage 2912 is again shown mounted for travel along rod 2914 for cooperation with the same stops or rockers as described before. Now, however, the carriage is urged to the left by a constant-tension spring 3602 wound on barrel or spool 3604, while a cable 3606 passes from the carriage, around the spring convolutions, thence to a drum 3608 at the right end of the travel path, to which drum it is anchored, and finally is secured again to the carriage. The cable is actuated to pull carriage 2912 to the right by successive energizations of a magnet 3610 whose armature carries a leaf spring 3612 arranged to engage successive teeth of a ratchet wheel 3614 attached to the drum. The magnet circuit leads are indicated at 3616, and a contact pair 3618 is arranged to be opened by the armature upon completion of each ratchet step. Similarly, a contact pair 3620 is opened when the carriage 2912, after release of the ratchet, moves to its full-left position, which will in this case correspond to the zero line-count position if the contact 3706 touches the platen ring 3702 at the writing-line position.

A return spring for the armature of magnet 3610 is indicated at 3622, and a non-return pawl 3624 for ratchet 3614 is pivoted and spring-urged clockwise to normally engage the ratchet teeth. Its tail portion 3626 is disposed to be lifted by an armature rod of release magnet 3628 when the latter is energized over its circuit leads 3630. When this happens, the pawl is disengaged, and its end also lifts leaf spring 3612 away from the ratchet, whereupon spring 3602 returns carriage 2912 to the zero count position at the left. The circuitry provides for energization of the stepping magnet 3610 once for each line feed operation of the platen whenever the contact spring 3706 is held away from grounded ring 3702.

In the embodiments of the invention so far described, the position of the printing carriage (for margin and horizontal tabulating operations) has been sensed by the making of an electrical contact between a "set" rocker and a contact spring on the carriage, and the same is true of the V-Tab carriage position sensing. FIGS. 38 and 39 diagram two alternative systems, which do not require physical contact for carriage position sensing.

In the optical sensing system of FIG. 38, the upturned end of each rocker 3802 is preferably somewhat flattened as at 3804 to provide a shutter for a light beam originating at a source such as a lamp 3806 at one side of the machine. This lamp may also be the "on" pilot light on the panel of the keyboard. A fixed lens 3808 collimates this beam and directs it (parallel to the path of printing carriage travel) to a relay lens 3810 and 45-degree mirror 3812 mounted on the carriage. These parts direct the beam across the line on which lie the up-turned ends 3804 of any "set" rockers (shown in dotted line), so that the beam will be interrupted whenever the carriage reaches those positions. Otherwise, the uninterrupted beam proceeds to a second carriage-mounted mirror 3814 and lens 3816, which relay it to a photocell or other light sensing device 3818 at the left side of the machine. An amplifier 3820 furnishes an output signal of suitable level for operating essentially the same circuits as described for the physical-contact sensing of carriage positions.

Similarly, FIG. 39 diagrams a magnetic flux sensing system for carriage positions. The rocker 3902 is made of iron or other magnetic material, and otherwise is just as in FIGS. 29 and 30; its "set" end 3904 (upturned or, in the case of another row, downturned) will lie adjacent the sensing gap 3906 of a magnetic sensing head 3908 carried on the printing carriage. When the carriage arrives at any preset position, the flux change in the sensing head will produce an electrical signal which, suitably amplified as at 3910, controls the same circuitry as is employed with the previous embodiments.

Only parts necessary for an understanding of these variations are shown in FIGS. 38 and 39, the remaining structure being obvious from earlier explanations herein. It will be understood that appropriate sensing means according to these teachings will also be provided for the other rows of rockers, with due allowance for the proper directions of rocker rod rotation for setting and clearing, as before.

RIBBON MECHANISMS

FIG. 40 of the drawings is a diagrammatic view of the printing ribbon supply and take-up arrangement in one preferred embodiment. Assuming the use of a "one-time" carbon paper or coated plastic ribbon, a supply reel 4002 is mounted upright within the machine casing at its right side, for example upon a spool 4004. The ribbon passes upward to and over a fixed guide roller 4006 and thence downward and to the rear where it passes over a roller 4008 mounted for rotation at the end of an arm 4010 which is secured to a collar 4012 freely rotatable about the same axis as spool 4004. A tension spring 4014 is connected to the collar 4012 so as normally to urge arm 4010 in the clockwise direction.

From roller 4008, the ribbon passes upward to a fixed idler roller 4016, thence forward (over a guide not shown) to a point 4018 where it executes an angular bend and then passes leftward to the printing carriage guides which produce the "jog" 126 and the other portions of the loop around the printing mechanism. Thence the ribbon departs along the path 128 (see FIG. 1) and to a suitable fixed guide at the left end of the machine, from which it passes between a frictional feed roller 4020 and a back-up roller 4022 and into a slack box 4024. Obviously, the slack box (which is slidable out the rear of the machine casing for emptying) could be replaced by a suitable driven take-up reel.

Feed roller 4020 has at one end of its shaft a one-way clutch 4026 which prevents rotation of the feed roller against the direction of the arrow. The other end of the shaft is connected to a one-way clutch 4028 which is a part of a driving pulley 4030, the combination causing tape-feeding motion of roller 4020 when the cable 806 (see FIGS. 8 and 10) is pulled during carriage-return operations.

The parts in FIG. 40 are shown at a position when the carriage is midway of its carriage returning movement (to the left) after completing a printed line; note that the loop forming roller 4008 is midway between its extreme positions as indicated by the dotted arrows showing the path of this roller. Ribbon is not fed between the supply and take-up mechanisms as printing progresses, as an unused length of ribbon lies along the writing line ahead of the printing carriage, so that a fresh portion of stationary ribbon is presented for each impression; the carriage ribbon guide, in effect, slide along the ribbon. Upon completion of a line of printing, the carriage cable drum 2506 pulls on cable 806 to return the carriage to the left, and the cable rotates pulley 4030 and feed roller 4020, the latter being slightly oversized so that a sufficient length of fresh ribbon is presented for the typing of the next line.

Since a new stretch of unused ribbon has to be advanced from the supply mechanism during the relatively short time occupied by a carriage return operation, the loop forming mechanism is employed to make it unnecessary to fully accelerate the relatively high-inertia supply roll 4002. Recalling that the position shown represents matters at an instant at which the carriage has been partially returned, it will be realized that the fresh ribbon is initially supplied from the loop between rollers 4006, 4008 and 4016, roller 4008 moving upward against the tension of spring 4014, without having to accelerate the roll 4002 almost instantaneously. Upon completion of the carriage return operation, one-way clutch 4026 holds the ribbon against reverse motion, and the supply loop is restored from roll 4002 as loop forming roller 4008 returns to its lowermost position under the tension of spring 4014.

It will be observed that during this loop forming motion of roller 4008, the ribbon passing to it from idler 4006 rubs tangentially on the periphery of the supply roll 4002; this tends to brake the rotation of the supply roll to prevent over travel thereof.

The foregoing describes an arrangement of the supply and take-up rollers (or a slack box in place of the latter) in which they lie in what may be called a "saddlebag" arrangement; that is, in substantially vertical planes to the left and right sides of the platen roller. For convenience of loading and unloading it may be preferable to dispose the supply and take-up means on a relatively more accessible shelf or support lying rearward of the platen and, in fact, at the back of the machine where they may be reached by opening a suitable hinged cover. Such an alternative arrangement is shown diagrammatically in FIG. 40–A, and will now be described.

A generally horizontal or slightly tilted circular supporting plate 4032 is suitably journaled rearward of the platen 114, and carries a core collar 4034 about which a fresh reel of ribbon 4036 may be dropped to lie on the plate. Beneath the plate is secured thereto a collar 4038 which is frictionally engaged by a pivoted brake 4040 urged against the collar by a cam portion of disk 4042 which carries a swinging arm 4044 urged clockwise by a spring 4046. Fresh ribbon 124 leaves the supply roll 4036 and loops around a roller 4048 journaled at the end of arm 4044 and thence around an idler 4050, from which the ribbon travels to the right (parallel to the platen) to an idler 4052 where it turns forward to an idler 4054. A spring arm 4056 carries a roller 4058 mounted on a one-way clutch 4060, this roller 4058 being urged against the ribbon where it passes around idler 4052, the clutch preventing any backward motion of the unused ribbon.

From idler 4054, the ribbon passes along the front of the platen to the guiding means carried by the printing carriage, and returns from that carriage in the opposite path to an idler 4062. From the latter, the ribbon passes rearwardly over an idler 4064 to a loop forming roller 4066 carried at the outer end of a swinging arm 4068 urged counterclockwise by a spring 4070. Thence the ribbon passes around an idler 4071 against which it is held by a one-way clutched roller 4072 mounted on another spring-urged arm similar to arm 4056 (omitted for clarity) and thence to the take-up roll 4074, the inner end of the ribbon being secured to a collar 4076 having a one-way clutch connection 4078 with a fixed shaft. A circular plate 4080 is secured to the collar 4076, to support the convolutions of the ribbon as it is wound on the core.

In this embodiment, the taking up of used ribbon occurs incrementally during the advances of the printing carriage as a line is typed. As the carriage advances, the return spring 2510 is paid out from the spring barrel of FIG. 25, and a pulley 4082 is connected to the barrel axle by a one-way clutch 4084. This pulley is connected by a belt 4086 and another pulley to the shaft 4088 whose upper end drives a pulley 4090 connected by a flexible friction belt 4092 to a pulley 4094 at the end of a swinging arm 4096, suitably shaped to avoid contact with the periphery of the take-up reel, which is, however, engaged by the belt 4092. Arm 4096 is urged clockwise by the spring 4098, and the drive ratios of the pulleys are so chosen as to provide sufficient ribbon take-up per unit of carriage advance.

As the carriage advances to the right during printing, the frictional belt 4092 winds corresponding increments of ribbon onto the take-up reel, the stretch in belt 4092 allowing reel acceleration to be minimal, while the instantaneous slack (due to the forward motion of the printing carriage) is also partially taken up by the loop forming roller 4066 at the end of arm 4068 under the tension of its spring 4070. When the printing carriage is returned after completion of a line, one-way roller 4072 holds the used ribbon taut, and the carriage return motion pulls unused ribbon across the front of the platen from the loop formed by roller 4048, just as in the previous embodiment. At the same time, an equivalent length of used ribbon is paid out from the loop formed by roller 4066, as its arm 4068 travels rapidly clockwise from its dotted line position in the direction of its full line position. This is necessary because when the printing carriage is moved fully to the left margin, an amount of ribbon equal to twice the line length has to occupy the two paths from the printing carriage to the right side of the platen.

While both of these ribbon mechanisms provide loop forming means for the supply reel, and braking means therefor, the one last described provides a pair of loop formers adequate to permit the supply of fresh ribbon at the high rate required for feeding a complete line length thereof at the speed (of perhaps 80–100 inches per second) necessary to accomplish this in the time available. Also, this latter arrangement utilizes convenient space behind the platen for both of the reels, greatly facilitating removal and replacement thereof as well as affording a more compact arrangement and facilitating threading.

FUNCTIONAL BLOCK DIAGRAMS

In the foregoing description, all of the mechanical and electromechanical operating elements of the complete machine have been included, together with sufficient of the operational procedures to indicate the general mode of operation thereof. FIG. 41 is a block diagram which shows the signal paths from the input-output lines or channels (including a machine keyboard as one possible input channel) and the general flow of control signals by which the operating devices are energized.

Thus, the machine keyboard itself is designated by numeral 4102, including a diode matrix of usual form for converting each key operation to the energization of a selected one or more of the magnets of FIGS. 17–22 which specify the desired printing or non-printing function. Numeral 4104 designates the flow channel by which these energized circuits control the electronic components of the selector control 4106, which in turn results in the displacement of a single contact wire of the selector 1008 and thus completes an operating circuit to a magnet or magnets which produce the desired operation (character selection and printing, carriage control, or the like).

Besides operation from the machine keyboard, the operation may also be controlled from a local tape reader of known type, and a known type of code recorder (perforator) may be operated from the keyboard, simultaneously with the control of the printer from the keyboard. Such a typical tape reader, perforator, and like auxiliary devices are indicated by the block 4108, with appropriate control channels leading from the keyboard to the auxiliary device, and from another auxiliary device to the selector control 4106. A keyboard cut-off circuit is indicated at 4110, its function being to prevent or inhibit the operation of the keyboard for a succeeding printing or functional operation until sufficient time has elapsed to allow for completion, at least to the point where interference cannot result, of the previously selected operation. Keyboard cut-off for other purposes is also provided; e.g., where something is required to be done by the operator.

The equipment is equally operable from time-serial input pulses, and for supplying serial output pulses from the keyboard, by the use of a serial-to-parallel convertor 4112 having the serial input and output connections indicated at 4114, and connected in a path from the keyboard (or auxiliary device) to the selector control 4106. It will be recalled that the operating magnets of the selector are initially energized with a current of adequate amplitude to pull-in the armatures of the code disc magnets through the existing airgaps, and that code selection is accomplished by their selective release. A reset timer 4116 is provided, the same having inputs 4118 derived from certain of the operating instrumentalities indicated by the lower blocks in FIG. 41; its function is to energize the code disc setting magnets 1700–1712 (in preparation for their code-controlled selective release), and also to energize the reset magnets 1830 and 1834.

The electrical circuit from the selector being established, it may control either a non-printing function or a printing function. These kinds of functions are indicated by the several blocks in the lower part of FIG. 41, and in the case of printing functions will consist either of a clockwise font spool drive pulse or a counter-clockwise drive pulse (4120 or 4122), or (if the character is nearby the previous font position) the same drive pulses at reduced power (herein nominally designated as ½ power) as indicated at 4124 and 4126, a brake impulse operation (4128) when required, an indexing magnet impulse, as at 4129, and finally the operation of the magnet, as indicated at 4130, which produces the printing impression, either by the jerk-wire magnet 714 of FIG. 7, or the on-carriage magnet 902 of FIG. 9.

When the print function has been accomplished, a signal is sent back to the reset timer 4116 via the conductor indicated at 4131, to reset the selector in preparation for the next selection. Also, over channel 4132, a forward spacing movement of the carriage is achieved at block 4134, so that the following character will be printed in the next position along the writing line.

Carriage spacing, incidental to the printing of a character, is basically a non-printing function, since the spaces between words of text are obtained without operation of the font spool. Thus, the "Space" block 4134 is also under the control of channel 4136 leading directly from one of the non-printing function contact wires 1836 of the selector mechanism 1008 already described. Other non-printing functions of the machine are tabulated in respective blocks, whose labels are largely self-explanatory. In each case the small diagonal arrow leading upward from a block indicates a resetting impulse connection to the reset timer 4116, as is suggested by the plurality of input leads 4118 to that block. Line feed may be desired without carriage returns, and if so, connection or channel 4140 is involved. If, however, a line feed is required in connection with a carriage return operation or with a "vertical tabulation" function, then the line feed block is automatically energized by a connection path such as 4142 or 4144, respectively, as an incident to the energization of the inputs 4146 or 4148. A similar situation exists when the "superscript" or "subscript" platen-shifting operations are performed, and it is necessary to operate the magnet 2343 in timed relation to the magnets 2322 or 2324, to restore the normal in-line printing adjustment after each series of raised or lowered characters.

The "device control" boxes such as at numeral 4154 are optional, and intended for use with external components (such as controlling the turning off or on of power to an external reader, perforator or the like), and enable such actions to be accomplished either by keyboard control of the selector mechanism, or by code signals received from a remote station.

Turning now to the block diagram of FIG. 42, the flow of power to the various operating components is diagrammed, initially from a standard alternating current source 4202 through an on-off power switch 4204 and a convertor 4206 supplying nominally 20 volts DC for the semiconductor devices and magnets. The disc control magnets of selector 1008 require a reduced voltage, herein indicated as about 3½ volts supplied by the subsidiary circuit 4208.

By and large, the commutating control of power for the majority of the various circuits and magnets is performed by three power commutators designated A, B and C in FIG. 42, and numbered 4210, 4212 and 4214. At the right margin of each, there are indicated the turn-off impulse circuits 4216 to be understood as coming from the diagonal arrows at corners of the various blocks below. The need for three kinds of power commutator circuits arises from the necessity for simultaneous operation of certain of the circuits, and their differing timing requirements. The applications of each of the three kinds will be clarified when the circuit diagrams are described.

The various labeled blocks lying below the power commutators of FIG. 42 are self-explanatory in view of the descriptions already given of the means (including operating magnets, contact sets and the like) by which the various functions are obtained. Hence, a specific reference to these by numerals is deemed unnecessary. The functions directly linked by line 4217 to the power supply 4206 are those whose operation does not require the intervention of one of the power commutator circuits.

TIMING DIAGRAM

FIG. 43 is a timing diagram illustrating the relationship between major events in several successive printing cycles. The horizontal scale indicates the passage of time in milliseconds, and the first line of the diagram indicates at 4302 an initial "select" period of about three milliseconds devoted to the energization of magnets 1830 and 1834 (FIG. 18) and the setting of code disks 1720 by selective release of magnets 1700–1712. The next "select" impulse is shown occurring at about thirty-four milliseconds after commencement of the previous select impulse, namely at 4304. This represents, for the particular embodiment contemplated, about the minimum repetition rate for synchronous cycling, including allowance for the flyback or dropout of the carriage advancing magnet 2524. Where, however, input codes can be admitted under control of the printer itself, considerable time can be saved in the printing of arbitrary text, by reason of the possibility of commencing a succeeding selecting interval at an appropriate instant related to the printing of the preceding character.

For example, the second and third lines of the diagram show that when the character being printed requires a full-power drive pulse 4306 (e.g., to magnet 1422 of FIG. 14) the type spool reaches its maximum velocity (indicated at 4308) quickly, and holds this velocity approximately constant for a time of about twelve milliseconds, being braked as indicated at 4310, possibly with slight overshoot and rebound before the type spool motion is completely stopped by the energization of index magnet 1430 shown energized by the pulse 4312.

The second character diagrammed in FIG. 43 is assumed to be adjacent (in the font array) to the previous character, and it will be observed on the second line of the diagram that the resulting half-power drive impulse 4314 is of much shorter duration than 4306, and is immediately followed by the short braking impulse 4316. The type spool is moved only for the short interval of one character, as at 4318, contrasted with the long interval of the previous character at 4308.

The third character charted in FIG. 43 is assumed to be a repeat of the second character, the selecting impulse being shown at 4320 and there being no drive impulse and no motion of the type font spool. Indeed, at the end of selecting impulse 4320, the brake impulse 4322 and index impulse 4324 commence immediately upon completion of the select impulse. The operation times for the print hammer, carriage advance pulse, carriage movement, and the reset pulse (such as 4326) for each of these three characters will be obvious from the lower lines of the diagram. For convenience of reference, numerals have been applied beside the legends in the column at the left of FIG. 43, these indicating the operating elements in previous figures to which the legends relate. For example when the "print" impulse 4328 is applied to magnet 714, the angular velocity of the print hammer 228 commences to rise, typically reaching a peak speed as it impacts the type face against the impression paper, at about the end of the "print" impulse. Its velocity drops almost instantaneously to zero, and it reverses direction as the vertical trace passes through the horizontal axis at point 4330 of this line of the diagram, ultimately returning to its rest position as indicated at 4332 where it remains until its operation is again called for.

CIRCUIT SCHEMATICS

FIGS. 44 through 52 are typical and preferred schematic wiring diagrams of control circuitry for accomplishing the operations already referred to in the mechanical parts descriptions. In order to avoid needless repetition as to circuits which are essentially duplicates of one another, these schematics have been chosen as typical, and they are sufficient to enable those skilled in the art to construct and use all of the similar circuits indicated in the block diagrams and elsewhere in the foregoing descriptions. For convenient reference, the numbers heretofore applied to various components have been applied also in the schematics, with additional numbers for parts here shown for the first time.

FIG. 44 deals essentially with the circuitry surrounding the keyboard with its character and function keys (such as key 104) controlling the diode matrix 4402 which is a component of block 4102 (FIG. 41). The momentary operation of any key such as 104 applies battery voltage from the positive supply terminal 4404 when the keyboard cut-off 4110 is "on," to one or a plurality of the code output leads 4406 which individually control respective transistors such as 4408 in turn controlling the code disc magnets of the selector 1008, only magnet 1700 and its transistor being shown here by way of example. As already mentioned, the code signals may also be received not from the local keyboard, but from an external signal channel, tape reader or the like (see block 4108 of FIG. 41); also, such external channel, or a code perforator or the like, may be energized from the keyboard. These dual or alternate connections are signified by the bidirectional arrows at 4410 leading to and from the matrix leads. For purposes of explanation as to circuit operation, operation under keyboard control will be assumed.

It will be recalled that prior to the making of each selection, the code disc magnets (FIG. 17) are in the energized state, and that selection is accomplished by de-energizing selected ones of the magnets. Thus the reduced-voltage source 4208 normally holds energized all of the code disc magnets (1700, etc.) via the respective forward-biased transistors represented by 4408, there being one of these for each code disc magnet, and a common power transistor 4414. Upon momentary closure of a keyboard contact, the resulting (approximately 3 ms.) pulses on the matrix leads 4406 turn off the corresponding transistors 4408 and de-energize magnets 1700–1712. At the same time the matrix pulses, over an "OR" circuit consisting of diodes 4416, turn "off" the keyboard voltage supply at 4110, so that operation of another key will be ineffective until the prior selection has been completed, at least to a stage at which a subsequent key operation will not interfere. Upon substantial completion of the operation called for, reset timer 4116 applies a 5 ms. pulse on the base of power transistor 4414 to apply higher-voltage source 4206 to all of the code disc magnets 1700–1712, to energize all those which had been released. This restores all of these magnets to their condition of being held energized, in preparation for the next selection by cut-off of selected ones of transistors 4408. Thus, transistors 4408 are seen to have a "holding" function for the code disc magnets energized from low-voltage source 4208, while transistor 4414 has a "reset" function at a higher voltage level (corresponding to the pull-in voltage for an ordinary relay); pull-in is accomplished by a short impulse of full voltage, while the drain during the relatively longer interval between selections is much reduced, as desired for minimum dissipation and maximum power efficiency.

Several other aspects of FIG. 44 are worthy of note. At the same time that reset timer 4116 furnishes the turn-on pulse to power transistor 4414, the same pulse over conductor 4420 and diode 4422 turns on the driver transistor 4424 and this in turn renders power transistor 4426 conductive, to energize the two reset magnets 1830 and 1834 (FIG. 18), lifting all of the selecting wires away from the edges of the code discs, and reducing to a minimum the friction that must be overcome by the code discs and their magnets 1700–1712 during resetting of the selector. An extension of conductor 4420 to the keyboard cut-off 4410 also turns "on" the keyboard cut-off, by the trailing edge of the reset timer pulse, and restores the keyboard voltage supply in preparation for the next selection. The keyboard cut-off circuit can thus be a conventional on-off flip-flop such as is familiar to those skilled in the art. An extension 4428 of conductor 4420 also provides a convenient trigger pulse for external device control (reader, buffer or the like) for the orderly cycling of input signals when the keyboard is not in use, or for the control of a perforator tape-feed magnet or other device of that nature.

A conductor 4430 from the "OR" circuit diodes 4416 also provides a turn-on pulse to transistor 4424 at the same time that transistor 4408 is cut off to release selected code disc magnets. The reset magnets 1830 and 1834 thus hold the selector wires (1824, 1830) away from contact with the discs 1720 during the period when certain of them are moving to their released (selected) positions, and free release is assured, even with very light spring tension in leaf springs 1718.

From the foregoing, it will be seen that what was included in the Selector Control block 4106 of FIG. 41 is essentially the transistors 4408, 4414, 4424 and 4426, together with the associated diodes, biasing circuits, and the like.

FIG. 45 shows schematically the circuit of a typical Power Commutator unit such as 4210 of FIG. 42. These are essentially identical with one another, and they are employed to commutate "off," or interrupt, the power currents of the various silicon controlled rectifiers (or switches) in the numerous function-performing circuits, and therefore to restore the supply of potential in preparation for the next firing of the device. The use of three of these units is dictated by the conflicting timing requirements of different groups of functions to be performed, but the mode of operation of all will be understood from FIG. 45.

For example, numeral 4502 indicates the SCR which energizes the CW Drive Magnet 1422 of FIG. 14. It is turned "on" by the usual current pulse to its gate electrode, in this case by current through a corresponding selector wire and ring contact segment such as 1912 of FIG. 19, the anode current being supplied by power transistor 4504 (normally biased "on"). Once turned on, and regardless of subsequent interruptions in the gate current such as might result from the uncertain or electrically noisy nature of the wire contact, the SCR will continue to conduct until its anode-cathode path is interrupted; in this case, by cut-off of transistor 4504.

The cut-off impulse is here shown as derived from the high side of the load impedance (here, coil 1422) and applied over lead 4506, timing resistor 4508 and diode 4510 to the common series R–C timing circuit formed by resistor 4512 and capacitor 4514, whose common junction is tied to the emitter of unijunction transistor 4516. The R–C time constant determines when, relative to the firing of SCR 4502, the capacitor 4514 reaches the peak-point voltage of the unijunction, to fire the same without reference to the accomplishment of device operation. In other words, this is an example of "timed" turn-off of the pertinent SCR and load device, and the same commutating circuit provides differently-timed turn-offs of other load device SCR's (shown adjacent 4502) by the individual resistors for respective turn-off leads cognate to lead 4506 from SCR 4502 and coil 1422. These individual resistors (such as 4508) may be made adjustable, as trimmers, for precise turn-off time adjustment.

As indicated by leads 4518 and diodes 4520, the same unijunction circuit may also control SCR's, and load devices, which are provided with contact sets for direct turn-off as soon as the relevant function has reached a certain stage.

The way in which the firing of unijunction transistor 4516 turns off the SCR will be obvious to those skilled in the art, and is described in numerous patents and publications, such as the General Electric Company's transistor manuals and handbooks. Briefly, when the unijunction fires, it turns "off" the normally conducting low-drain control transistor 4522, which turns "off" driver transistor 4524 due to the rise of voltage on its base, and 4524 therefore cuts off the power transistor 4504 as already described to interrupt the load circuit through SCR 4502. Since the firing voltage to the unijunction is thus interrupted, the circuit resets completely (with transistor 4522 conducting) almost immediately.

FIG. 45 shows the immediate circuitry of the SCR's in abbreviated form for compactness. This is elaborated in FIGS. 46 and 47, the former also illustrating "direct" turn-off of an SCR 4602 by the interruption of the circuit through contacts 4604, operated by the function-performing device. "Direct" here is to be understood as meaning turn-off which follows operation of contact sets with no material time delay other than that which may possibly be inherent (generally less than 1 ms.) in the circuit connections.

When contacts 4604 are closed, point 4606 is substantially at ground potential, but rises in voltage, when the contacts open, applying the direct turn-off impulse to the power commutator 4210 (as at a lead 4518 of FIG. 45). The voltage rise also applies resetting voltage to the reset timer (4116) of FIGS. 41 and 44, over a lead 4118. FIG. 46 further details the usual bias and protective diodes and resistors associated conventionally with SCR operation in connection with inductive load devices.

In FIG. 47, the timed turn-off circuit of FIG. 45 is elaborated; no device-operated contact sets are employed, and it is the appearance of voltage at the upper terminal of coil 1422 (typically), and consequent current flow, which causes the timing components of FIG. 45 to turn off the Power Commutator, and controls the reset timer. Timed turn-off as in this figure is used herein in connection with Backspace (FIG. 27), H-Tab Set and Clear, V-Tab Set and Clear, Margin Set (FIG. 31), and Superscript and Subscript Shift and Unshift (FIG. 23) functions. The appropriate "trigger" pulse comes from the Selector 1008, being initiated either by a received code group or operation of a keyboard key.

FULL POWER OPERATION

(DISTANT CHARACTER)

FIG. 48 shows the circuits associated with the "printing functions" column of the block diagram of FIG. 41. Typically, where a selector wire 1824 strikes the CCW segment 1904 (i.e., contacts it to establish a current, even one which thereafter breaks one or more times), + voltage on line 4802 from voltage divider 4804 turns on SCR 4806 at its gate electrode. The anode supply for SCR 4806 is via Power Commutator C (4214) over lead 4808, and the rise in voltage at the cathode of 4806 turns on SCR 4810 over the indicated capacitor, energizing the CCW drive magnet 1422'; similarly, a pulse due to the rise of voltage at the cathode of 4810 turns off the Power Commutator 4210 over lead 4812. The turn-off is a "timed" one, such as illustrated in FIGS. 45 and 47. The firing of SCR 4806 also supplies a voltage over lead 4814 and diodes 4816 and 4818 to reverse-bias the two transistors 4820 and 4822, to prevent them from conducting when selector wire 1824 contacts the brake and half-power selector switch segments (such as 1906), and thus preventing triggering of SCR 4824, which is a part of the half-power circuit to be described below; note the series resistor 4826 to reduce the current flow to coil 1422' when SCR 4824 is employed.

The conduction pulse from SCR 4806 also, over lead 4814 and diode 4816, forward biases transistor 4828 so that, when the wire 1824 does contact the segment 1906, the transistor turns on SCR 4830 which energizes the brake magnet 1604 (FIG. 16). The voltage rise at the cathode of 4830 (or, what is the same thing, at the upper coil terminal) terminates the conduction of 4830 by a "timed" turn-off signal over conductor 4832 to Power Commutator 4212.

When wire 1824 contacts the index segment 1908, conductor 4834 is energized, firing SCR 4836 by a trigger pulse coupled over condenser 4837, the latter supplying current to the Index coil 1430 (FIG. 14); and in a manner obvious from the preceding description, a timed turn-off pulse is supplied to Power Commutator 4214 (C) to turn off the SCR 4836, and also remove anode voltage from SCR 4806. The extension 4838 of this turn-off circuit effects directed turn-off of Power Commutator 4210 (A) if it has not previously been turned off. Also, via diode 4840, a pulse is transmitted to trigger SCR 4830 if it has not been previously triggered, to pulse the brake magnet 1604. Further, over diode 4842 and lead 4844, the firing of SCR 4836 applies voltage to transistors 4820 and 4822 to reverse-bias them, to prevent any overshoot of the selector rotor 1816 from producing a spurious half-power or brake signal if wire 1824 should thereby contact the segment (in this case, 1910) on the other side of the index position.

When Index SCR 4836 turns off, the back EMF surge from coil 1430 through the transformer 4846 triggers SCR 4848 to energize the print hammer (jerk wire) magnet 714, and as before a pulse for a timed turn-off is sent to the Power Commutator 4210 over 4850; the latter is duplicated here merely to avoid lengthy and complicated conductor runs. Finally, the properly polarized initiating pulse for carriage advance (space) magnet 2524 is supplied at conductor 4852 (leading to FIG. 49) by the transformer 4854; again, this results from the surge of back EMF when the current in coil 714 is terminated. The Reset Timer 4116 is also pulsed, by a lead 4118 connected as shown here.

The foregoing relates to full-power drive in the counterclockwise direction. For clockwise drive, the operation is entirely symmetrical and will now be obvious to those skilled in the art. SCR's 4856, 4502 and 4860 correspond to 4806, 4810 and 4824, and so on, and diode 4862 corresponds to 4816.

HALF-POWER OPERATION

(NEARBY CHARACTER)

This operation assumes that the code discs have released a wire 1824 which contacts the half-power CCW segment 1906, rather than segment 1904. In this case, SCR 4806 is not turned on, but voltage over conductor 4864 causes transistor 4820 to conduct, it being forward-biased by resistor 4866. The rise in voltage at the collector is transmitted via diode 4868 to the gate of SCR 4824 and fires it, but as noted above the conduction current is limited by resistor 4826 to some reduced value (relative to SCR 4810), herein referred to for convenience as "half-power."

The CCW drive magnet 1422' is thereby energized at a reduced level which is commensurate with the shorter travel required of the type font spool when a nearby character follows. The timed turn-off of 4824 is, as in the case of 4810, accomplished over lead 4812. Thus, the type spool rotates until wire 1824 contacts (strikes) the Index segment 1908, and SCR 4836 is triggered over conductor 4834 to energize the Index magnet 1430. A resulting pulse on lead 4838 will then direct an immediate turn-off of Power Commutator 4210, in the event it has not by that time already been turned off by the pulse on lead 4812 as described before.

Incident to the firing of SCR 4836 and Index magnet 1430 as above, a pulse via diode 4840 and capacitor 4870 triggers SCR 4830 and energizes the brake magnet 1604 simultaneously with the Index magnet, and a pulse over conductor 4872 from the top terminal of 1430 initiates a shorter-time turn-off of 4212 and 4830 than the latter could effect over the previously-described turn-off conductor 4832. Also, the conduction pulse of SCR 4836, via diode 4842 and lead 4844, reverse-biases transistors 4820 and 4822 as previously described, to inhibit spurious firing of SCR's 4824 or 4860 due to overshoot or rebound of the type spool drive assembly.

Finally the print magnet 714 and carriage advance signal lead (at 4852) are energized from transformers 4846 and 4854 precisely as in the case of full-power operation. Again, the CW half-power function is entirely symmetrical to that just described, with SCR 4860 being the cognate of 4824.

"REPEAT" CHARACTER

When the selected wire 1824 initially strikes the Index segment 1908, SCR 4836 is triggered over lead 4834, and this energizes Index coil 1430. The rise of voltage at the cathode, via lead 4838, sends an (ineffective) direct turn-off pulse to Power Commutator 4210 and reverse-biases transistors 4820 and 4822, although a spurious turn-on of these is unlikely. The performance of these superfluous functions is harmless, and is deemed preferable to the complexity involved in inhibiting them. Over diode 4840 the brake coil 1604 is also energized, and then is turned off by the pulse on lead 4872, which executes a timed turn-off of Power Commutator 4212 with an effective turn-off time earlier than could be provided by its other timed turn-off circuit 4832.

CARRIAGE ADVANCE OPERATION (SPACING)

Following any of the above printing cycles, a carriage advance pulse is derived on conductor 4852 from transformer 4854, and conducted to the circuit of FIG. 49, which will now be described. The lead 4852 (upper left) supplies the carriage advance pulse via capacitor 4902 and a diode 4904 to trigger SCR 4906, thus pulsing the space magnet coil 2524 and advancing the printing carriage one character width unit. The SCR conduction current directs its own turn-off at Power Commutator 4212 (B) when the rise in voltage at the left end of resistor 4908 (when the normally-closed contacts 4910 open) reaches the Power Commutator over lead 4912.

It is necessary, in the case of a repetition of the previously printed character, to allow for the possibility that the carriage advance mechanism (FIG. 25) may not have fully reset after the first printing, which might interfere with the following carriage advance. If reset of that mechanism has not been completed when a pulse appears on lead 4852, the normally-open contacts 4913 of the spacing magnet (see FIG. 25) will be closed, and the carriage advance pulse on 4852 can proceed over conductor 4914 and diode 4916 to trigger SCR 4918. The latter is arranged like SCR 4906 but serves to energize the H-Tab coil 2562 (FIG. 25), so-called because it comes into use mainly for repeated non-printing advances of the printing carriage when horizontal tabulation is performed. In the present case of a repeat character, however, the H-Tab coil 2562 is availed of to take over the letter-spacing function from "Space" coil 2524 when the latter has not had time to reset. In this case, repeated alternations of carriage advance (used in tabulating) do not occur since transistor 4920 is reverse-biased by resistor 4922.

NON-PRINTING FUNCTIONS

These functions are listed in two columns at the right of the lower portion of FIG. 41. One group (those mentioned above in the description of FIG. 47) all operate from the Power Commutator of FIG. 47, that is, by a "timed" turn-off circuit with the trigger pulse derived from appropriate contacts (1832, 1836) of the selector mechanism. The other group utilizes the direct turn-off of FIG. 46 (or in the case of external devices, for example, may use their own turn-off circuits), or may not involve a power commutator control requiring a magnet coil contact; that type may have purely mechanical switch control.

SPACE

The operation of spacing, essentially a non-printing function analogous to carriage advance, is clear from FIG. 49. The selector wire contacts 4924 for "space" are closed, putting a voltage pulse from capactor 4926 and diode 4928 on the gate of SCR 4906, so that spacing of the carriage by magnet 2524, and direct turn-off of Power Commutator 4212, follow as before. The space selector contacts also reset the selector over a lead 4118 and the reset timer 4116.

HORIZONTAL TABULATION

This operation utilizes controlled carriage advances (or rather spaces, since no printing occurs) obtained by the rapid repetitive and alternating energization of the space coil 2524 and the H-Tab coil 2562. The purpose is to drive the carriage rapidly to the next position where a preset H-Tab contact rocker (3020) will be engaged. The action is initiated by closure of the selector H-Tab contacts (such as 4930), thus applying a pulse over capacitor 4932 and diode 4934 to the gate of SCR 4918. When the magnet 2562 operates, the printing carriage advances one step, and the SCR resets itself in the same manner as 4906.

The selector contacts 4930 also supply a voltage over a conductor 4934 to forward bias transistor 4920 so that when the normally-closed contacts 4936 of the H-Tab magnet 2562 open, a pulse passes over lead 4938 and diode 4940 through the transistor and capacitor 4942, and diode 4944 triggers SCR 4906. When 4906 (actually, its magnet 2524) advances the carriage one step, a pulse over lead 4946, diode 4948, transistor 4920, capacitor 4942 and diode 4950, fires SCR 4918 again. Carriage advance thus continues until this alternate cycling is terminated when the traveling contact 3036 engages a preset rocker 3020 of the H-Tab array (on rod 2906), momentarily grounding the base of 4920 over diode 4952, and cutting off the transistor. The same preset contact engagement, over resistor 4954, turns on transistor 4956.

Transistor 4956 is reverse-biased when the H-Tab selector contacts (4930) close, but is supplied with emitter voltage over lead 4958, and diode 4960 or diode 4962, throughout the alternating energization of the Space and H-Tab magnet coils by the respective SCR's. Therefore, when the preset H-Tab contact rocker 3020 is engaged by travelling contact spring 3036, this reverse bias is overcome, and during the contemporaneous carriage advance step, the conduction of transistor 4956 supplies a cutting-off pulse to the reset timer 4116 over another of its control leads 4118 (see FIGS. 41 and 44), via capacitor 4964. This stops the carriage at a selected position for each H-Tab control code signal or keyboard key operation. A conductor 4966 forward-biases a transistor 4968, whenever either SCR 4906 or 4918 is conducting, for use in the right-hand margin stop and carriage bell signal operations now to be described.

RIGHT-MARGIN STOP AND CARRIAGE BELL

Transistor 4968, as stated, is forward-biased when either of 4906 or 4918 is conducting, and receives collector voltage supply over resistor 4970, and hence is conducting. Transistor 4972 is reverse-biased and has emitter voltage supply at all times. When the carriage "Bell" contact 3030 engages the rocker contact 3020 (of the margin array on rod 3024) at the right margin position, transistor 4968 is momentarily cut off by the effective grounding of its emitter (resistor 4974 is shorted), and transistor 4972 is momentarily turned on as the effective grounding of its base nullifies the reverse-biasing voltage. A circuit from the collector of 4972 and the normally closed contacts 4976 of a sounder or bell armature, and condenser 4978, turns on the silicon controlled switch 4980 at its cathode gate, operating the bell coil 4982 which stays energized as the NC contacts open and the NO contacts close. Now, when the carriage advance brings the traveling contact 3032 into engagement with the set margin rocker 3020, a circuit is completed from ground through transistor 4968 to turn on 4972 momentarily. The now-closed NO contacts supply current over lead 4984 to the Keyboard Cut-off 4110, and also to the anode gate of SCS 4980. This prevents further operation of the keyboard printing keys and any others desired to be disabled, and also turns off the SCS to reset the circuit.

If it is desired to permit printing at the user's option, beyond the right-margin stop position, a manually operable keyboard release key 5102 (FIG. 51) is provided to supply a turn-on voltage to the Keyboard Cut-off 4110 (e.g., on lead 4420 of FIG. 44) from a voltage divider 5104, 5106.

CARRIAGE RETURN

Closure of the Carriage Return contacts 4986 of the selector applies + voltage from a voltage divider 4988, 4989 and a diode 4990 and condenser 4991 to turn on an SCR 4992, energizing carriage return magnet 2560 (FIG. 25), releasing the printing carriage for spring return. At the same time, a voltage through diode 4993 and conductor 4984 effects: (a) turn-off of SCS 4980 if it should be on (e.g., if carriage return is desired after souding of the bell signal but before the right-margin stop is reached), and (b) redundant cut-off of the Keyboard Cut-off circuit 4110. Also, a pulse proceeds over lead 4994 to effect line feed of the impression paper by energizing magnet 2312 (FIG. 23). When the SCR 4992 is turned on, a voltage is supplied to a transistor 4995 from the SCR cathode and the normally-closed contacts 3116 of the "Clear Margins" magnet 3112 of FIG. 31, supplying emitted voltage but also reverse-biasing the transistor 4995. Thus when the printing carriage moves to the preset left margin limit (FIG. 32), engagement of contacts 1020 and 1022 in FIGS. 10 and 32, as well as in FIG. 49, causes the base of 4995 to be effectively grounded and it is turned "on" by the overcoming of its reverse bias. The transistor conduction current supplies a direct turn-off signal to Power Commutator A (4210), turning off SCR 4992, and also via capacitor 4996 supplies a reset pulse to the Reset Timer 4116.

LINE FEED

When the selector line feed contacts 5002 close, FIG 50, SCR 5004 is fired by voltage through diode 5006 and condenser 5008, energizing the line feed magnet 2312 of FIG. 23. Voltage from the selector over lead 5010 also turns on a transistor 5012, so that when the line feed has been completed and the normally closed (NO) contacts 2320 open, a pulse over capacitor 5014 goes to the Reset Timer 4116, and to Power Commutator B (4212) to effect direct turn-off of SCR 5004. Diode 5016 couples the turn-on circuit from lead 4994 of FIG. 49 to provide automatic line feed concurrent with each carriage return.

V-TAB OPERATION

When the V-Tab contacts 5018 of the selector are closed, diode 5020 fires the SCR 5004 just as did diode 5006 above, and one line feed results. Transistor 5024 is now directly forward biased over lead 5030, and transistor 5032 is reverse biased over lead 5030 and diode 5028. Thus, transistor 5024 can conduct when energized by the opening of normally-closed contacts 3618 of the V-Tab stepper magnet 3610 (FIG. 36). If there is paper in the machine and hence contact 3706 is open at the metal ring 3702 (FIGS. 36 and 37 also), transistor 5034 is reverse-biased by resistor 5036, and the voltage rises on conductor 5038, to forward bias transistor 5040. The latter therefore conducts when it receives a pulse over lead 5042 due to the opening of the NC contacts 2320 of the line feed magnet 2312, and supplies a pulse over conductor 5043 to trigger SCR 5044, thus energizing coil 3610 of the V-Tab Stepper. The opening of its contacts 3618 provides a voltage for direct turn-off of Power Commutator C (4214), and a voltage pulse through transistor 5024 over line 5022 to trigger SCR 5004. Line feed magnet 2312 and V-Tab Stepper magnet 3610 thus operate in alternation much like the Space and H-Tab operations described in connection with FIG. 49. The V-Tab Stepper advances the V-Tab indicator carriage 2912 until stopped by the fact that a preset V-Tab rocker has been grounded by contact spring 2910 on the V-Tab carriage, which cuts off transistor 5024 by grounding its base over lead 5026, and turns on transistor 5032 to supply a reset pulse to Reset Timer 4116. Diodes 5041 and 5045 supply voltage for the emitter of transistor 5032 when either of SCR 5004 or 5044 is conducting.

If the impression paper runs out of the machine, or a format-defining perforation in a continuous form is encountered by contact spring 3706, the contact to ground is completed, and transistor 5034 is turned on, supplying a pulse over capacitor 5046 to turn on SCR 5048; thus operating the V-Tab Indicator Release magnet 3628 of FIG. 36, and restoring the indicator carriage 2912 to its "zero" position in readiness for insertion of fresh paper or the advance of a continuous form to the starting position for the next form unit. Also, Power Commutator A (4210) turns off SCR 5048 by a direct turn-off over lead 5050 when the NC contacts 3620 are opened upon completion of restoring travel of the V-Tab indicator carriage 2912.

The drop in voltage at the emitter of transistor 5034, when it conducts, turns off transistor 5040 to inhibit operation of the V-Tab Stepper and movement of the V-Tab indicator whenever line feed operations might be called for by the keyboard when there is no paper in the machine at the position of contact 3706; for example, when line feeds are wanted for paper insertion or final removal. The conductor 5052 supplies an "OFF" pulse to the Keyboard Cut-Off flip-flop 4110 when SCR 5048 cuts off, and this warns the operator of the absence of paper or of completion of a form unit. As in the case of optional override of the Right-Margin Cut-off, the release key switch 5102 of FIG. 51 permits the user to send a turn-on pulse to the Keyboard Cut-off 4110, and this allows further keyboard operations at the user's discretion.

MARGIN CLEAR

FIG. 52 is a schematic of the circuit by which the "Clear Margin" magnet 3112 of FIG. 31 is energized by a selector contact; that is, by code signal or keyboard key operation. The selector contact is shown at 5202, and when closed a pulse over capacitor 5204 fires SCR 5206 and energizes the magnet coil. The normally-closed (NC) contacts 3116 open first, to prevent a pulse from going to the Reset Timer 4116 and also prevent the sending of any turn-off pulse to Power Commutator 4210 when contact 1022 touches contact 1020; see the circuit including these contacts at the bottom of FIG. 49. When the normally-open contacts 3114 close, a voltage is supplied (when SCR 5206 is conducting) from divider 5208 to conductor 5210 and hence to diode 4997 of FIG. 49, which turns on SCR 4992 and energizes carriage return coil 2560 to initiate a carriage return. SCR 5206 of FIG. 52 is turned off by a timed turn-off pulse at Power Commutator B (4212) which is sufficiently delayed to ensure that the carriage and dashpot move completely to the left in preparation for the establishment of new margin positions.

When SCR 5206 turns off, all the contacts of FIG. 52 are restored to their normal condition, as shown, which then permits current to flow through transistor 4995 of FIG. 49, resulting in direct turn-off of Commutator 4210 (turning off SCR 4992) and also in the sending of a pulse to the Reset Timer. The right and left margin stops have now been "cleared."

OTHER NON-PRINTING FUNCTIONS

The operations involved in other non-printing functions such as Backspace, Superscript and Subscript Shifts (and Unshifts), and various auxiliary functions related to some of the detailed circuits, have been sufficiently described in connection with the descriptions of the respective mechanical (or electro-mechanical) arrangements for accomplishing them, and their circuits need not be individually illustrated. As was indicated above, the timed turn-off arrangement of FIG. 47 is used for all of those functions, and the application thereof will be obvious from the examples given above.

As described above, no provision has been made for the situation which may arise when less than all of the "possible" different binary code groups of the coding system are employed, and an invalid (unassigned) code group happens, because of line trouble, noise or the like, to be presented to the selector input. For example, the system described has 90 code groups assigned to character printing operations, but the aggregate of these, plus the codes assigned to non-printing functions, is less than the total of 128 permutations of the seven-bit binary system contemplated by the selector mechanism. Receipt of an unassigned code would cause the selector to be "set," but since no function would be performed, resetting of the selector would not be accomplished, and the selector would not be reset in preparation for a following code group.

Various ways are available to handle such a contingency. In order to take full advantage of the capabilities of the selector disclosed herein, it is preferred to utilize this mechanism for detecting unassigned codes. Thus, the code discs 1720 may be provided with additional notches, located outside the region devoted to sensing wires 1832 devoted to non-printing functions already described. This will allow a single "common" wire (or a few such wires) to complete a reset control circuit whenever any invalid or unassigned code combination is detected. It has already been noted that the selector as described herein provides all of the "logic" and decoding functions necessary to operation of the printer, and in such a way that all logical determinations are accomplished in a single operation, rather than by successive tests that must be applied at different stages as heretofore known in the art. The ability to use an additional common sensing wire or wires, to detect unassigned codes, continues this simplicity and directness of handling of the incoming information, and is a highly advantageous feature of the combination.

Merely for the sake of completeness, a functional block designated "invalid code sensor" has been shown at the lower end of the non-printing function column of FIG. 41, with a resetting connection for the reset timer. It is to be understood that the manner of operation of this feature may be varied to suit the particular coding scheme employed.

The foregoing disclosure has been directed to the aim of explaining the novel principles of the invention and their embodiment in mechanism and circuitry, so that those skilled in the art can make and use the invention. To do this, concrete examples based on one constructional form are set forth, with certain suggested variations. It is to be understood that such examples are not intended to limit the scope of the invention, and neither are the data given herein as to typical operating voltages and time intervals for operation and release of components. In the circuits, certain passive components may be eliminated by the use of particular available types of transistors or controlled rectifiers, the aim herein being to indicate what is required in the general case, rather than a limited design based on specific types.

A similar remark applies to the choice of silicon controlled rectifiers or switches for the ultimate current control of coils and magnets. It will be clear to those skilled in the art that with appropriate changes, transistors may be substituted for some or all of these devices. However, the use of contact-openings, rather than closings, for the signalling of various operations, is a preferred choice for the reason that contact opening is fundamentally a less noisy event (in the electrical sense) and therefore yields a more definite and unambiguous operational signal. FIG. 46 (and others) typify this basic preference.

The machine chosen for illustration is fully controllable both from a local keyboard and from a suitable signal source over a connecting channel. It is obvious that it may be simplified by various omissions to provide merely an improved typewriter, for control only by a local operator. Such an embodiment would not require the non-printing function contacts (such as 1836 in FIG. 17) of the selector mechanism, and their circuits, the functions being controllable either by direct keyboard contact control of the operating magnets, or (as in the case of levers such as 3122 in FIG. 31, for example), direct manual control of the function.

The foregoing and other modifications which may occur to those skilled in the art are therefore considered to be within the true spirit and scope of the invention as defined in the appended claims.

I claim:

1. In a printer, means for supporting a piece of impression paper to receive a line of character imprints, a type font carriage mounted for sliding movement parallel to the desired writing line, a spool shaped type font element rotatable on said carriage with its spool axis generally parallel to the writing line, said element carrying a plurality of edgewise pivoted type-face bearing fingers pivoted at one end to said element for rotation in a first plane to positions extending substantially outwardly of said element, means for rotating said element to bring a selected finger into position for outward rotation to bring its distal end adjacent the writing line, means for swinging the selected finger outward over said impression paper, means for forcing the distal end of the selected finger towards said impression paper, by motion thereof in a plane which is substantially perpendicular to both the spool axis and said first plane, and a unitary device on said carriage for operating said swinging means and said forcing means in timed relation to one another.

2. A printer in accordance with claim 1 and power means on said carriage for operating said unitary device.

3. A printer in accordance with claim 1, including power means mounted off of said carriage, and a power transmitting connection between said power means and said unitary device.

4. A printer in accordance with claim 3, in which said power transmitting connection includes a jerk wire lying in a path substantially parallel to the path of said carriage.

5. In a printer, means for supporting a piece of impression paper to receive a line of character imprints, a type font carriage mounted for sliding movement parallel to the desired writing line and along a shaft, a spool shaped type font element rotatable on said carriage with its spool axis generally parallel to the writing line and to said shaft, said element carrying around its periphery a plurality of edgewise pivoted generally flat type-face bearing fingers having the printing surfaces of their type faces in planes radial to the spool axis, said fingers being pivoted at one end to said element for rotation in a first plane from storage positions parallel to the spool axis to positions extending substantially radially outwardly of said element, means for rotating said element to bring a selected finger into position for outward rotation to bring its distal type-face bearing end adjacent the writing line, single means common to all of said fingers for directly engaging and swinging the selected finger outward over said impression paper, and means for forcing the distal end of the selected finger towards said impression paper, by motion thereof in a plane which is substantially perpendicular to both the spool axis and said first plane.

6. In a printer, means for supporting a piece of impression paper to receive a line of character imprints, a type font carriage mounted for sliding movement parallel to the desired writing line and along lengthwise guiding means, a spool shaped type font element rotatable on said carriage with its spool axis generally parallel to the writing line and to said guiding means, said element carrying around its periphery a plurality of edgewise pivoted, lengthwise flexible type-face bearing fingers having the printing surfaces of their type faces in planes substantially radial to the spool axis, said fingers being identical in size and shape to one another and differing only in their type face configurations, and being pivoted at one end to said element for rotation in a first plane from storage positions parallel to the spool axis to positions extending substantially radially outwardly of said element, means for rotating said element to bring a selected finger into position for outward rotation to bring its distal type-face bearing end adjacent the writing line, single means common to all of said fingers for directly engaging and swinging the selected finger outward over said impression paper, and means for forcing the distal end of the selected finger towards said impression paper, by motion thereof in a plane which is substantially perpendicular to both the spool axis and said first plane.

7. A printer in accordance with claim 6, and means, forming a part of said means for swinging the selected finger outward, for swinging the selected finger back inward to its storage position after imprinting.

8. A printer in accordance with claim 6, in which said fingers are leaf-spring like members flexible throughout a major portion of their length between their type-face bearing ends and their pivot areas.

9. A printer in accordance with claim 6, including means for guiding an inking ribbon along a path which is reversely looped about the location of the end of a selected type-face bearing finger when the latter has been swung outwardly from its storage position, the outgoing and returning ribbon paths being parallel to each other and to the writing line and both extending from one side of said printer, and ribbon take-up and loop-maintaining means cooperatively related to the sliding movements of the type font carriage to maintain an unused portion of ribbon for use in imprinting at the looped position.

10. A printer in accordance with claim 6, including means common to all of said fingers for normally retaining them against being swung outwardly due to the action of centrifugal force during rotation of said font element.

11. In a printer, means for supporting a piece of impression paper to receive a line of character imprints, a type font carriage, and longitudinal guide means for guiding one of said elements relative to the other along a path parallel to the desired writing line, a spool shaped type font element rotatable on said carriage with its spool axis generally parallel to the writing line and to said guide means, said font element carrying around its periphery a plurality of edgewise pivoted, lengthwise flexible type-face bearing fingers having the printing surfaces of their type faces in planes substantially radial to the spool axis and being identical in size and shape to one another and differing only in their type face configurations, said fingers being pivoted at one end to said font element for rotation in a first plane from storage positions parallel to the spool axis to positions extending substantially radially outwardly of said font element, means for rotating said font element to bring a selected finger into position for outward rotation to bring its distal type-face bearing end adjacent the writing line, means common to all of said fingers for directly engaging and swinging the selected finger outward over said impression paper, and means for forcing the distal end of the selected finger towards said impression paper, by motion thereof in a plane which is substantially perpendicular to both the spool axis and said first plane.

References Cited

UNITED STATES PATENTS

| | | | |
|---|---|---|---|
| 1,182,437 | 5/1916 | Mernery | 197—176 |
| 1,929,976 | 10/1933 | Hokanson et al. | 197—176 |
| 2,236,663 | 4/1941 | Adams | 197—53 |
| 2,547,046 | 4/1951 | Salmon | 197—53 |
| 2,840,218 | 6/1958 | Pelton | 197—151 |
| 304,463 | 9/1884 | Sheehy | 197—18 |
| 460,901 | 10/1891 | Way | 197—53 XR |
| 904,743 | 11/1908 | Weston | 197—18 XR |
| 1,748,172 | 2/1930 | Gommel | 197—151 XR |
| 1,864,088 | 6/1932 | Morton | 178—34 XR |
| 2,305,763 | 12/1942 | Dietrich | 197—1 |
| 2,369,433 | 2/1945 | Casey | 197—2 |
| 2,613,796 | 10/1952 | Prouty | 197—12 |
| 2,847,505 | 8/1958 | Kratt et al. | 178—34 |
| 2,869,705 | 1/1959 | Gates | 197—151 |
| 2,891,648 | 6/1959 | Kleinschmidt | 197—12 |
| 2,927,676 | 3/1960 | Abbondanza | 197—6.6 |
| 3,068,985 | 12/1962 | Arthur | 197—14 |
| 3,077,830 | 2/1963 | Paige | 101—93 |
| 3,227,258 | 1/1966 | Pannier et al. | 197—6.6 |
| 3,277,990 | 10/1966 | Jackson | 197—6.4 |
| 3,289,805 | 12/1966 | Kleinschmidt et al. | 197—18 |
| 3,304,858 | 2/1967 | Reach et al. | 101—93 |
| 3,355,001 | 11/1967 | Reed et al. | 197—53 XR |

FOREIGN PATENTS

| | | |
|---|---|---|
| 834,864 | 3/1952 | Germany. |

EDGAR S. BURR, Primary Examiner

U.S. Cl. X.R.

178—34; 197—53, 63, 82, 114, 154, 183, 189